United States Patent
Shobatake

(10) Patent No.: US 7,310,683 B2
(45) Date of Patent: Dec. 18, 2007

(54) MESSAGE RELAYING SCHEME BASED ON SWITCHING IN UNITS OF FLOWS

(75) Inventor: Yasuro Shobatake, Tokyo (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 579 days.

(21) Appl. No.: 10/747,898

(22) Filed: Dec. 31, 2003

(65) Prior Publication Data

US 2004/0153570 A1    Aug. 5, 2004

Related U.S. Application Data

(63) Continuation of application No. 09/398,210, filed on Sep. 17, 1999, now Pat. No. 6,772,219.

(30) Foreign Application Priority Data

Sep. 18, 1998    (JP) .................................. 10-264517

(51) Int. Cl.
*G06F 15/173* (2006.01)
(52) U.S. Cl. .................... 709/238; 709/249; 379/374
(58) Field of Classification Search ........ 709/222–225, 709/205, 249, 231, 206; 379/374
See application file for complete search history.

(56) References Cited

U.S. PATENT DOCUMENTS

| | | | | |
|---|---|---|---|---|
| 4,497,980 A | * | 2/1985 | Gorman et al. ........ 379/374.01 | |
| 5,274,641 A | | 12/1993 | Shobatake et al. | |
| 5,327,275 A | * | 7/1994 | Yamane et al. ................ 398/2 |
| 5,365,358 A | * | 11/1994 | Stein ............................ 398/55 |
| 5,432,907 A | * | 7/1995 | Picazo et al. ................ 709/249 |
| 5,463,735 A | * | 10/1995 | Pascucci et al. ............ 709/222 |
| 5,504,571 A | * | 4/1996 | Eckerman et al. ......... 356/28.5 |
| 5,724,167 A | * | 3/1998 | Sabella ........................ 398/50 |
| 5,784,377 A | * | 7/1998 | Baydar et al. ............... 370/463 |
| 5,818,816 A | * | 10/1998 | Chikazawa et al. ......... 370/225 |
| 5,835,710 A | | 11/1998 | Nagami et al. |
| 5,841,990 A | | 11/1998 | Picazo, Jr. et al. |
| 5,862,338 A | * | 1/1999 | Walker et al. ............... 709/224 |
| 6,085,255 A | | 7/2000 | Vincent et al. |
| 6,092,119 A | | 7/2000 | Rossmere et al. |

(Continued)

OTHER PUBLICATIONS

Sliding Banyan network; Hanely, M.W.; Christensen, M.P.; Lightwave Technology, Journal of vol. 14, Issue 5, May 1996 pp. 703-710.*

(Continued)

*Primary Examiner*—Thong Vu
(74) *Attorney, Agent, or Firm*—Foley & Lardner LLP

(57) ABSTRACT

A message relay device suitable for contructing a ultra-high-speed message relaying system is disclosed. In the message relay device, a flow is detected by a prescribed condition, while a bypass channel capable of transferring messages with an amount of calculations smaller than the case of handling messages by a default channel is set up, and the message transfer belonging to the flow is switched from the default channel to the bypass channel, while providing the connection-less communications on the default channel, so that it is possible to realize the message relaying with the ultra-high throughput by relieving the large amount of calculations inherently associated with the connection-less communications.

1 Claim, 46 Drawing Sheets

U.S. PATENT DOCUMENTS

| | | | |
|---|---|---|---|
| 6,097,517 A * | 8/2000 | Okayama | 398/1 |
| 6,128,292 A | 10/2000 | Kim et al. | |
| 6,141,325 A | 10/2000 | Gerstel | |
| 6,148,342 A * | 11/2000 | Ho | 709/225 |
| 6,182,119 B1 * | 1/2001 | Chu | 709/206 |
| 6,279,035 B1 * | 8/2001 | Brown et al. | 709/224 |
| 6,332,163 B1 * | 12/2001 | Bowman-Amuah | 709/231 |
| 6,343,322 B2 | 1/2002 | Nagami et al. | |
| 6,388,782 B1 * | 5/2002 | Stephens et al. | 398/79 |
| 6,404,522 B1 * | 6/2002 | Handelman | 398/79 |
| 6,417,943 B1 * | 7/2002 | Saraswat et al. | 398/75 |
| 6,493,117 B1 * | 12/2002 | Milton et al. | 398/49 |
| 6,496,516 B1 * | 12/2002 | Dabecki et al. | 370/460 |
| 6,598,080 B1 * | 7/2003 | Nagami et al. | 709/227 |
| 6,625,156 B2 * | 9/2003 | Shaio et al. | 370/395.21 |
| 6,751,367 B2 * | 6/2004 | Moslehi et al. | 385/13 |
| 6,889,247 B2 * | 5/2005 | Christie et al. | 709/205 |
| 6,970,648 B2 * | 11/2005 | Ofek et al. | 398/75 |
| 2002/0091863 A1 * | 7/2002 | Schug | 709/250 |

OTHER PUBLICATIONS

A tool for monitoring routing information in the Internet; Fujinaga, M.; Hotta, T.; Asami, T.; Parallel Processing, 1999. Proceedings. 1999 International Workshops on Sep. 21-24, 1999 pp. 274-279.*

The interconnection network using the ATM switch for message-based multiprocessor systems ;HeaSook Park; KwangSuk Song; Boseoeb Kwon; Hyeong Ho Lee; Communications, 1999. ICC '99. 1999 IEEE International Conference on vol. 2, Jun. 6-10 1999 pp. 818-822 vol. 2.*

Ke et al., "The Flow Detection Protocol Design in Multiprotocol Over ATM," IEEE, Oct. 22-24, 1998, pp. S21-01-1 to S21-01-5.

Ivan Yan-Kit Yu, "Integrating Event Visualization with Sequential Debugging", 1996, ccnga.uwaterloo.ca/pub/papers/Ps/thesismas11.ps.Z, pp. 1-57.

Qun Li, et al., "Message Relay in Disconnected Ad-hoc Networks", www.cs.dartmouth.edu/~liqun/paper/workshops.ps, pp. 1-8.

* cited by examiner

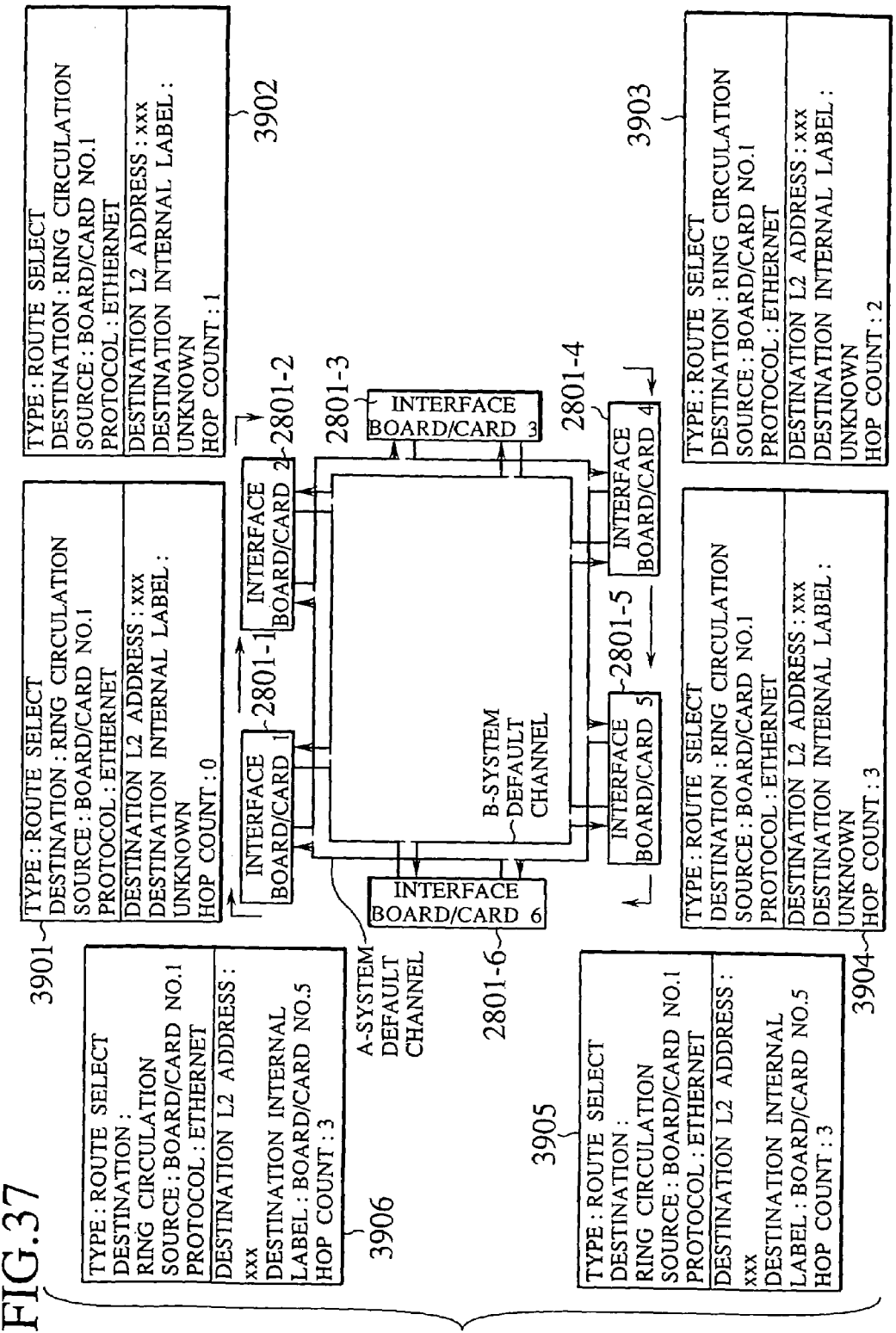

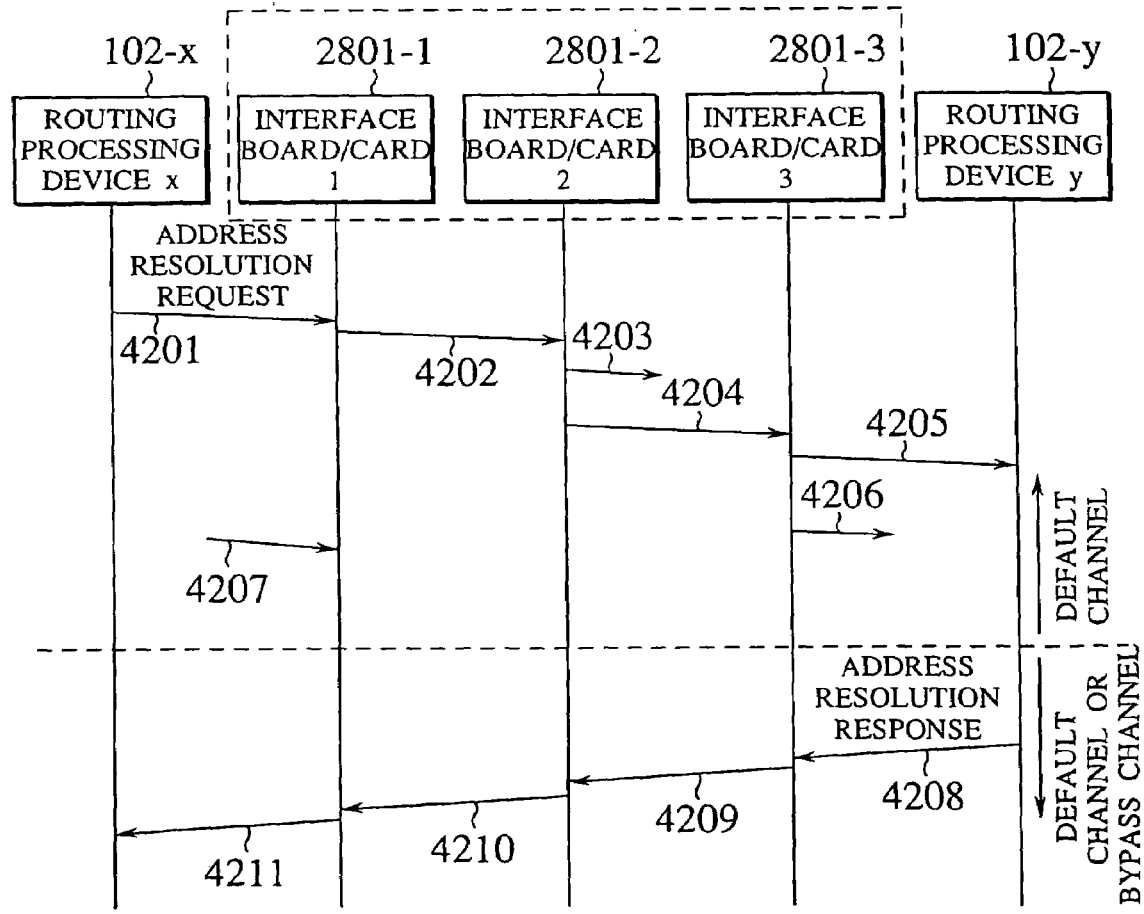

MESSAGE RELAYING SCHEME BASED ON SWITCHING IN UNITS OF FLOWS

The present application is a continuation of U.S. application Ser. No. 09/398,210, filed Sep. 17, 1999 now U.S. Pat. No. 6,772,219, the entire contents of which is incorporated herein by reference.

BACKGROUND OF THE INVENTION

1. Field of the Invention

The present invention relates to a message relaying scheme that is suitable for constructing a ultra-high-speed message relaying system.

2. Description of the Background Art

In recent years, in conjunction with the explosive spread of the so called Internet, the throughput improvement in a connection-less network for leading the so called IP message to a desired terminal has become a major technical problem.

In the case of connection-less network, the end-to-end communications are provided as each routing processing device refers to a destination address assigned to each individual message and transfers the individual message independently to a desired output path. For this reason, it is possible to utilize the bandwidth of each physical link more flexibly compared with the connection-oriented network, and there is an advantage in that the bandwidth of the physical link can be utilized efficiently in a situation where traffics transmitted by terminals are highly bursty, which is characteristic of applications such as WWW for which the spontaneity in the continuous information communications has low importance.

On the other hand, there is a problem in that the amount of calculations required to the routing processing device at a time of routing individual message is overwhelmingly large compared with the connection-oriented network so that it is difficult to realize a high throughput routing processing device.

This problem stems both from the large amount of calculations that is inherently associated with the connection-less communications due to the fact that a physical link to which each message should be outputted must be determined whenever a message arrives, and from the physical constraint associated with electric circuits that it is very difficult to construct ultra-high-speed signal transmission paths using electric signals. This problem becomes particularly noticeable in the case where the physical link accommodated by the routing processing device uses various protocols such as Ethernet, PPP, ATM and SDH, or in the case of providing the so called multicast connection in which a single message is to be copied and lead to plural output paths.

A conventionally adopted method for resolving this problem is one in which a plurality of routing processing devices are directly connected by a physical link group and operated such that they can be regarded as a single routing processing device as a whole, as shown in FIG. 57.

In outline, the ultra-high-speed message relaying system shown in FIG. 57 operates as follows. When a message is entered from a connection-less network 103-i to a routing processing device 102-i, the routing processing device 102-i extracts a destination address of the entered message, obtains a next hop address of that message by referring to a routing table which has the extracted destination address as a key, selects a physical link corresponding to that next hop address from physical links connected to the own device, and transmits the message toward that physical link. When this operation is carried out by every routing processing device 102-i, the message transfer between connection-less networks 103-i via a plurality of routing processing devices 102-i can be realized. At this point, the routing processing at each routing processing device 102-i is carried out independently from any other routing processing device 102-j so that the throughput of the routing processing for the system as a whole can be improved.

However, this scheme directly arranges the physical links among the routing processing devices 102-i so that the bandwidth of the communication path between each connected routing processing devices 102-i becomes fixed and the transmission bandwidth allocation between the routing processing devices cannot follow the dynamic change of traffics among the connection-less networks. For this reason, this scheme has a problem that it is impossible to utilize the bandwidth of the physical link efficiently.

In particular, in the case of applications such as WWW in which the user's access target changes frequently, messages transmitted from one routing processing device 102-i are not uniformly distributed over other connection-less networks so that the bandwidth required between the routing processing devices 102-i and 102-j changes largely in time, but this scheme cannot provide the required bandwidth between the routing processing devices 102-i and 102-j in such a situation. Consequently, this scheme has a problem that the comfortable communications cannot be provided to users because a length of a queue for holding messages to be transmitted to a physical link with insufficient bandwidth that is connected to a connection-less network 103-i becomes long so that the message delay time becomes extremely long.

As described, the conventional routing processing device has been associated with a problem that it is difficult to realize a high throughput routing processing device because of the large amount of calculations that is inherently associated with the connection-less communications and the physical constraint associated with electric circuits. This problem becomes particularly noticeable in the case where the routing processing device accommodates various protocols or in the case of providing the multicast connection.

In addition, the conventional ultra-high-speed message relaying system formed by combining the routing processing devices, the transmission bandwidth allocation between the routing processing devices is fixed so that the bandwidth cannot be allocated by following the traffic pattern that continually changes in time, and therefore there has been a problem that the comfortable communications cannot be provided to users.

SUMMARY OF THE INVENTION

It is therefore an object of the present invention to provide a message relaying scheme suitable for constructing a ultra-high-speed message relaying system, which is capable of allocating the bandwidth by following the traffic pattern between the routing processing devices that are continually changing in time and transferred by various protocols.

It is another object of the present invention to provide a message relaying scheme capable of providing the multicast connection by resolving the problem due to the large amount of calculations that is inherently associated with the connection-less communications and the physical constraint associated with electric circuits.

According to one aspect of the present invention there is provided a message relay device connected with a plurality of routing processing devices for carrying out connection-less communications, for relaying a message from one routing processing device to another routing processing device, the message relay device comprising: a plurality of interface units provided in correspondence to the routing processing devices; a switching unit connecting the plurality of interface units; and a command unit for commanding the switching unit to set up a bypass communication channel corresponding to an internal identifier which is an identifier defined within the message relay device for identifying at least a target interface unit corresponding to a relaying target routing processing device of each message; wherein each interface unit determines a flow to which an input message entered from a corresponding routing processing device of each interface unit belongs and assigns the internal identifier to the input message according to the flow, transmits the input message to the switching unit, and receives an output message to be outputted to the corresponding routing processing device of each interface unit from the switching unit; and the switching unit sets up the bypass communication channel according to the internal identifier in response to a command from the command unit, and switches messages transmitted from one interface unit to another interface unit using the bypass communication channel.

In this aspect of the present invention, the command unit can be contained in each interface unit so that a set up of the bypass communication channel is commanded from each interface unit to the switching unit.

According to this aspect of the present invention, a plurality of routing processing devices for carrying out connection-less communications are connected not directly by physical links but by this message relay device. Then, at this message relay device, when a message is entered from one routing processing device, the corresponding interface unit determines a flow to which this message belongs (the flow specifies at least a relaying target routing processing device of that message), and assigns an internal identifier according to this flow to the message.

Also, each interface unit commands the setting up of the bypass communication channel that can be set in correspondence to the internal identifier to the switching unit. At the switching unit, the bypass communication channel is set up according to a command from the interface unit, and the switching in units of flows (according to the internal identifier indicating the flow to which the message belongs) is carried out using this bypass communication channel, rather than transferring each message by analyzing its content.

Consequently, the large amount of calculations that is inherently associated with the connection-less communications can be absorbed by the interface units that are provided distributedly, and the transmission bandwidth allocation among the routing processing devices can be made to follow the dynamic traffic change.

Also, in this aspect of the present invention, the switching unit may also transfer messages transmitted from one interface unit to another interface unit using a default communication channel that is set up in advance, and each interface unit may judge whether each arrived message arriving from the default communication channel is a message to be received by this interface unit or not by referring to each arrived message, and receive each arrived message when it is judged as a message to be received by this interface unit.

In this way, the switching unit can have a default communication channel for unspecified correspondents in addition to the bypass communication channel that is set up by specifying a correspondent, so that the transfer to appropriate routing processing device becomes possible even for a message that belongs to a flow for which the bypass communication channel is not set up.

For example, in the case of protocol such as Ethernet in which the destination is specified by the layer 2 address, messages to which the internal identifier is not assigned can be transferred by broadcasting through the default channel, and filtering at the receiving side using the destination MAC address or the like. Also, in the case of protocol such as PPP in which the destination is not specified by the layer 2 address, messages assigned with the internal identifier that contains information indicating the destination interface unit can be transferred by point-to-point transmission (in which the receiving side receives messages assigned with the internal identifier that contains own unit as the destination information) through the default channel.

Also, in this aspect of the present invention, each interface unit may obtain the internal identifier by checking a content of a prescribed region within a received message that is entered from the corresponding routing processing device of each interface unit and to be outputted to the default communication and/or an input port from which the received message is entered, and command the switching unit to set up the bypass communication channel toward a target interface unit corresponding to a relaying target routing processing device of the received message that is to be set in correspondence to the internal identifier, when a prescribed condition is satisfied, and each interface unit may transmit a new message entered from the corresponding routing processing device of each interface unit to the bypass communication channel when the internal identifier that is assigned to the new message as a result of checking the content of the prescribed region within the new message and/or the input port from which the new message is entered, is set in correspondence to the bypass communication channel.

In this way, the bypass communication channel set up can be triggered by a message transmitted to the default communication channel in a state where the bypass communication channel capable of transmitting the entered message is not set up, and this bypass channel can be used thereafter.

Also, in this aspect of the present invention, each interface unit may have a plurality of message buffers that can be set in correspondence to different internal identifiers, and each interface unit may allocate one message buffer to a received message entered from the corresponding routing processing device of each interface unit and temporarily store the received message in said one message buffer at a time of assigning the internal identifier to the received message if no message buffer is already set in correspondence to the internal identifier to be assigned to the received message, and transmit each message read out from each message buffer either to the bypass communication channel or the default communication channel which is selected according to a prescribed condition.

Also, in this aspect of the present invention, each interface unit may command a set up of the bypass communication channel toward a target interface unit corresponding to a relaying target routing processing device of each message that has a possibility of being entered from the corresponding routing processing device of each interface unit, as a communication channel to be set in correspondence to the internal identifier that is obtained from a content of a prescribed region within each message and/or an input port from which each message is expected to be entered, and each interface unit may transmit a received message entered from the corresponding routing processing device of each interface unit to the bypass communication channel when the internal identifier that is assigned to the received message as a result of checking the content of the prescribed region within the received message and/or the input port from which the received message is entered, is set in correspondence to the bypass communication channel.

In this way, the bypass communication channel capable of transmitting a message can be set up before that message is entered, and this bypass channel can be used immediately when this message is actually entered.

Also, in this aspect of the present invention, the message relay device may further comprise a layer 3 processing unit connected with each interface unit, which analyzes each message including information of layer 3 and/or upper layers that is entered from a certain routing processing device into a corresponding interface unit, determines a flow to which messages to be assigned with the internal identifier belong, and commands each interface unit to assign the internal identifier when a message belonging to the flow is entered, and the command unit may be contained in the layer 3 processing unit so that a set up of the bypass communication channel is commanded from the layer 3 processing unit to the switching unit.

Instead of the above described case where each interface unit commands the bypass communication channel set up to the switching unit, it is also possible to provide the layer 3 processing unit that commands the bypass communication channel set up to the switching unit. In this way, when each interface unit does not have the layer 3 termination function, it becomes possible to set up the bypass channel for the flow automatically in finer granularity based on the flow analysis accounting for the information of layer 3 and/or upper layers.

Also, in this aspect of the present invention, the layer 3 processing unit may analyze those messages which are control protocol messages for notifying in advance a flow to which messages that have possibilities of being entered from the certain routing processing device into the corresponding interface unit belong.

In this way, it becomes possible to set up the bypass communication channel toward the correspondent interface unit that is to be used by the interface unit at a time of transmitting entered messages to the switching unit, before messages to be relayed are actually entered into this message relay device.

Also, in this aspect of the present invention, the layer 3 processing unit may refer to a content of each message entered from the certain routing processing device into the corresponding interface unit, and transfer each message to the target interface unit corresponding to the relaying target routing processing device of each message using the default communication channel, and the layer 3 processing unit may analyze those messages which are transmitted using the default communication channel.

In this way, the interface unit can transfer the entered message using the default communication channel through the layer 3 processing unit while in a state where the bypass communication channel capable of transmitting the entered message is not set up, and a message transferred in such a way can trigger the bypass communication channel set up so that this bypass channel can be used thereafter.

Also, in this aspect of the present invention, each interface unit may assign the internal identifier to each message entered from the corresponding routing processing device of each interface unit by referring to at least a layer 2 destination address information within each message, where the relaying target routing processing device is identified according to the layer 2 destination address information.

Also, in this aspect of the present invention, each interface unit may assign the internal identifier to each message entered from the corresponding routing processing device of each interface unit by referring to at least a layer 2 header information within each message, where the relaying target routing processing device is identified according a relationship between the layer 2 header information and its relaying target routing processing device which is stored in advance.

Also, in this aspect of the present invention, each interface unit may assign the internal identifier to each message entered from the corresponding routing processing device of each interface unit by referring to information of layer 3, or layer 3 and upper layers, within each message.

Also, in this aspect of the present invention, each interface unit may assign the internal identifier to each message entered from the corresponding routing processing device of each interface unit by referring to at least an information capable of identifying a flow to which each message was regarded as belonging at the corresponding routing processing device, which is written in a specific region within each message, where the relaying target routing processing device is identified from a relationship between the flow and its relaying target routing processing device which is stored in advance.

Also, in this aspect of the present invention, each interface unit and the corresponding routing processing device of each interface unit may be connected by a plurality of physical links or logical paths, and each interface unit may assign the internal identifier to each message entered from the corresponding routing processing device of each interface unit by checking at least a physical link or logical path from which each message is entered, where the relaying target routing processing device is identified according to a relationship between an information regarding the physical link or logical path from which each message is entered and its relaying target routing processing device which is stored in advance.

Also, in this aspect of the present invention, each interface unit and the corresponding routing processing device of each interface unit may be connected by a plurality of physical links or logical paths, and each interface unit may notify an internal identifier information indicating the internal identifier and a type of messages to which the internal identifier will be assigned, to the target interface unit corresponding to the relaying target routing processing device, and attach the internal identifier to each message that is transmitted to the switching unit using the bypass communication channel, and the target interface unit corresponding to the relaying target routing processing device may select a physical link or logical path to be used in outputting each message to the relaying target routing processing device according to the internal identifier information notified for the internal identifier attached to each message received from the bypass communication channel.

Also, in this aspect of the present invention, the internal identifier may be obtained from an information on a content of a prescribed region within each message and/or an input port from which each message is entered, by compressing its information amount to a fixed length.

Namely, the internal identifier of the present invention can be given a role of the intermediary for establishing a mapping between an information for defining the flow to which the message belongs (an information on a content of a prescribed region within the message and/or an input port from which the message is entered) and an information for determining a route at a time of switching the message on the communication channel (destination MAC address, VPI/VCI of ATM, optical wavelength, etc.). At this point, if the internal identifier is formed in a fixed length by compressing the information amount of the flow definition information, even in the case where routing processing devices uses different protocols or different flow definitions, it becomes possible to realize the flow identification within this message relay device in a unified manner using a shorter fixed length information so that it is more convenient.

Note however that the internal identifier of the present invention may be the flow definition information itself, or the information for determining the switching route itself. It is also possible to use a configuration in which the switching unit can determine the switching route of the message from the internal identifier which is valid within this message relay device (such as a configuration in which the internal identifier of a special kind becomes the information for determining the switching route itself).

Also, in this aspect of the present invention, the switching unit may be formed by optical communication paths capable of realizing wavelength division multiplexed burst switching, in which the bypass communication channel is formed according to an optical wavelength, and each interface unit may allocate an optical wavelength to each message entered from the corresponding routing processing device of each interface unit according to the internal identifier, and transmit each message to the switching unit using the optical wavelength allocated to each message.

In this way, by allocating a wavelength according to the internal identifier (the wavelength to be allocated may be determined by a prescribed algorithm according to the internal identifier or the internal identifier itself may indicate the wavelength directly) and realizing the switching using the optical signals as medium, it is also possible to resolve the physical constraint associated with electric circuits, and the throughput of the connection-less network can be improved.

Also, in this aspect of the present invention, each interface unit may have a buffer memory for storing each message in a region provided in correspondence to the internal identifier, and allocate the optical wavelength to the internal identifier when each message stored in the buffer memory satisfies a prescribed condition.

In this way, by allocating the optical wavelength to be used as the communication channel dynamically by using the internal identifier (to which a buffer corresponds) as the intermediary (as in the case where messages to be relayed are actually stored in excess of a prescribed amount, for example). the wavelength resources in this message relay device can be utilized efficiently.

Also, in this aspect of the present invention, each interface unit may select one of a plurality of optical wavelengths, that are allocated in advance as optical wavelengths to be uniquely received by the target interface unit corresponding to the relaying target routing processing device, which is currently not used by other interface units, and transmit each message using said one of the plurality of optical wavelengths.

In this way, by making the transmission wavelength variable (selected at each occasion) while fixing the reception wavelength, it becomes sufficient for each interface unit to receive only the prescribed wavelength so that a configuration of the optical reception unit can be simplified. Here, the fact that the transmission wavelength that is intended to be used from now is not used by the other interface units is checked (by circulating a negotiation message on the ring, for example), so that the switching unit can have a buffer-less configuration.

Also, in this aspect of the present invention, when there are a plurality of relaying target routing processing devices for a certain message, an interface unit which is a source of the certain message may notify to one interface unit corresponding to one relaying target, one optical wavelength selected for said one interface unit and information on other relaying targets, and transmit the certain message using said one optical wavelength, and said one interface unit may transmit a message obtained by copying the certain message received at said one optical wavelength, by using another optical wavelength selected for another interface unit corresponding to one of the other relaying targets.

In this way, it becomes possible to realize the multicast using the bypass communication channel in the case where the reception wavelength is fixed.

Also, in this aspect of the present invention, each interface unit may notify the target interface unit corresponding to the relaying target routing processing device to uniquely receive one optical wavelength among those optical wavelengths for which no collision with other interface units occur, and transmit each message using said one optical wavelength.

In this way, by making both the transmission wavelength and the reception wavelength variable (selected at each occasion), the wavelength resources in this message relay device can be utilized more efficiently. Here, the fact that the transmission wavelength that is intended to be used from now is not causing any collision with the other interface units is checked (by circulating a negotiation message on the ring, for example), so that the switching unit can have a buffer-less configuration.

Also, in this aspect of the present invention, each interface unit may judge an optical wavelength which is currently not used in optical communication paths between each interface unit and the target interface unit corresponding to the relaying target routing processing device, as one of those optical wavelength for which no collision with other interface units occur.

Namely, in the case of making both the transmission wavelength and the reception wavelength variable, the re-utilization of the wavelength becomes possible in this way (the identical wavelength can be used in both an optical communication path from a transmitting interface A to a receiving interface B and an optical communication path from a transmitting interface C to a receiving interface D provided that there is no overlap).

Also, in this aspect of the present invention, when there are a plurality of relaying target routing processing devices for a certain message, a certain interface unit which is a source of the certain message may notify information on other relaying targets at a time of notifying a certain another interface unit corresponding to one relaying target to uniquely receive said one optical wavelength among those optical wavelengths for which no collision with other interface units occur, said certain another interface unit may notify some other interface unit corresponding to one of the other relaying targets to uniquely receive another optical wavelength among those optical wavelengths for which no collision with other interface units occur, and upon receiving the certain message from the certain interface unit at said one optical wavelength notified from the certain interface unit, said certain another interface unit may transmit a message obtained by copying the certain message, by using said another optical wavelength notified to said some other interface unit corresponding to one of the other relaying targets.

In this way, it becomes possible to realize the multicast using the bypass communication channel in the case where the reception wavelength is also variable.

According to another aspect of the present invention there is provided a message relay device connected with a plurality of routing processing devices for carrying out connection-less communications, for relaying a message from one routing processing device to another routing processing device, the message relay device comprising: a plurality of interface units provided in correspondence to the routing processing devices; and a switching unit connecting the plurality of interface units; wherein each interface unit checks an input message entered from a corresponding routing processing device of each interface unit according to a protocol used in the input message, and assigns to the input message an internal identifier which is an identifier defined within the message relay device for identifying at least a target interface unit corresponding to a relaying target routing processing device of the input message, has a buffer for storing the input message until a bypass communication channel from each interface unit toward another interface unit which is capable of transmitting messages assigned with the internal identifier becomes available at the switching unit, transmits the input message stored in the buffer to the switching unit while maintaining a protocol format of the input message as entered, and receives an output message to be outputted to the corresponding routing processing device of each interface unit from the switching unit; and the switching unit switches messages transmitted from one interface unit to another interface unit using the bypass communication channel.

Here, in order to make it possible to accommodate the routing processing devices using different protocols in this message relay device, a processing sensitive to the protocol, that is, a portion for mapping the flow and the internal identifier, is provided in each interface unit, and the message buffering function is provided at this mapping processing side (the switching processing side is made in a buffer-less configuration).

In this way, the interior of the mapping processing portion can carry out the switching using the internal identifier or the communication channel set in correspondence to the internal identifier without becoming conscious of the protocol (by maintaining the protocol format of each message).

According to another aspect of the present invention there is provided a message relay device connected with a plurality of routing processing devices for carrying out connection-less communications, for relaying a message from one routing processing device to another routing processing device, the message relay device comprising: a plurality of interface units provided in correspondence to the routing processing devices; and a switching unit connecting the plurality of interface units using optical rings capable of transmitting optical signals in a plurality of wavelengths by multiplexing the optical signals; wherein each interface unit transmits an input message entered from a corresponding routing processing device of each interface unit, through a communication channel toward a target interface corresponding to a relaying target routing processing device of the input message which is formed by using a wavelength determined according to the input message, receives an output message to be outputted to the corresponding routing processing device of each interface unit from the switching unit by selectively intercepting a wavelength uniquely allocated to each interface unit, and processes an intercepted message intercepted by selectively intercepting a wavelength commonly allocated to the plurality of interface units, according to information indicating an interface unit which is a destination of the intercepted message.

Here, the bypass communication channel is formed and the switching in units of flows is realized using optical signals as medium by using optical rings and allocating a wavelength uniquely to each interface unit. Also, the default communication channel is formed by using a prescribed wavelength that is to be intercepted by every interface unit, and each interface unit checks the intercepted message and carries out the processing such as transmitting the message to a neighboring interface unit (point-to-point with a unit other than own unit as the destination), receiving the message (point-to-point with own unit as the destination), receiving the message while transmitting the message to a neighboring interface unit as well (broadcast or multicast), or receiving the message and analyzing a content of the message in order to transmit it to a neighboring interface by rewriting the content if necessary (ring circulation).

According to another aspect of the present invention there is provided a message relay device connected with a plurality of routing processing devices for carrying out connection-less communications, for relaying a message from one routing processing device to another routing processing device, the message relay device comprising: a plurality of interface units provided in correspondence to the routing processing devices; and a switching unit connecting the plurality of interface units using optical rings capable of transmitting optical signals in a plurality of wavelengths by multiplexing the optical signals; wherein each interface unit transmits an input message entered from a corresponding routing processing device of each interface unit, through a communication channel toward a target interface corresponding to a relaying target routing processing device of the input message which is formed by using a wavelength determined according to the input message, and receives an output message to be outputted to the corresponding routing processing device of each interface unit from the switching unit by selectively intercepting a wavelength uniquely allocated to each interface unit, where a number of wavelengths that can be received at each interface unit is set to be greater than a number of wavelengths that can be transmitted from each interface unit.

Here, the bypass communication channels at each interface unit have the reception capacity that is greater than the transmission capacity so that a possibility for having a collision occurring within the switching unit using the optical rings can be lowered.

According to another aspect of the present invention there is provided a message relay method for relaying a message from one routing processing device to another routing processing device among a plurality of routing processing devices for carrying out connection-less communications, the method comprising the steps of: determining a flow to which each message entered from one routing processing device belongs, according to a prescribed condition, by referring to a content of each message; allocating a message buffer to the flow and storing each message into the message buffer; assigning to the flow a special identifier capable of identifying a relaying target routing processing device of the flow; reading out each message from the message buffer, assigning the special identifier to each message, and transmitting each message to a default communication channel which is formed such that each one of a plurality of connection target routing processing devices judges whether or not to receive each message arrived from the default communication channel according to the special identifier; setting up a bypass communication channel through which each message will be transferred to the relaying target routing processing device, when the message buffer becomes a prescribed state; and switching a transmission target of each message read out from the message buffer from the default communication channel to the bypass communication channel, when the bypass communication channel is set up.

According to another aspect of the present invention there is provided a message relay method for relaying a message from one routing processing device to another routing processing device among a plurality of routing processing devices for carrying out connection-less communications, the method comprising the steps of: entering a multicast connection set up request containing a multicast group address and information on a plurality of destination addresses corresponding to the multicast group address; notifying a set of the multicast group address and the destination addresses to each routing processing device which is a relaying target of a multicast connection, prior to transmission of messages, when messages destined to the multicast group address subsequently arrive from a default communication channel which is formed such that each one of a plurality of connection target routing processing devices judges whether or not to receive each message arrived from the default communication channel according to a value of a destination address region; collecting an information on an order relationship among relaying target routing processing devices on the multicast connection, in conjunction with a notification of the set of the multicast group address and the destination addresses; allocating a message buffer to messages destined to the multicast group address; storing messages destined to the multicast group address which are entered from one routing processing device into the message buffer; reading out each message from the message buffer, and transmitting each message to the default communication channel; setting up a bypass communication channel through which each message will be transferred to the relaying target routing processing devices according to the order relationship, when the message buffer becomes a prescribed state; and switching a transmission target of each message read out from the message buffer from the default communication channel to the bypass communication channel, when the bypass communication channel is set up.

Other features and advantages of the present invention will become apparent from the following description taken in conjunction with the accompanying drawings.

BRIEF DESCRIPTION OF THE DRAWINGS

FIG. 37 is a schematic diagram for explaining an operation using a route selection message in the message relay device of FIG. 27.

FIG. 38 is a diagram showing an exemplary configuration of an internal route information holding table used in the message relay device of FIG. 27.

FIG. 39 is a sequence chart for explaining an exemplary message transfer during an address resolution protocol execution in the message relay device of FIG. 27.

DETAILED DESCRIPTION OF THE PREFERRED EMBODIMENTS

Now, the preferred embodiments of the present invention will be described in detail with references to the drawings.

First, an outline of the operation of a message relay device according to the present invention will be described conceptually.

Figure 1:
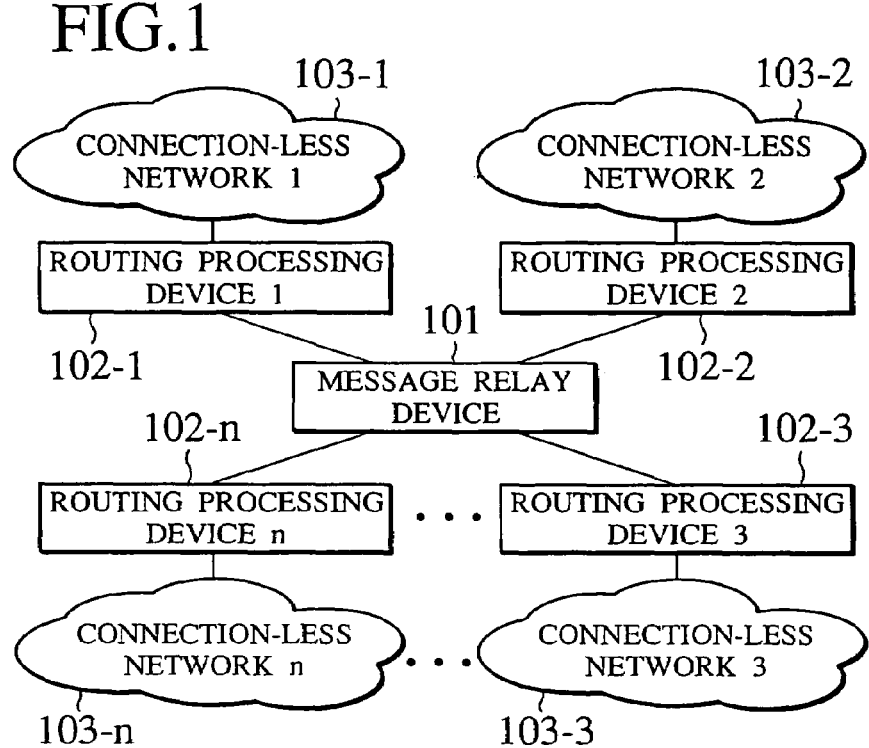
FIG. 1 is a schematic block diagram showing a configuration of a ultra-high-speed message relaying system using a message relay device according to one embodiment of the present invention.

FIG. 1 shows a configuration of a ultra-high-speed message relaying system formed by using a message relay device according to one embodiment of the present invention. This message relaying system of FIG. 1 comprises a message relay device 101, routing processing devices 102-1 to 102-n, and connection-less networks 103-1 to 103-n. The routing processing device 102-x is connected with another routing processing device 102-y through the message relay device 101, and this message relay device 101 plays a role of providing the required bandwidth between arbitrary routing processing devices 102-i that is continually changing in time.

Upon receiving a message, each routing processing device 102-x extracts a destination address of that message, and obtains a next hop address of that message by referring to a routing table that holds the extracted destination address as a key. If that message is not to be transmitted to the connection-less network 103-x accommodated by the own device, the routing processing device 102-x gives that message to the message relay device 101. The message relay device 101 then transfers that message to appropriate routing processing device 102-y according to the algorithm described in detail below. When this operation is carried out by every routing processing device 102-i, the message transfer among the connection-less networks 103-i via the message relay device 101 can be realized.

As described in detail below, the message transfer at the message relay device 101 is designed such that the processing that must be carried out for every message is reduced considerably compared with that of the conventional routing processing device, so that it is possible to realize the high throughput more easily compared with the conventional routing processing device.

Also, as described in detail below, the message transfer at the message relay device 101 is designed such that the throughput of the message relay device 101 can be allocated dynamically to a message transmission toward the routing processing device 102-i according to the need so that it is possible to provide the required bandwidth between arbitrary routing processing devices 102-i that is continually changing in time.

Figure 57:
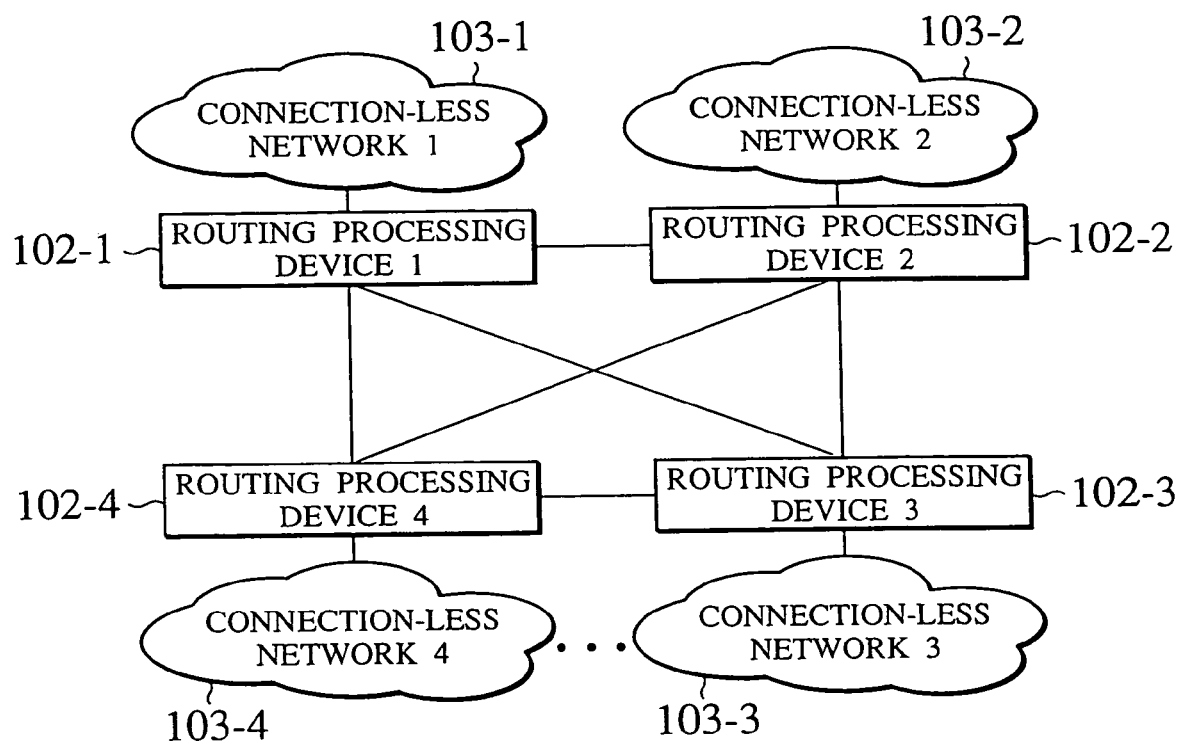
FIG. 57 is a schematic diagram showing a configuration of a conventional message relaying system.
Figure 58:
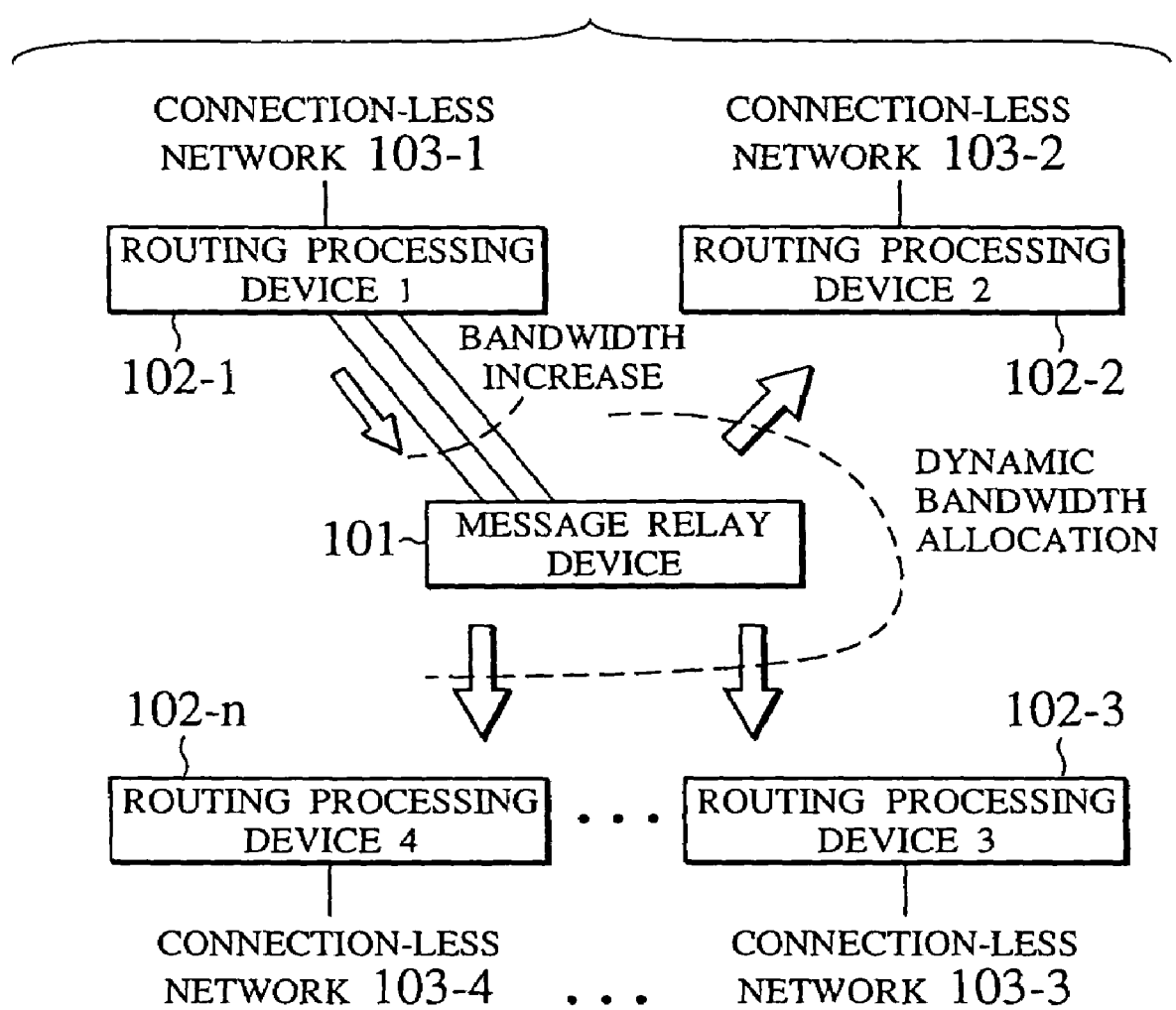
FIG. 58 is a schematic diagram for explaining a bandwidth allocation among routing processing devices in the ultra-high-speed message relaying system of FIG. 1.

Also, a conventionally used mesh connection among the routing processing devices as shown in FIG. 57 is replaced by a star connection centered around the message relay device 101 as shown in FIG. 58, so that all the physical links that are conventionally used for connecting the routing processing devices can be connected to the message relay device 101. In this way, it becomes possible to reduce time and effort required for the physical link wiring among the routing processing devices considerably, while it is also possible to temporarily allocate a larger bandwidth between arbitrary routing processing devices 102-i and 102-j compared with the conventional mesh connected routing processing devices, by utilizing the multi-link connection technique to be described below. As a result, it is possible to shorten a length of a queue that holds messages to be transmitted to one connection-less network 103-i at one routing processing device 102-x so that the message delay time can be suppressed small.

Figure 2:
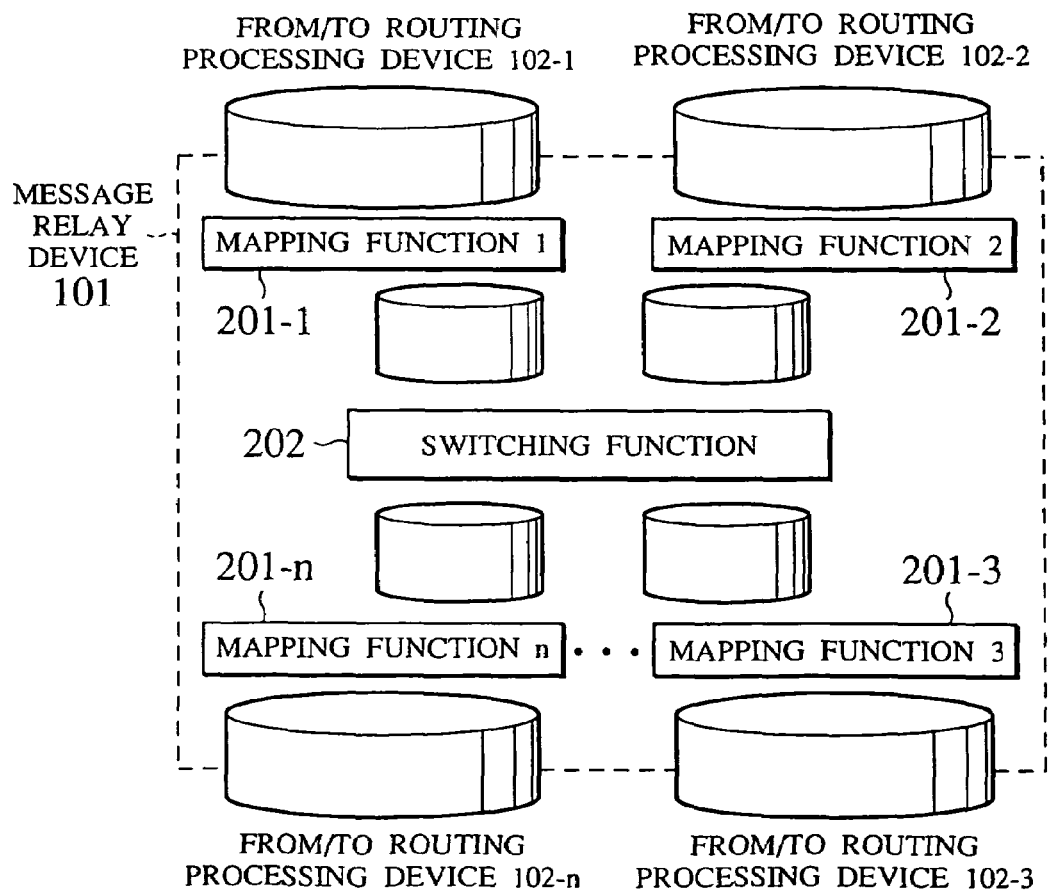
FIG. 2 is a schematic block diagram showing one exemplary configuration of a message relay device according to one embodiment of the present invention.

FIG. 2 shows a conceptual configuration of the message relay device according to one embodiment of the present invention. The message relay device of this embodiment includes mapping functions 201-i that are provided in correspondence to the routing processing devices 102-i that are connected with the message relay device, and a switching function 202 for carrying out the message relaying by connecting between the mapping functions 201-i.

The mapping function 201-i has a role of detecting a "flow" by applying the prescribed algorithm to be described in detail below with respect to a message flow given from the routing processing device 102-i and determining a flow to which each message belongs. On the other hand, the switching function 202 carries out the switching of messages belonging to each flow detected by each mapping function in units of flows, for the purpose of providing the ultra-high-speed switching between the mapping functions 201-i. Here, the "flow" is a group of messages that are to be switched at the switching function 202 toward the same mapping function 201-y among a group of messages that arrive at one mapping function 201-x, or a group of messages that satisfy prescribed conditions among such a group of messages. Once the flow is detected at the mapping function 201-i, the switching function 202 carries out the switching in units of flows rather than the switching in units of messages, so that the processing with respect to each one of the group of messages belonging to that flow can be reduced considerably.

Figure 3:
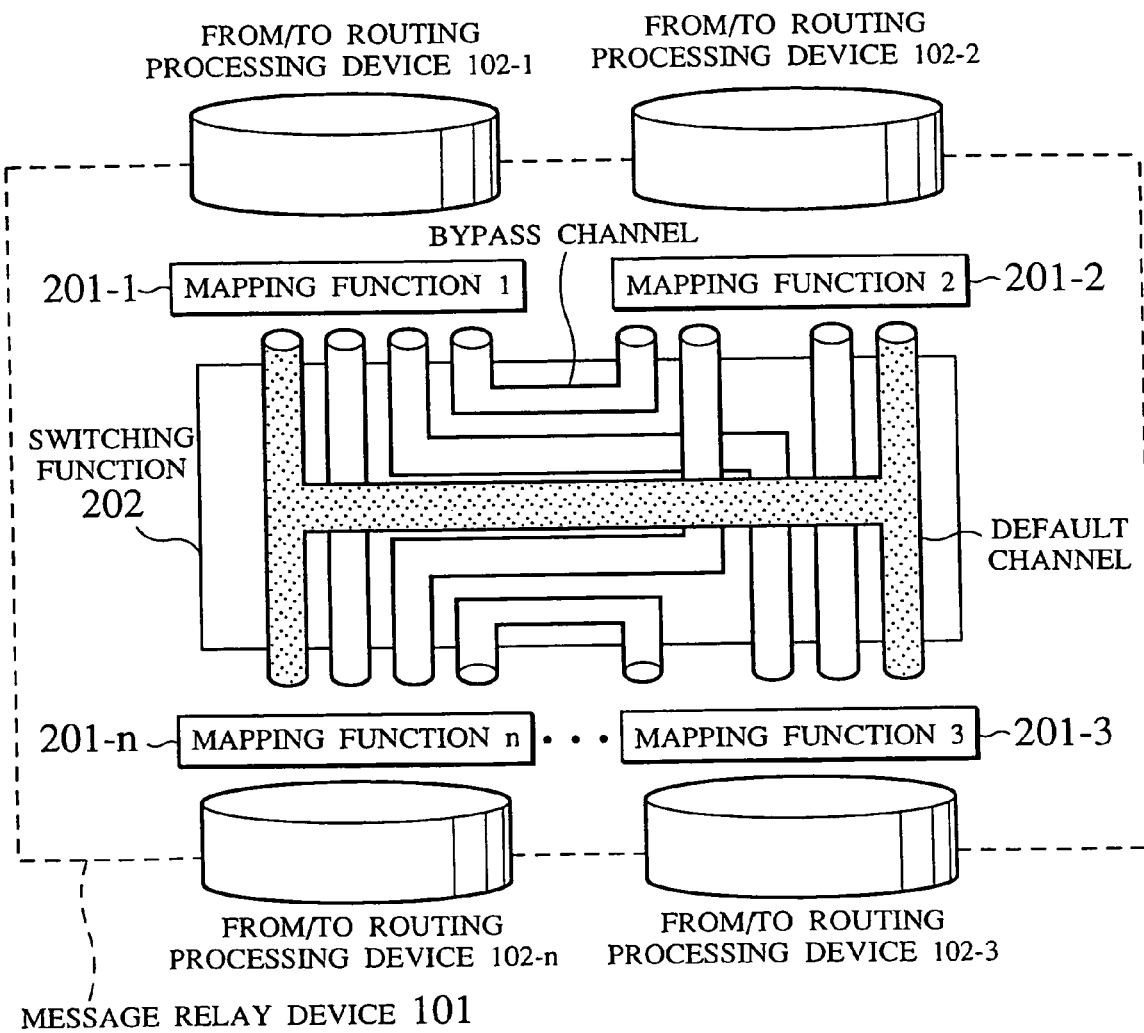
FIG. 3 is a schematic diagram showing the operation of the message relay device of FIG. 2.

FIG. 3 shows the operation of the switching function 202 of the message relay device 101 according to this embodiment conceptually. As shown in FIG. 3, the switching function 202 has a default channel and bypass channels set up therein.

The default channel is a communication path that is always provided by the switching function 202 with respect to each mapping function 201-i. In the default channel, communications based on broadcast are carried out basically. A message transmitted by one mapping function 201-x to the default channel will be transferred to all the other mapping functions 201-y. Upon receiving a message from the default channel, each mapping function 201-i carries out the operation as described in detail below in order to judge whether that message is destined to the own device or not and take the message destined to the own device (the destination address check). Using this channel, the control within the message relay device and the transfer of messages that are not set in correspondence to flows are carried out.

On the other hand, the bypass channel is a communication path that is set up between the mapping functions 201-i and 201-j specified within the switching function 202 according to an external control. In each bypass channel, the point-to-point communications between two mapping functions 201-i and 201-j are carried out basically. When one mapping function 201-x sends a message destined to another mapping function 201-y toward a bypass channel reaching to that mapping function 201-y, the message is transferred to that mapping function 201-y via the bypass channel. Here, unlike the default channel, it is guaranteed that the message received from the bypass channel is always destined to that mapping function 201-y, provided that only messages destined to the exit side of that bypass channel are to be transmitted to that bypass channel at a time of message input to the bypass channel, so that the destination address check becomes unnecessary for those messages which are transferred via the bypass channel. The message relay device 101 of this embodiment reduces the number of table accesses required at a time of receiving each message and thereby improves the overall throughput according to this principle.

Figure 4:
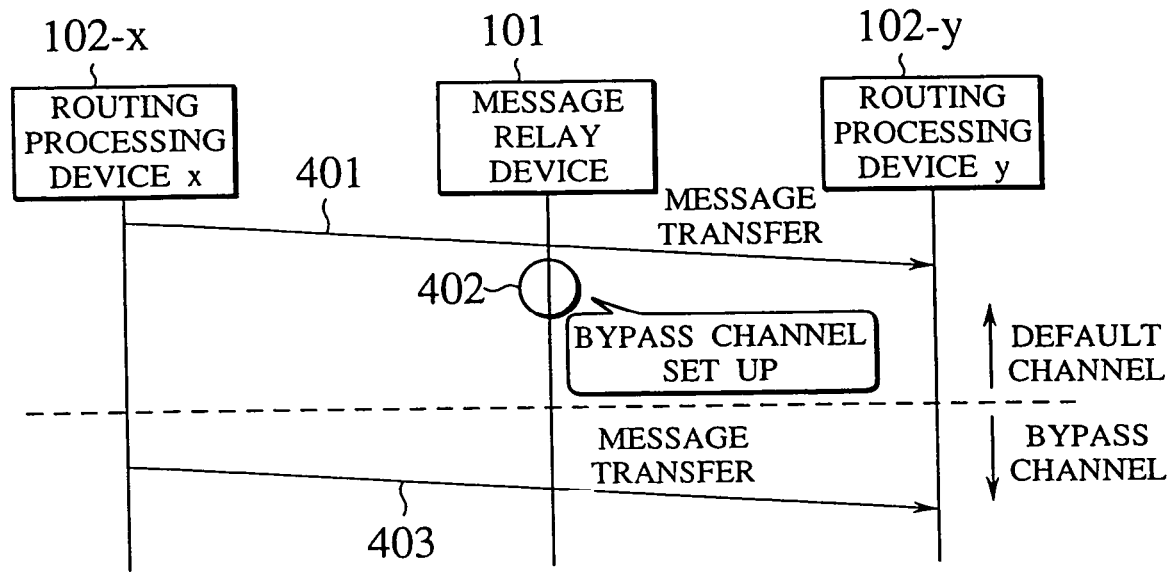
FIG. 4 is a sequence chart showing an exemplary cooperative operation of a message relay device and routing processing devices according to one embodiment of the present invention.

In the message relay device 101 of this embodiment, the default channel and the bypass channels are separately used as shown in FIG. 4. In the case of carrying out the message transfer from one routing processing device 102-x to another routing processing device 102-y via the message relay device 101, the message transfer is carried out by using the default channel at a beginning of that communication (401). The mapping function 201-x is monitoring this message transfer and, when a flow is detected as conditions to be described below are satisfied, the mapping function 201-x sets up the bypass channel inside the message relay device 101 in correspondence to that flow (402). When the bypass channel corresponding to that flow is set up, the mapping function 201-x transmits subsequent messages belonging to that flow to that bypass channel (403). The bypass channel set up 402 and the change of the communication path to be used for the message transfer from the default channel to the bypass channel is concealed from the routing processing devices 102-x and 102-y. In this way, it is possible to construct a ultra-high-speed message relaying system using the message relay device 101 of this embodiment without installing any special protocol with respect to the routing processing devices 102-i.

Next, the operation principle of the message relay device 101, the definition of the flow, and a procedure for processing the flow within the message relay device 101 according to this embodiment will be described. The definition of the flow can be different depending on properties of the protocol used for communications between the routing processing device 102-i and the message relay device 101 or the number of physical links accommodated at the mapping function 201-i, and one of the major features of the message relay device 101 of this embodiment is that various protocols can be accommodated flexibly and the number of physical links to be accommodated at the mapping function 201-i can be set up flexibly.

Figure 5:
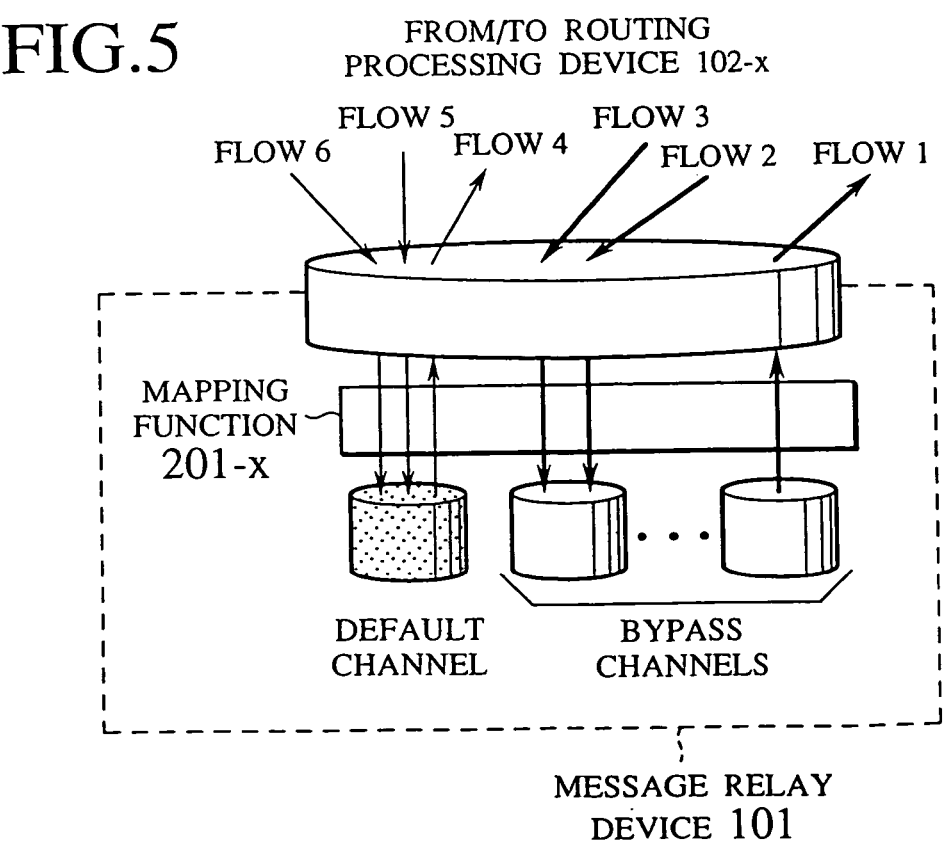
FIG. 5 is a schematic diagram showing the operation at a mapping function in the message relay device of FIG. 2.

First, the operation in the case where a connection between the message relay device 101 and the routing processing device 102-i is provided by Ethernet and the number of physical links accommodated at the mapping function is one will be described conceptually. In this case, the processing carried out at one mapping function 201-x is conceptually as shown in FIG. 5. Namely, the mapping function 201-x carries out the processing in which a flow is extracted from a message entered from the routing processing device 102-x and this message is transferred to the bypass channel if the bypass channel corresponding to the extracted flow is already set up, or to the default channel otherwise, while messages received from the default channel and the bypass channels are transferred to the routing processing device 102-x.

Namely, the mapping function 201-x carries out the processing to determine the flow to which the entered message belongs as well as a channel of the switching function 202 to which the flow is to be transmitted, and transmit messages belonging to that flow to the determined channel, while also transferring messages received from each channel of the switching function 202 to the routing processing device 102-x. In the exemplary case shown in FIG. 5, the flow 2, flow 3, flow 5 and flow 6 are entered from the routing processing device 102-x to the mapping function 201-x. Messages belonging to the flow 5 and flow 6 are transmitted to the default channel while messages belonging to the flow 2 and flow 3 are transmitted to the bypass channel. In this exemplary case, plural flows are mapped into a single bypass channel. It is possible to map plural flows into a single bypass channel as in this example in order to reduce the overhead due to the bypass channel set up. This technique can be adopted in the case where plural flows are to be transferred to the same mapping function 201-y.

On the other hand, the flow 1 and flow 4 are transmitted to the routing processing device 102-x. The flow 1 is received messages from the bypass channel while the flow 4 is received messages from the default channel. As described above, the destination address check is carried out for the messages belonging to the flow 4 and the messages belonging to the flow 4 are selected and transmitted to the routing processing device 102-x. Note that, in this case, only one physical link is accommodated at the mapping function 201-x so that there is no need for the identification of the physical link at the mapping function 201-x along a transfer direction from the mapping function 201-x to the routing processing device 102-x.

Figure 6:
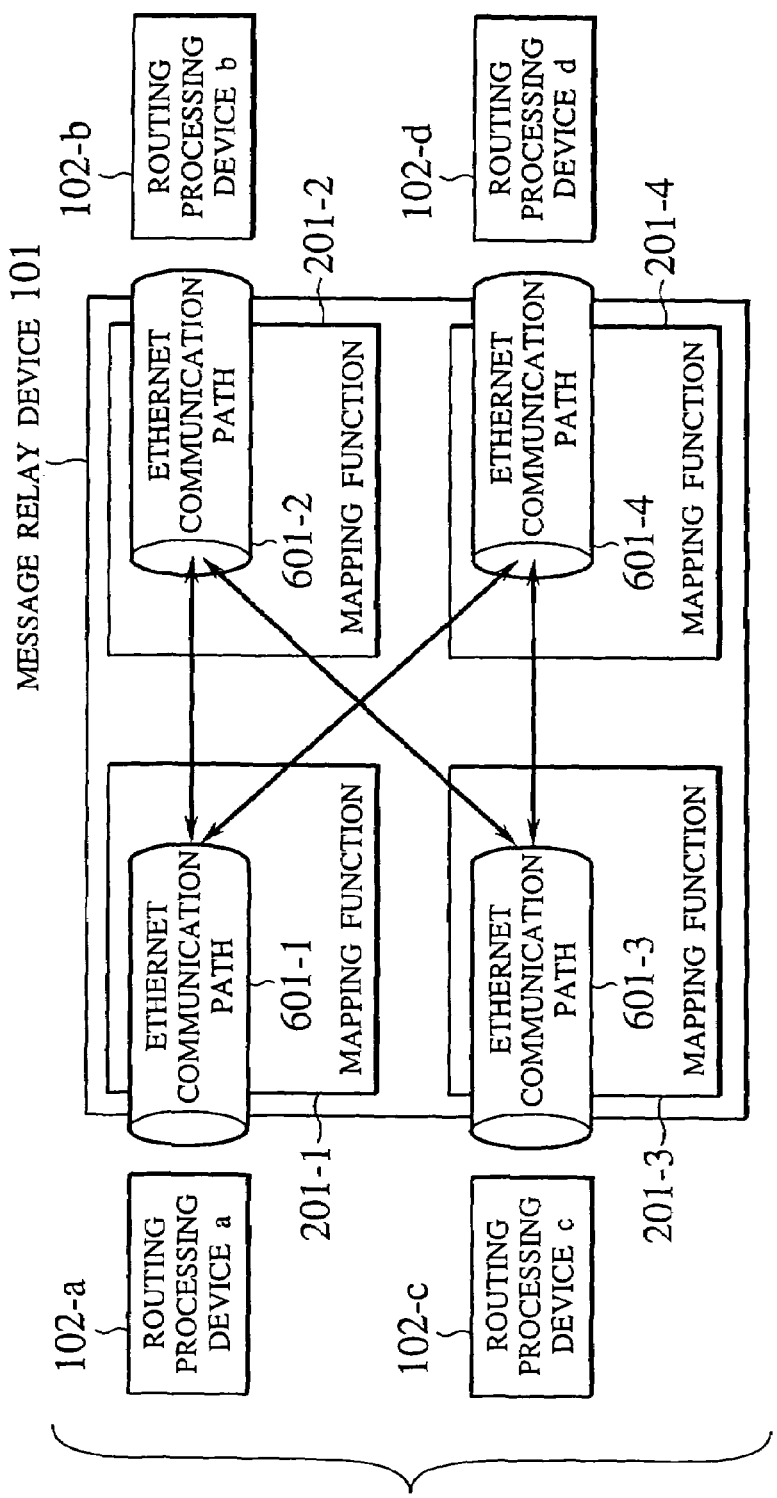
FIG. 6 is a schematic diagram showing the operation of the message relay device of FIG. 2 in the case where a connection between the message relay device and a routing processing device is Ethernet.

In the case where each-mapping function 201-x accommodates a single Ethernet communication path, it is possible to provide the message switching among a plurality of routing processing devices 102-x, as shown in FIG. 6. In this case, the message switching may be carried out by using Ethernet address. Here, there is a need to identify each Ethernet communication path 601-x inside the message relay device 101, but this can be realized by manually assigning an Ethernet address to each Ethernet communication path 601-x or referring to the source address field of an Ethernet frame transmitted from the routing processing device 102-x and assigning an Ethernet address contained in that source address field to the Ethernet communication path 601-x, and regarding the assigned Ethernet address as the identifier of the Ethernet communication path 601-x.

Figure 7:
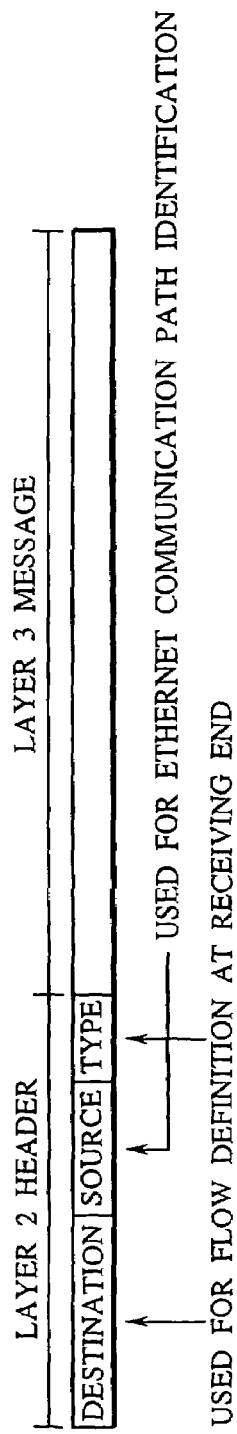
FIG. 7 is a diagram showing a flow definition information used in the message relay device of FIG. 2 in the case where a connection between the message relay device and a routing processing device is Ethernet.

In this case, the flow may be defined as follows. Namely, Ethernet frames having an identical destination address at a receiving end that are transmitted from the routing processing device 102-i can be defined as one flow. In this case, the flow definition information, i.e., information used in defining the flow, may contain the destination address contained in the layer 2 header of an Ethernet frame, as shown in FIG. 7. It is also possible to use the protocol type of the protocol executed on an Ethernet frame for the flow definition. By defining the flow by referring to the type field, it becomes possible to change the processing at the message relay device 101 according to the layer 3 protocol type. The situation where this function becomes useful will be described later on.

Next, the operation in the case where a connection between the message relay device 101 and the routing processing device 102-i is provided by Ethernet and the number of physical links accommodated at the mapping function is plural will be described conceptually. In this case, it is possible to operate each physical link independently from each other, but it is also possible to use a plurality of physical links for a connection between the message relay device 101 and a single routing processing device 102-x so as to enlarge the communication bandwidth between the message relay device 101 and the routing processing device 102-x by carrying out the so called multi-link connection.

Figure 8:
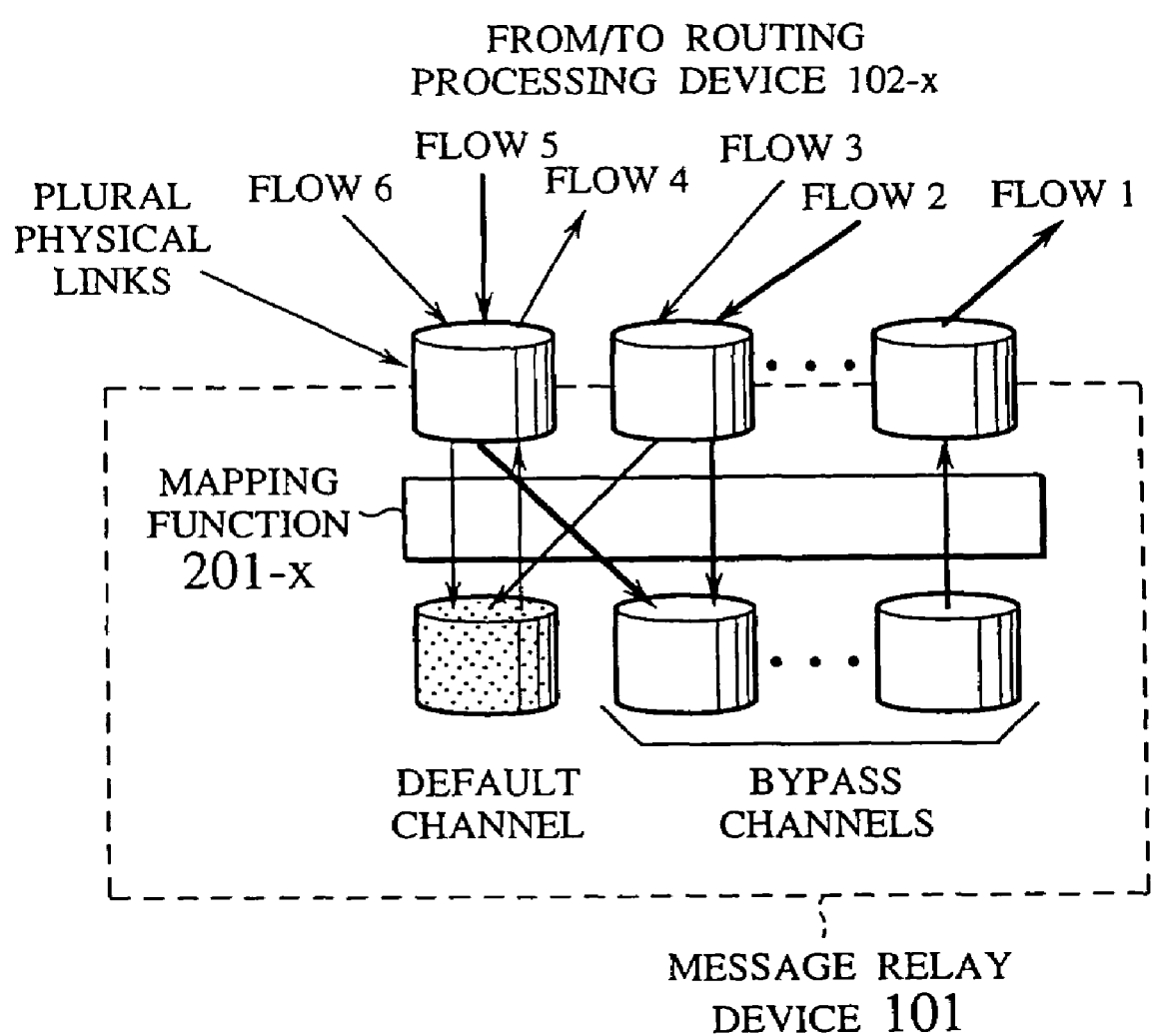
FIG. 8 is a schematic diagram showing the operation at a mapping function in the message relay device of FIG. 2 in the case where a plurality of physical links are connected.

In this case, the processing carried out at one mapping function 201-x is conceptually as shown in FIG. 8. Namely, similarly as in the case of accommodating a single physical link shown in FIG. 5, the mapping function 201-x carries out the processing in which a flow is extracted from a message entered from the routing processing device 102-x and this message is transferred to the bypass channel if the bypass channel corresponding to the extracted flow is already set up, or to the default channel otherwise.

On the other hand, in the direction from the mapping function 201-x to the routing processing function 102-x, at a time of transferring a message received from the default channel or the bypass channel to the routing processing device 102-x, there is a need to carry out the selection of a physical link to which a message is to be transmitted, in addition to what is done the case shown in FIG. 5. In the exemplary case shown in FIG. 8, the flow 2, flow 3, flow 5 and flow 6 are entered from the routing processing device 102-x to the mapping function 201-x. Messages belonging to the flow 3 and flow 6 are transmitted to the default channel while messages belonging to the flow 2 and flow 5 are transmitted to the bypass channel. On the other hand, the flow 1 and flow 4 are transmitted to the routing processing device 102-x. The flow 1 is received messages from the bypass channel while the flow 4 is received messages from the default channel. Messages belonging to the flow 1 and messages belonging to the flow 4 are transmitted to different physical links.

Figure 9:
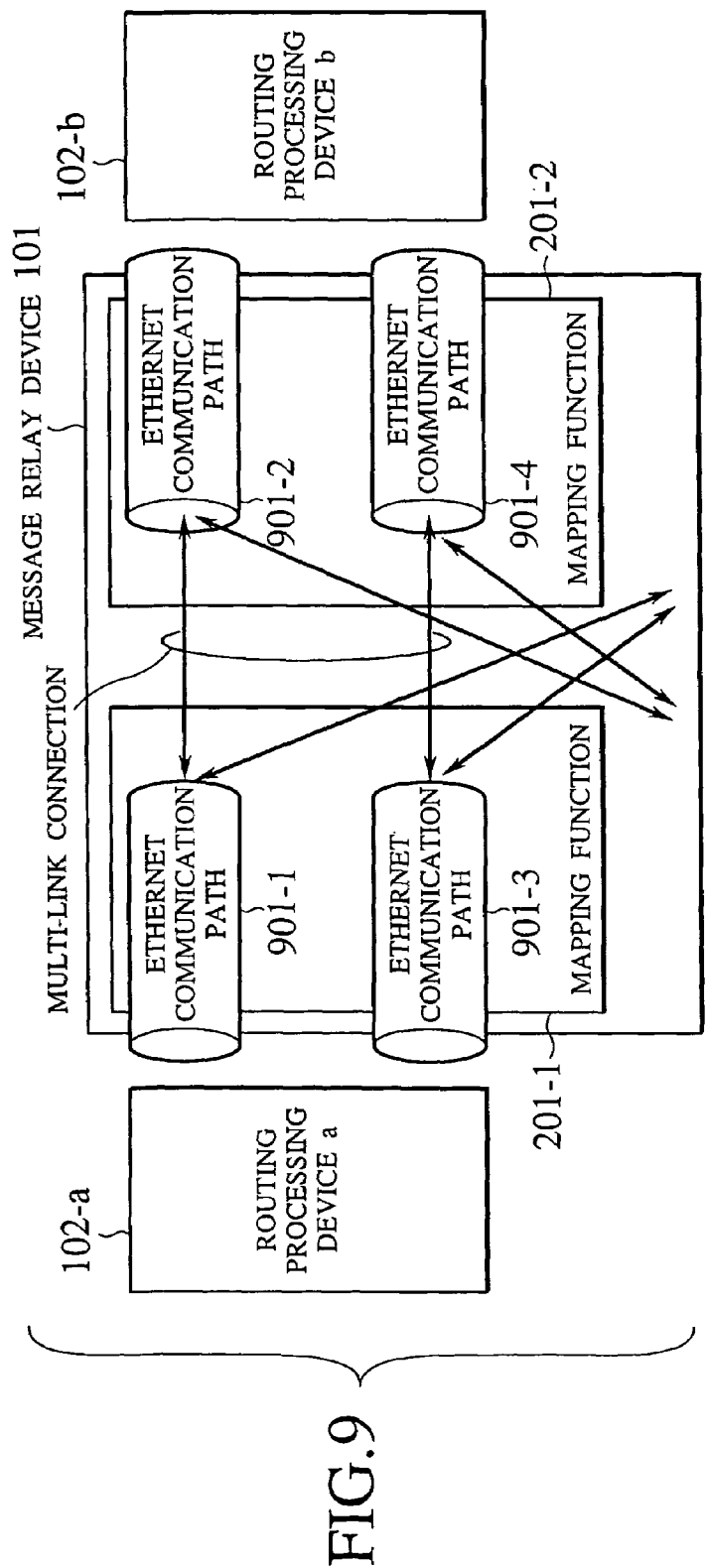
FIG. 9 is a schematic diagram showing the operation of the message relay device of FIG. 2 in the case where a connection between the message relay device and a routing processing device is a plurality of Ethernet cables.

In the case where each mapping function 201-x accommodates plural Ethernet communication paths, it is possible to provide the message switching among a plurality of routing processing devices 102-x, as shown in FIG. 9, similarly as in the case of accommodating a single Ethernet communication path. In this case, the message switching may be carried out by using Ethernet address, and an Ethernet address may be used for the identification of each Ethernet communication path 901-x, similarly as in the case of accommodating a single Ethernet communication path. Also, regarding the flow definition, Ethernet frames having an identical destination address may be defined as a single flow. Here, however, in the case where the routing processing device 102-x provides the multi-link function described above, it is preferable to supplement the flow definition information by an identifier (physical link number) defined within the message relay device of this embodiment, which is assigned to the entered Ethernet communication path and which will be described below. The reason for this is the following.

Figure 10:
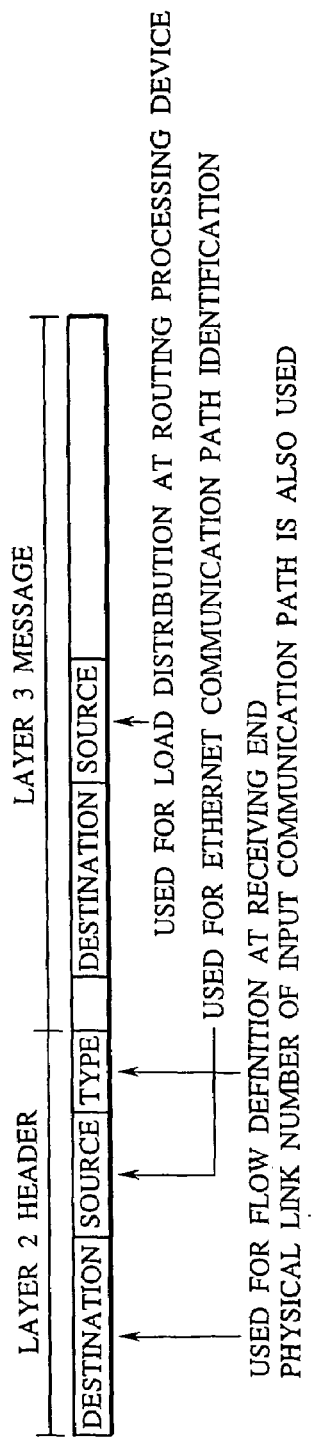
FIG. 10 is a diagram showing a flow definition information used in the message relay device of FIG. 2 in the case where a connection between the message relay device and a routing processing devices is a plurality of Ethernet cables.

In the case of carrying out the multi-link connection, the routing processing device 102-x carries out the processing for transmitting each one of messages having an identical next hop address by selecting one of a plurality of physical links so as to balance the load exerted on each physical link. There are various methods available for this load balancing, including an algorithm in which the source address of the layer 3 message is used as shown in FIG. 10 such that one source address selects one Ethernet communication path 901-1 while another source address selects another Ethernet communication path 901-3, for example. In this case, the message relay device 101 fixes the transmission target Ethernet communication path for messages entered from one Ethernet communication path. For example, in FIG. 9, among messages destined to the routing processing device 102-b, those entered from the Ethernet communication path 901-1 will be fixedly transferred to the Ethernet communication path 901-2 while those entered from the Ethernet communication path 901-3 will be fixedly transferred to the Ethernet communication path 901-4, so that the physical link selection at the mapping function 201-x can be executed at the message relay device 101 by preserving the result of the load distribution at the routing processing device 102-x. As a result, it is possible to reduce the processing for each message at the mapping function 201-x considerably, so that it can contribute to the realization of the high throughput at the message relay device 101.

In this case, the flow will be defined for each Ethernet communication path 901-x by reflecting the form of message relaying within the device, so that the physical link number of the input physical link becomes necessary as the information for defining the flow in addition to the destination address in the layer 2 header of Ethernet frame. Note that, in this case, at the mapping function 201-y at a receiving end of the flow that is transferred via the switching function 202, the physical link to be used for transmission should preferably be selected for each flow. For this physical link selection, an internal label (to be described in detail below) which is an identifier of a flow that is valid only inside the message relay device of this embodiment can be used.

As the information to be included in the flow definition information in order to reflect the input physical link on the output physical link selection, the physical link number of the input physical link is not an only candidate. For example, the source address of the layer 3 message or the source address of the layer 2 header can also be candidates as in the processing at the routing processing device 102-x. However, from a viewpoint of compressing the bit length of the flow definition information and thereby improving the throughput by using a faster memory element, it is preferable to use the physical link number which is valid only inside the message relay device 101 of this embodiment, rather than using information with a relatively long bit length such as the layer 3 address or the layer 2 address.

Next, the case in which a plurality of logical paths can be set up on the physical link between the message relay device 101 and the routing processing device will be described. As a protocol for such a physical link, SDH and ATM are known, for example. Also, even in the case of Ethernet described so far, when different flows are to be allocated to different protocols at the type field in the layer 2 header of Ethernet frame or when different flows are to be allocated to different port numbers of TCP, it is possible to regard that a logical path is set up on a physical link for each protocol or for each port number of TCP or UDP. By regarding flows as different for different protocols or port numbers of TCP or UDP in this way, it becomes possible for the message relay device 101 of this embodiment to execute more sophisticated control, such as that for raising the transfer priority level for messages belonging to some protocol higher than the other protocols or that for raising the transfer priority level for messages having some special port number. Hereafter, the exemplary case of regarding that a plurality of logical paths are set up in the physical link of Ethernet will be described.

Figure 11:
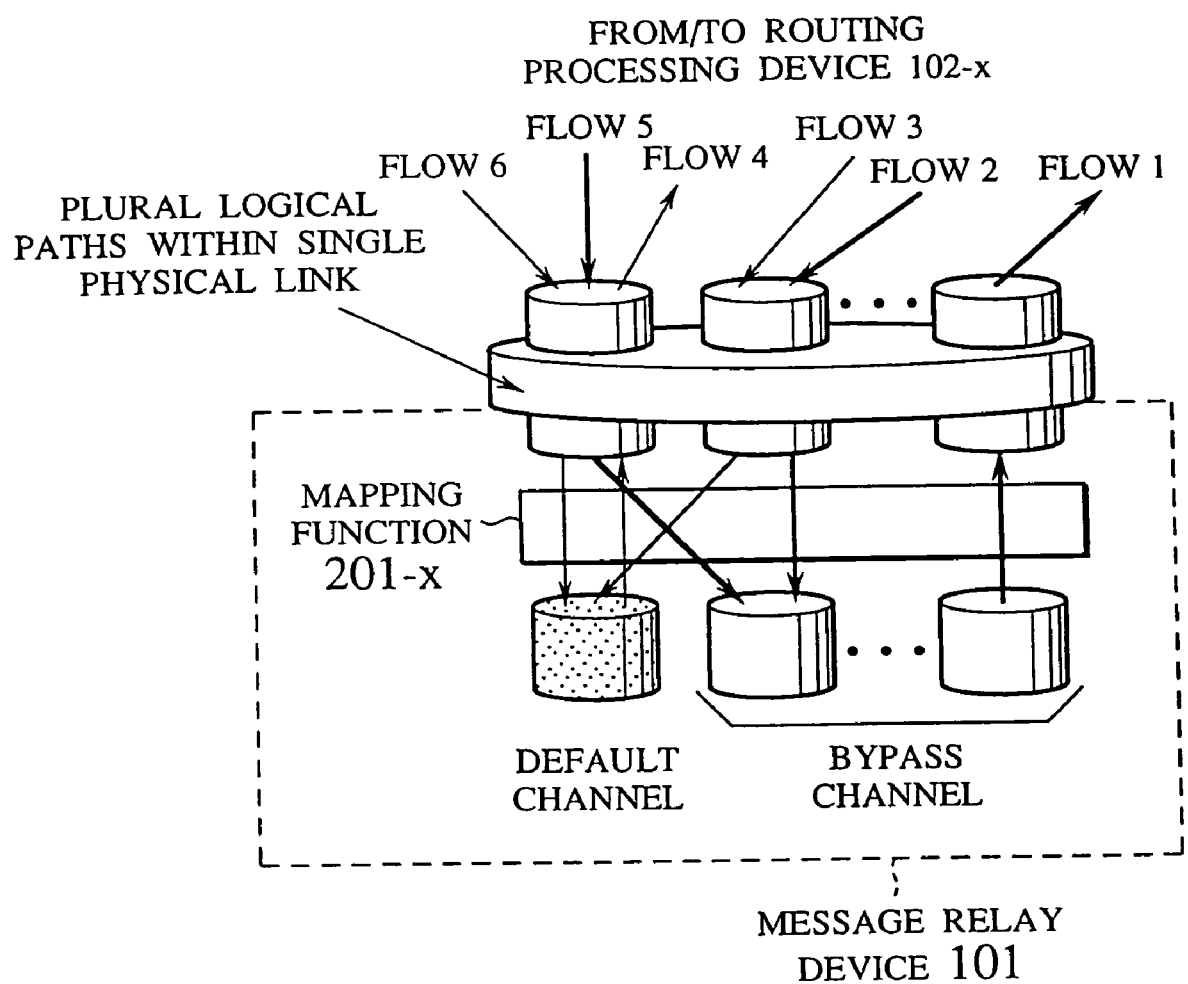
FIG. 11 is a schematic diagram showing the operation at a mapping function in the message relay device of FIG. 2 in the case where a plurality of logical paths can be set within a single physical link.

In this case, the processing carried out at one mapping function 201-x is conceptually as shown in FIG. 11. For a direction from the routing processing device 102-x to the mapping function 201-x, similarly as in the case of accommodating a single physical link shown in FIG. 5, the mapping function 201-x carries out the processing in which a flow is extracted from a message entered from the routing processing device 102-x and this message is transferred to the bypass channel if the bypass channel corresponding to the extracted flow is already set up, or to the default channel otherwise.

On the other hand, in the direction from the mapping function 201-x to the routing processing device 102-x, a time of transferring a message received from the default channel or the bypass channel to the routing processing device 102-x, there is a need to carry out the selection of a logical path, as can be guessed from an analogy to the case of accommodating a plurality of physical links shown in FIG. 8. In the exemplary case shown in FIG. 11, the flow 2, flow 3, flow 5 and flow 6 are entered from the routing processing device 102-x to the mapping function 201-x. Messages belonging to the flow 3 and flow 6 are transmitted to the default channel while messages belonging to the flow 2 and flow 5 are transmitted to the bypass channel. On the other hand, the flow 1 and flow 4 are transmitted to the routing processing device 102-x. The flow 1 is received messages from the bypass channel while the flow 4 is received messages from the default channel. Messages belonging to the flow 1 and messages belonging to the flow 4 are transmitted to different logical paths.

Note here that the logical paths described here are regarded as being formed by information such as the type field of the layer 2 header, the source field of the header portion of the layer 3 message, and the port number of the layer 4 header that is contained in the information section of the layer 3 message, so that there is no processing regarding logical path selection that must be carried out at the mapping function 201-x. However, there are cases where the processing regarding the logical path selection is required to the mapping function 201-x depending on the protocol on the physical link, such as rewriting VPI/VCI according to the scheme adopted by ATM in the case where VP or VC of ATM is regarded as a logical path or placing a virtual container received from the default/bypass channel at a desired position in the transmitting side frame in the case where a virtual container of SDH is regarded as a logical path.

Figure 12:
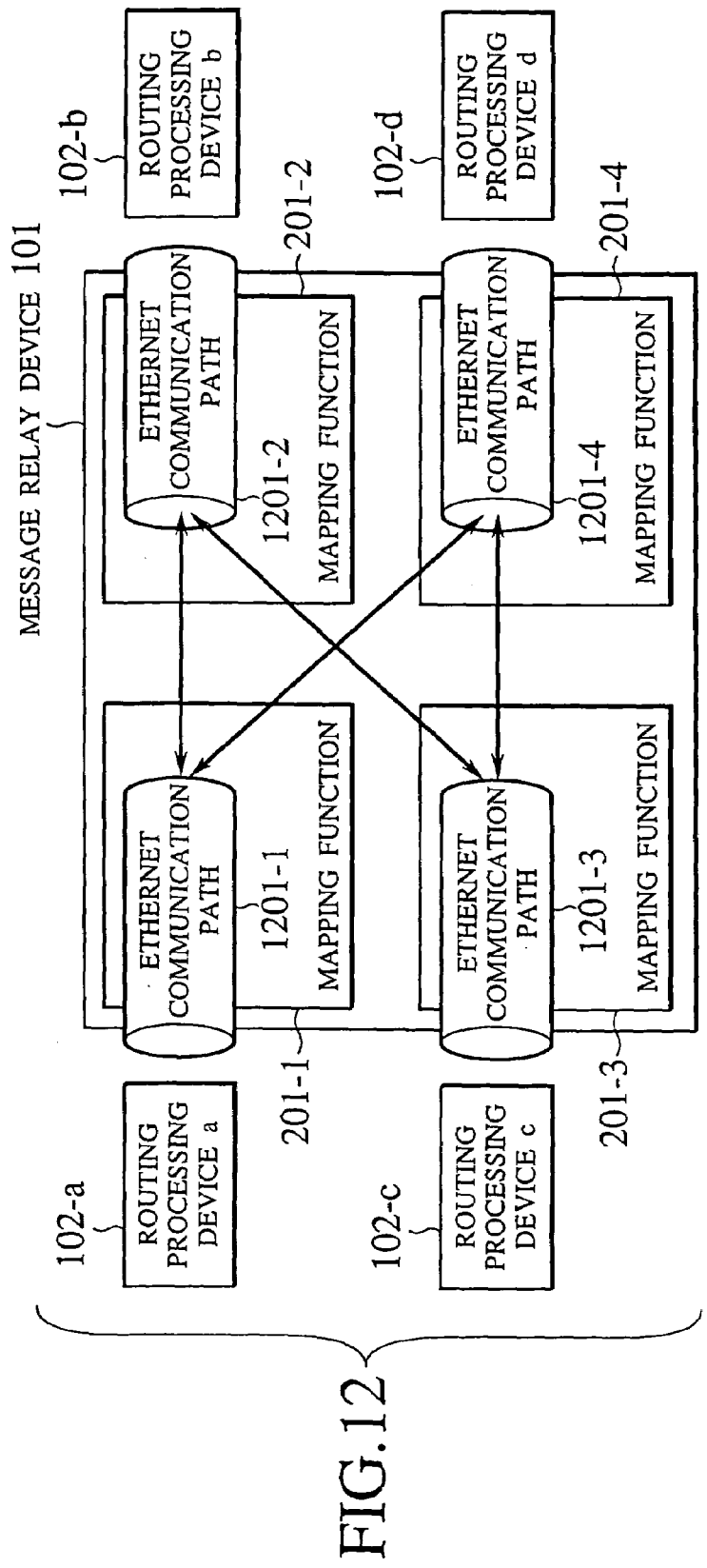
FIG. 12 is a schematic diagram showing the operation of the message relay device of FIG. 2 in the case where a connection between the message relay device and a routing processing device is Ethernet and a plurality of logical paths are defined within Ethernet.
Figure 13:
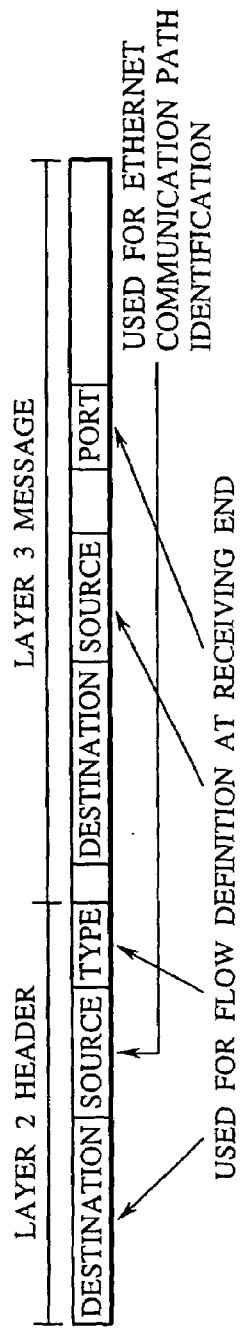
FIG. 13 is a diagram showing a flow definition information used in the message relay device of FIG. 2 in the case where a connection between the message relay device and a routing processing devices is Ethernet and a plurality of logical paths are defined within Ethernet.

Even in the case where a plurality of logical paths are to be accommodated in a single physical link, when the protocol is Ethernet, it is possible to provide the message switching among a plurality of routing processing devices 102-x, as shown in FIG. 12, similarly as in the case of accommodating a single Ethernet communication path. In this case, the message switching may be carried out by using Ethernet address, and an Ethernet address may be used for the identification of each Ethernet communication path 901-x, similarly as in the case of accommodating a single Ethernet communication path. Also, in this case, the flow definition information becomes more detailed, and the flow will be defined by using the destination address in the layer 2 header, the type field, the source address of the layer 3 message, and the port number of the layer 4 contained in the information section of the layer 3 message, as shown in FIG. 13.

The examples described so far are directed to the case where each message has an identifier of a destination physical link as a destination field of the layer 2 header. In this case, by allocating appropriate identifier to each physical link, the message relay device 101 of this embodiment can provide the switching at the layer 2 level.

Figure 14:
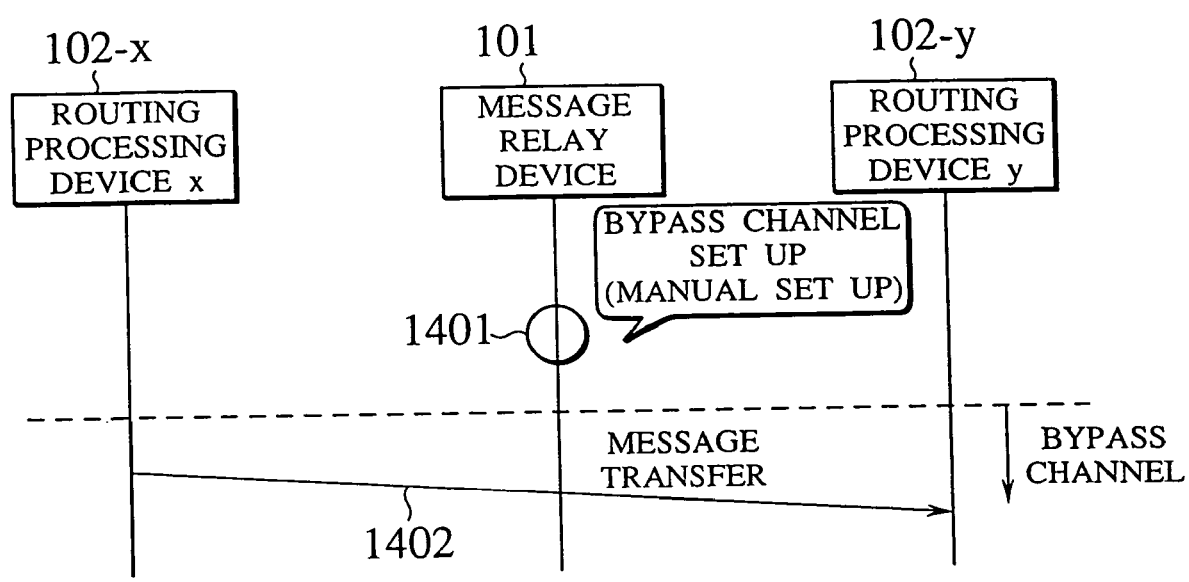
FIG. 14 is a sequence chart showing another exemplary cooperative operation of a message relay device and routing processing devices according to one embodiment of the present invention.

Now, the protocol currently used in connecting between the routing processing devices 102-i and 102-j is not necessarily limited to that in which information element of each message contains an identifier of a physical link available for switching. For example, in the case of a protocol called PPP, a header portion does not contain an identifier of an available physical link so that the switching at this level is impossible. Such a protocol can be accommodated at the message relay device 101 of this embodiment as shown in FIG. 14, by setting up the bypass channel in advance (1401) before the communications between the routing processing devices 102-x and 102-y start (1402). In addition, a bypass channel to which the received message is to be transmitted is set up in advance at each mapping function 201-i. These settings may be made manually by a manager of the message relay device of this embodiment, for example.

Figure 15:
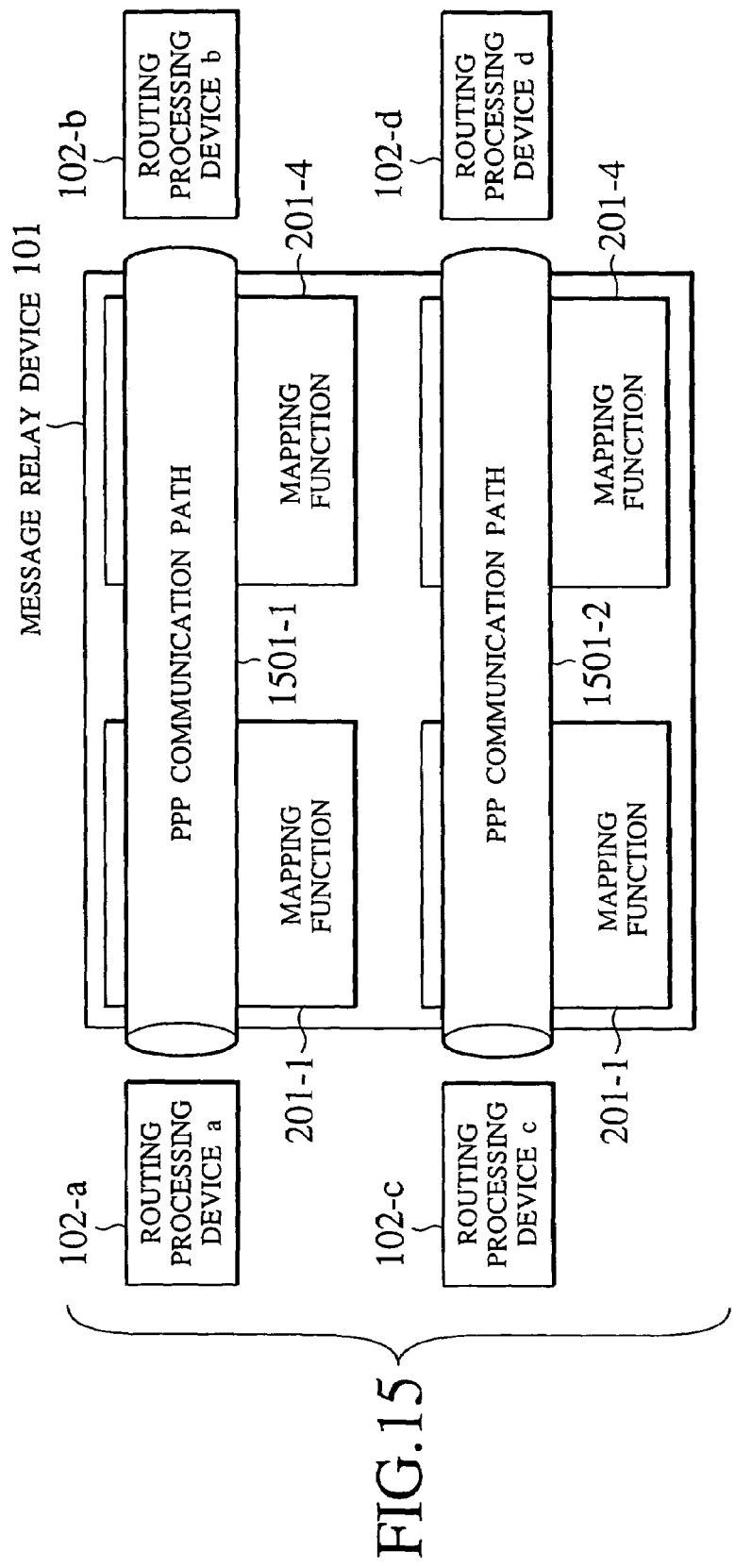
FIG. 15 is a schematic diagram showing the operation of the message relay device of FIG. 2 in the case where a connection between the message relay device and a routing processing device is PPP.

In this way, the fixed communication path using the bypass channel is provided between the specified mapping functions 201-x and 201-y. The bypass channel set up in this case will be carried out using the physical link number, and the physical link number will be also used for the flow identification. This case takes a form as shown in FIG. 15 in which PPP communication paths 1501-1 and 1501-2 are set up fixedly between the routing processing devices. This example appears to take a form in which the physical link connecting between the routing processing functions 102-x in the conventional ultra-high-speed message relaying system shown in FIG. 57 is replaced by the PPP communication path 1501-x that passes through the message relay device 101, but even in this case, each PPP communication path 1501-x can be allocated with a wider bandwidth than the conventional case of mesh connection among the routing processing functions 102-i according to the need, so that one of the objects of the present invention can be achieved.

Figure 16:
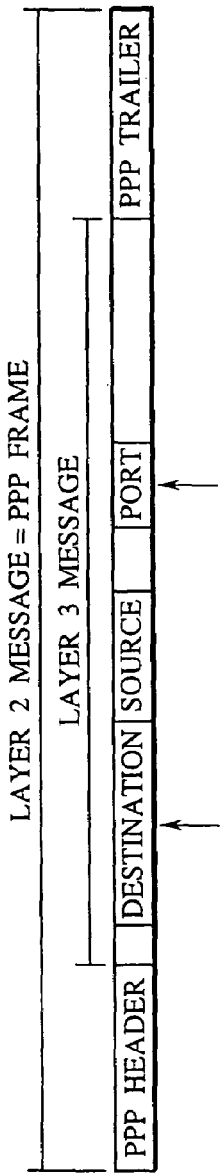
FIG. 16 is a diagram showing a flow definition information used in the message relay device of FIG. 2 in the case where a connection between the message relay device and a routing processing devices is PPP.

Note that the applicability of the method for providing communications between the routing processing devices 102-x by setting up a bypass channel in advance between the necessary mapping functions 201-x by the manual setting and by setting the mapping function 201-x such that the flow uses this bypass channel that is set up in advance, is not limited to the above case where the fixed PPP communication path is set up in advance. As shown in FIG. 16, information such as the destination address of the layer 3 message contained within the PPP message or the layer 4 port number in the information section of the layer 3 message can be used as the flow definition information besides the physical link number of the physical link from which the message is entered.

Figure 17:
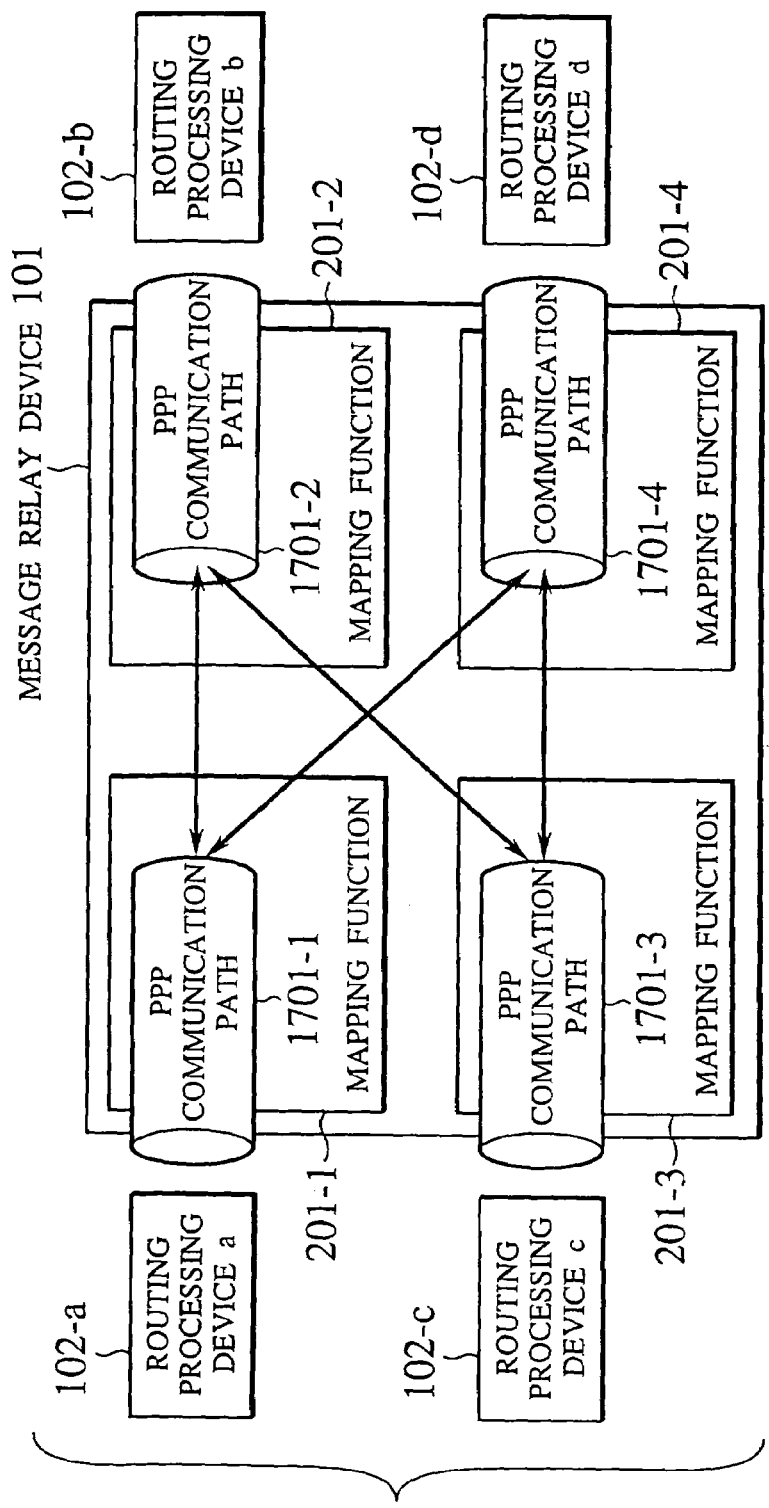
FIG. 17 is a schematic diagram showing the operation of the message relay device of FIG. 2 in the case where a connection between the message relay device and a routing processing device is a label switching on PPP connection.

In this case, by manually setting the routing information in advance and setting the mapping function 201-x to lead messages having a specific flow definition information to a specific bypass channel, it is possible to provide the switching in a form of transferring messages entered from one physical link into a plurality of physical links, even in the case of using PPP protocol on the physical link between the routing processing device 102-x and the message relay device 101, as shown in FIG. 17. In this way, it is possible to realize the equivalent of the fixed routing which is one of the IP message routing schemes.

Figure 18:
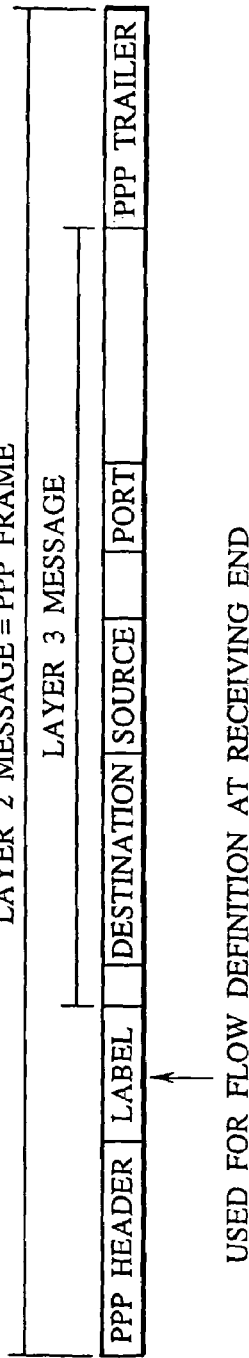
FIG. 18 is a diagram showing a flow definition information used in the message relay device of FIG. 2 in the case where a connection between the message relay device and a routing processing devices is a label switching on PPP connection.
Figure 19:
FIG. 19 is a diagram showing a flow definition information used in the message relay device of FIG. 2 in the case where a connection between the message relay device and a routing processing devices is ATM.

Note that the method for setting up the bypass channel or the routing information in advance by the manual setting is also applicable to the case of using MPLS or ATM as the protocol on the physical link between the routing processing device 102-i and the message relay device 101. In the case of MPLS, a label field is provided between the layer 2 header and the layer 3 header as shown in FIG. 18, and each routing processing device 102-x manages the value of that field. Also, in the case of ATM, the layer 3 message is separated into the fixed length short packets called cells and an identifier of ATM connection called VPI/VCI is contained in the header portion of the cell, as shown in FIG. 19.

Figure 20:
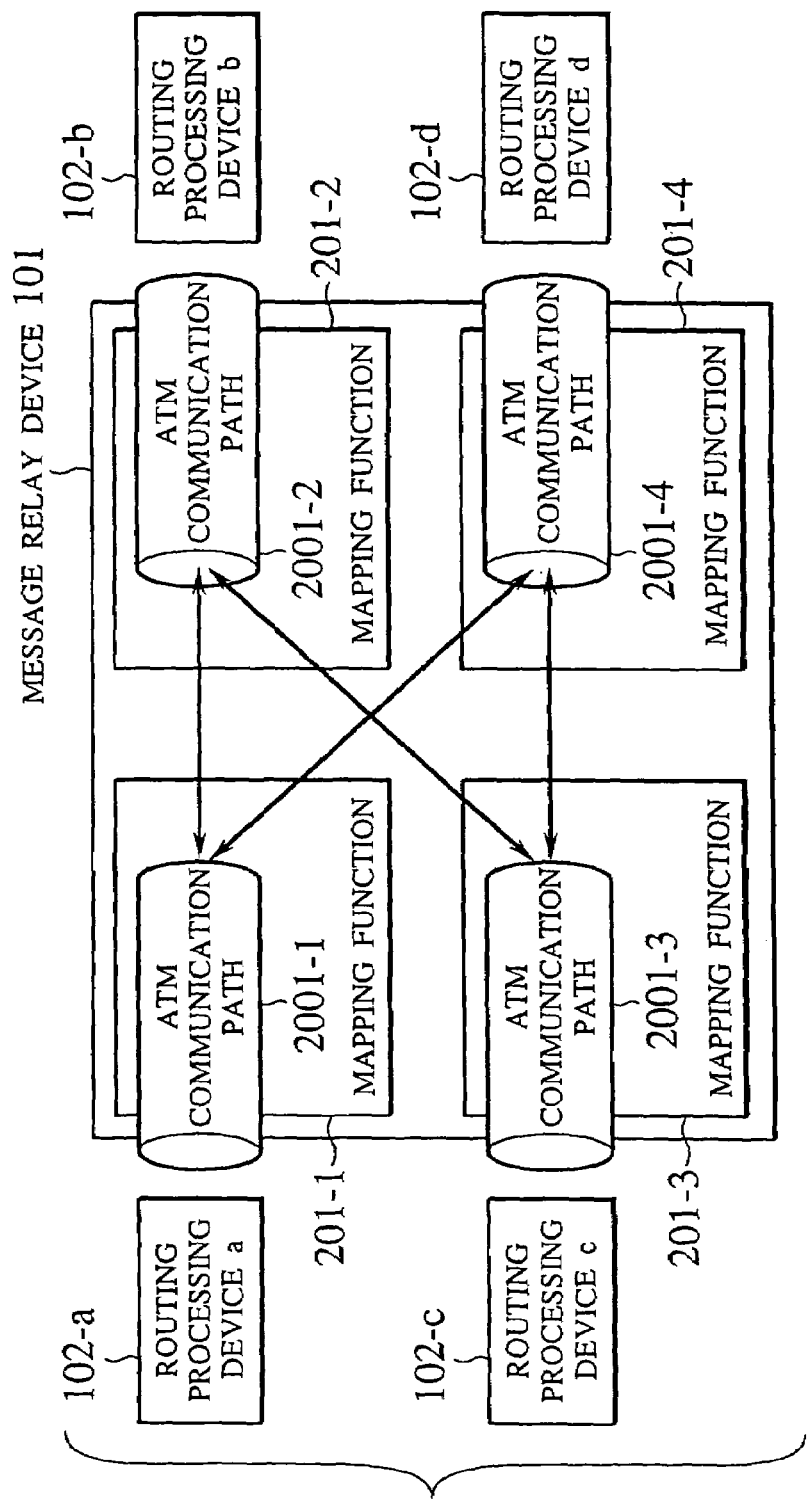
FIG. 20 is a schematic diagram showing the operation of the message relay device of FIG. 2 in the case where a connection between the message relay device and a routing processing device is ATM.

It is also possible to use these label and VPI/VCI as the flow definition information of the message relay device 101 of this embodiment and set each mapping function 201-x in advance such that messages or cells having a specific label or VPI/VCI will be transmitted to a specific bypass channel. In this case, the flow definition made by each routing processing device 102-x will be inherited directly by the message relay device 101 of this embodiment, so that the high throughput due to the reduced processing amount can be realized. As shown in FIG. 20, according to the above scheme, when the connection between the routing processing device and the message relay device is ATM, an ATM switching between ATM communication paths 2001-x accommodated at the message relay device 101 will be provided.

Figure 21:
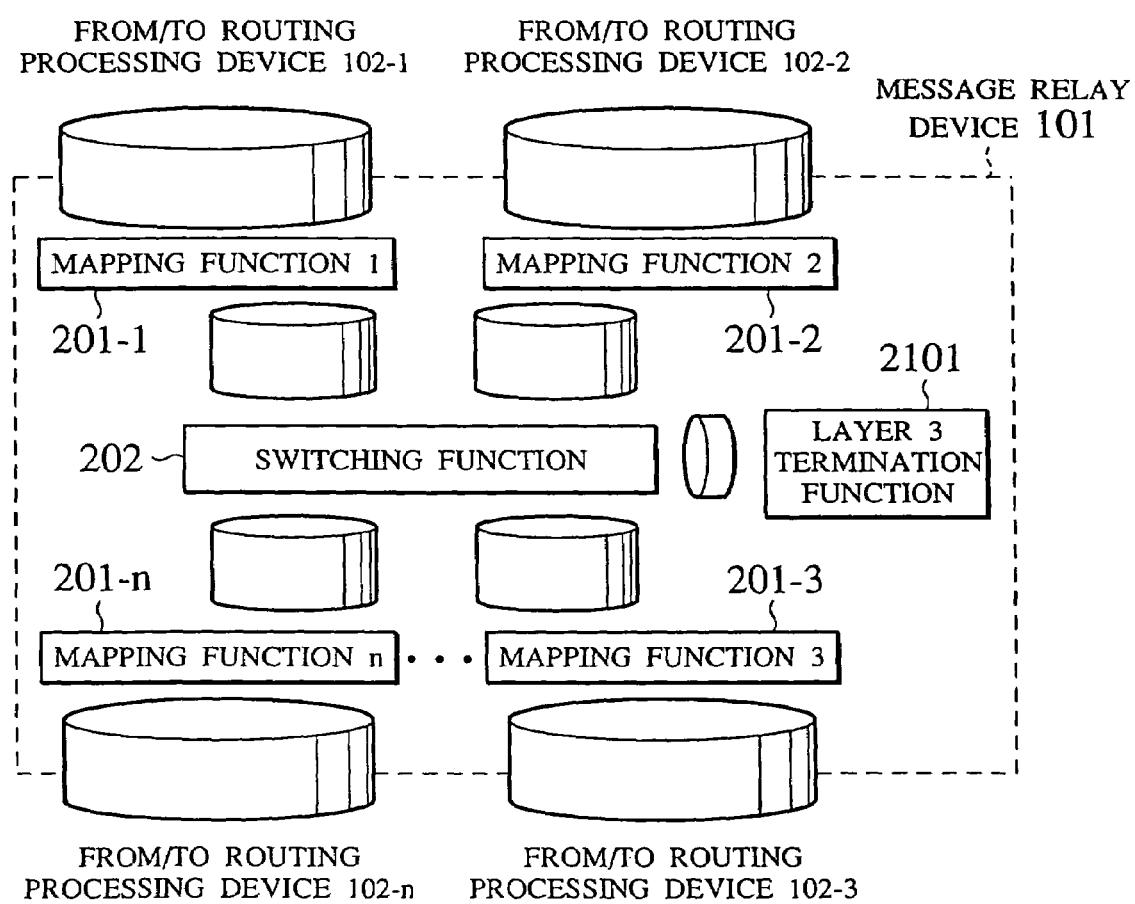
FIG. 21 is a schematic block diagram showing another exemplary configuration of a message relay device according to one embodiment of the present invention.

The above described transfer of messages having a specific destination address, label, or VPI/VCI to a specific bypass channel can be automatically set as shown in FIG. 21, by a layer 3 termination function 2101 connected to the switching function 202 of the message relay device 101 of this embodiment, instead of doing it by the manual setting.

Figure 22:
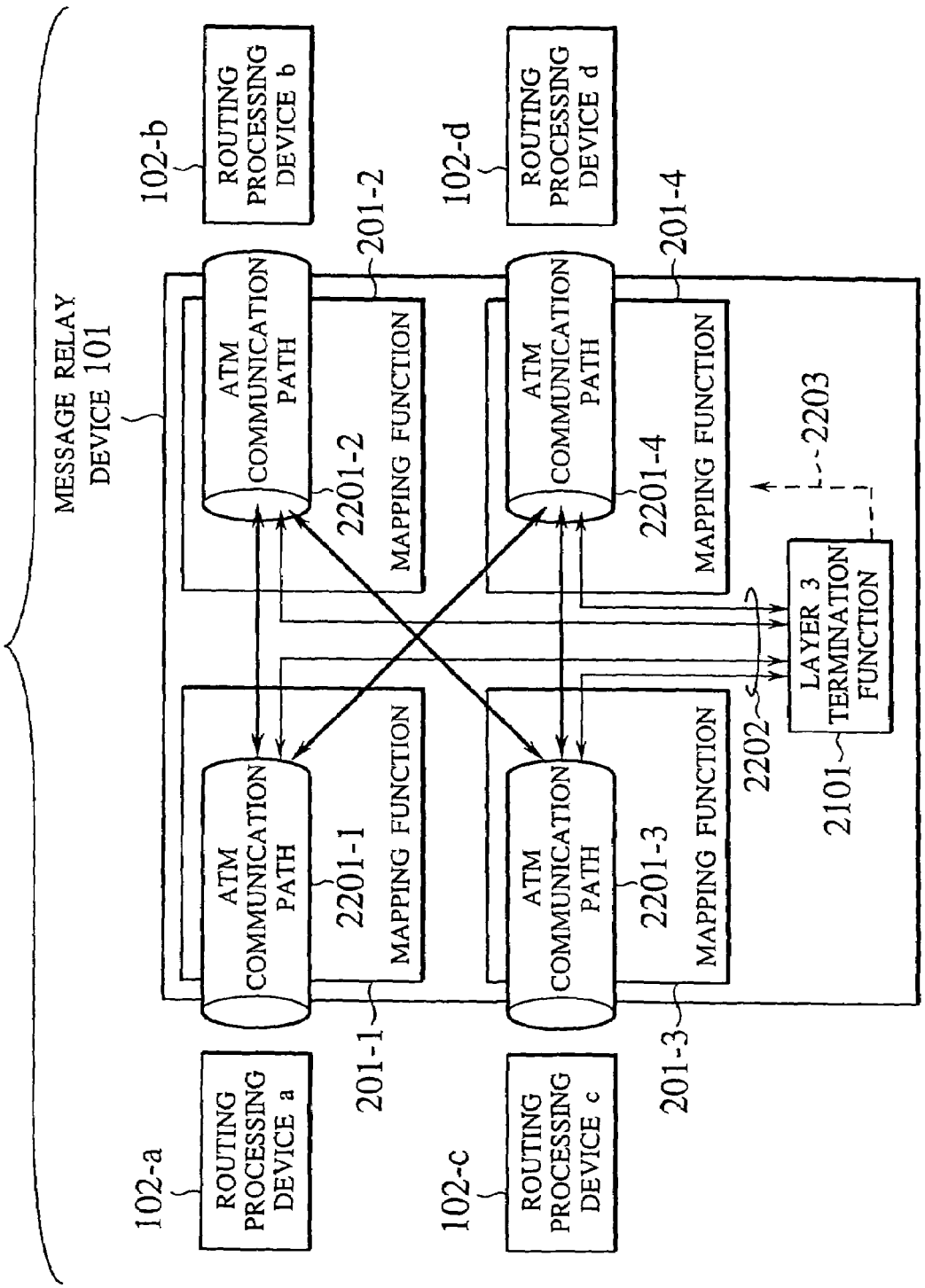
FIG. 22 is a schematic diagram showing one exemplary operation of the message relay device of FIG. 21.

FIG. 22 shows the operation of the message relay device 101 of this embodiment in this case conceptually. Each routing processing device 102-x is connected to the message relay device 101 through an ATM communication path 2201-x. The mapping function 201-x transfers those ATM cells that have a prescribed VPI/VCI value among the input ATM cells to a bypass channel 2202 which is a communication path toward a layer 3 termination function 2101. On this ATM connection which is identified by the prescribed VPI/VCI value, it is assumed that the control information, such as a signaling message in the case of the protocol called Q.2931 or PNNI that carries out the connection set up for the sake of ATM communications, is transferred.

The layer 3 termination function 2101 ascertains that the connection setup is requested, according to the message that can be produced from cells given from the bypass channel 2202 through which the control information is to be transferred, and sets up the necessary bypass channel between the specific mapping functions while notifying information necessary in processing the connection that is being set up, to specific mapping functions 201-x (2203). When the necessary bypass channel is set up and the necessary information is notified to the specific mapping functions 201-x, thereafter ATM cell communications using that bypass channel becomes possible between the specific mapping functions 201-x. On the necessary bypass channel, user data to be transmitted or received by user terminals are exchanged in forms of ATM cells.

Note that the bypass channel 2202 between the mapping function 201-x and the layer 3 termination function 2101 may be set up manually in advance, or set up automatically as a result of the own configuration recognition at a time of the activation of the message relay device 101. Also, the setting information 2203 from the layer 3 termination function 2101 to each mapping function 201-x may be communicated by using the above bypass channel 2202 or the default channel. The message relay device 101 of this embodiment has different implementation overhead depending on its detailed configuration so that which of the above two methods is to be selected is a matter to be determined by the system design.

Using the similar framework for transferring the prescribed VPI/VCI to the bypass channel 2202 that transfers the control information to the layer 3 termination function 2101 and setting the mapping function 201-x according to the control information by the layer 3 termination function 2101, and by selecting the protocol to be accommodated at the mapping function 201-x appropriately to be ATM, PPP message containing tag, etc., in addition to the ATM connection set up according to the Q.2931 protocol or the PNNI, it is also possible to use a protocol called tag switching that is proposed by the Cisco corporations, U.S.A., a topology driven protocol called MPLS (Multi Protocol Label Switching) of the IETF, or a protocol called MPOA (Multi Protocol Over ATM) in the ATM forum, can be used for the purpose of controlling the message relay device 101 of this embodiment. In the case where the protocol to be accommodated at the mapping function 201-x is ATM, whether it is the control message or the user data can be identified by the VPI/VCI as described above. In the case where a tag of MPLS is contained, whether it is the control message or the user data may be identified by the value of the tag.

These protocols are basically a protocol in which the communication path is set up in advance at a necessary portion before communications start and a start point and an end point of the communication path are specified by using the layer 3 address that is unique throughout the world such as IP address or E. 164 address, for example. By accommodating such a protocol at the layer 3 termination function 2101, it is also possible to construct a network by connecting the message relay device 101 of this embodiment in multiple stages.

In the above, it is assumed that only the control information is given to the layer 3 termination function 2101, but this is not the only form that can be processed by the architecture shown in FIG. 21. It is also applicable to the case of carrying out the operation schematically shown in FIG. 23 in which the user information flow is lead to the layer 3 termination function 2101 once and then lead to a specific output path as the layer 3 termination function 2101 carries out the conventionally known routing processing similar to that of the routing processing function 102-x.

Figure 23:
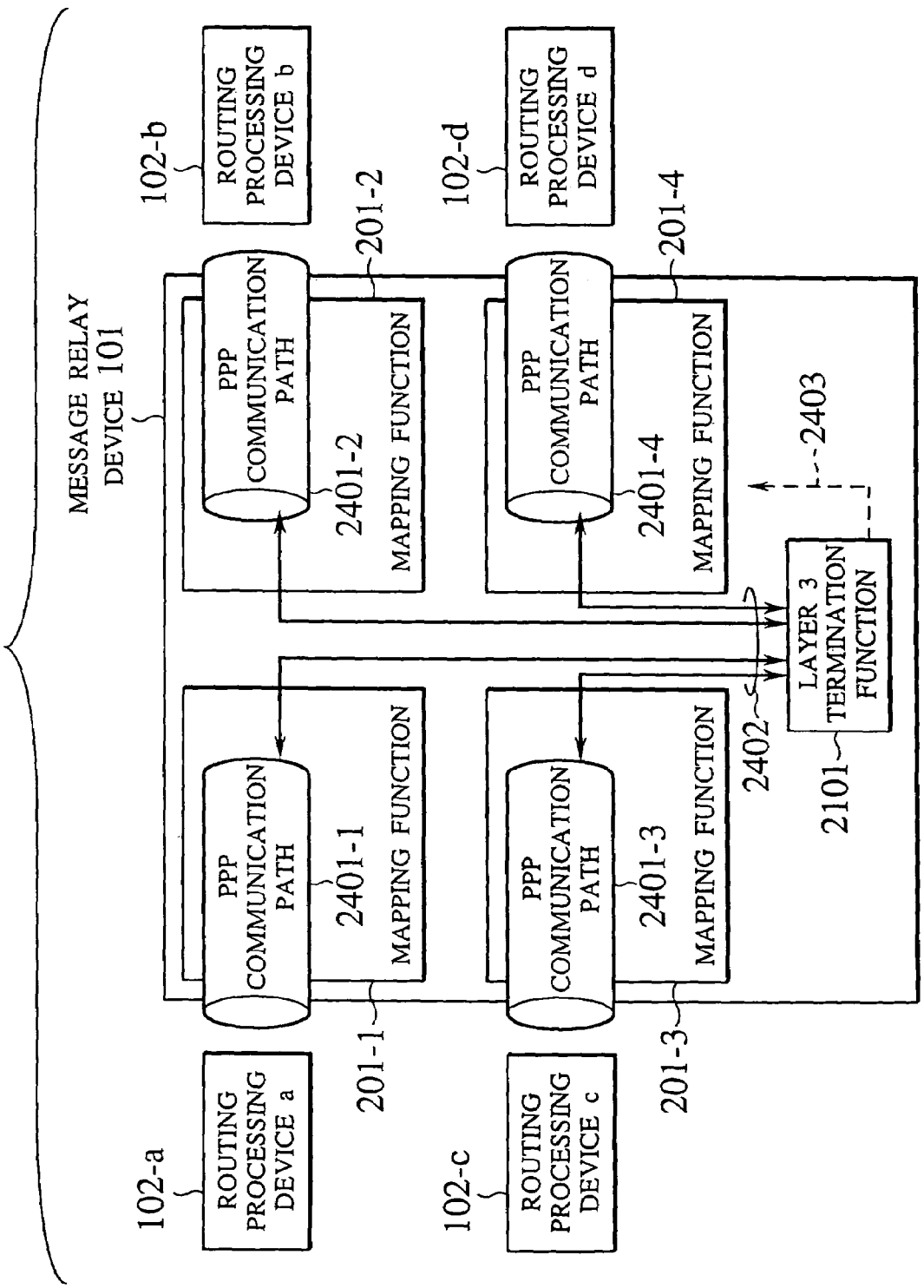
FIG. 23 is a schematic diagram showing an initial state of another exemplary operation of the message relay device of FIG. 21.

The operation schematically shown in FIG. 23 is as follows. The routing processing device 102-x and the message relay device 101 are connected through a PPP communication path 2401-x, and the mapping function 201-x that accommodates this PPP communication path 2401-x and the layer 3 termination function 2101 are connected through a dedicated bypass channel 2402. Upon receiving a message from the routing processing device 102-x, the mapping function 201-x gives this message to the layer 3 termination function 2101 via the dedicated bypass channel 2402. The layer 3 termination function 2101 carries out the routing processing for each received message to determine the mapping function 201-x to which it is to be transmitted, and transfers that message using the dedicated bypass channel corresponding to the determined mapping function 201-x. When the message from the layer 3 termination function 2101 is received, the mapping function 201-y transmits that message to the corresponding routing processing device 102-y.

Figure 24:
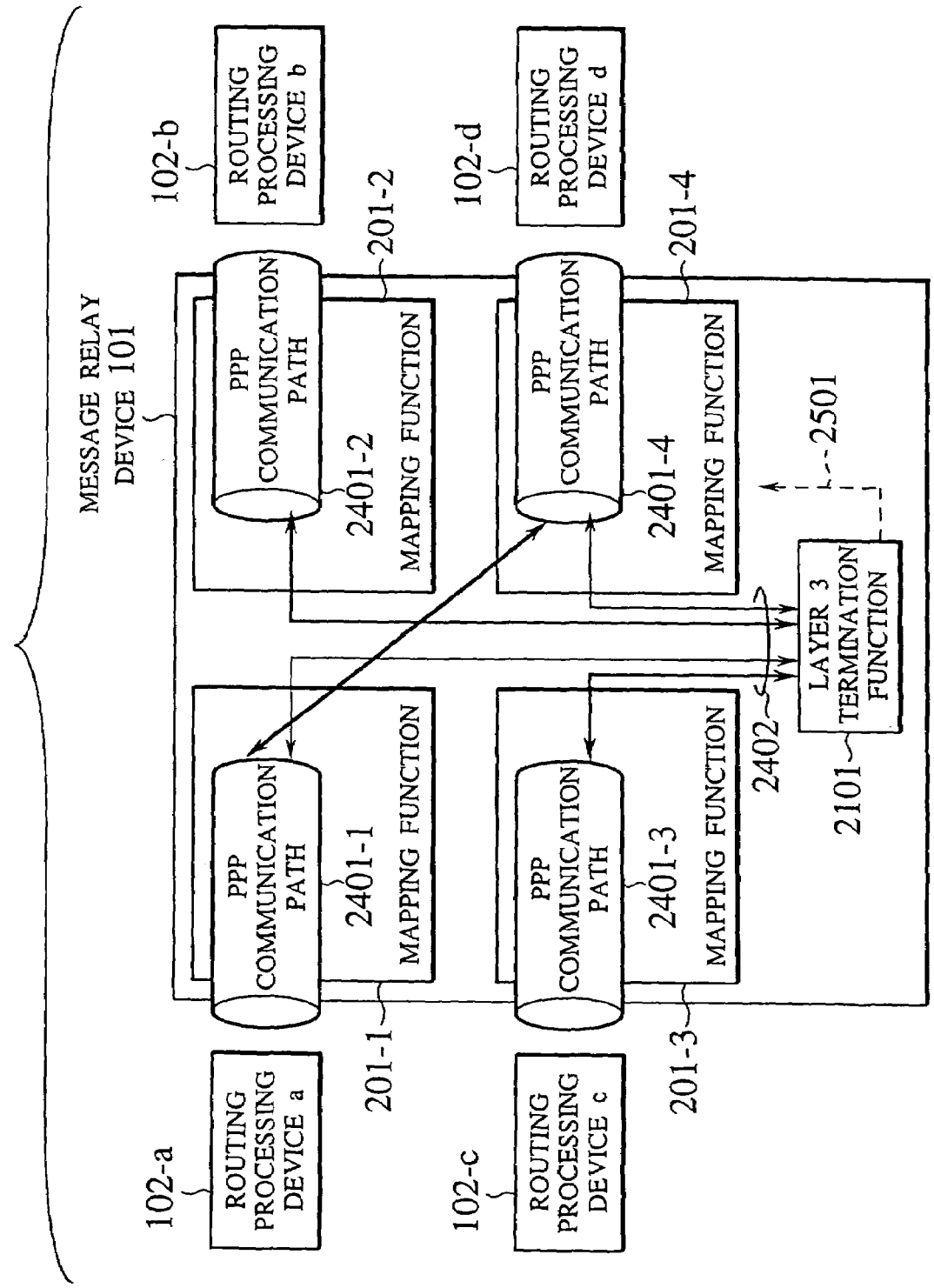
FIG. 24 is a schematic diagram showing an intermediate state of another exemplary operation of the message relay device of FIG. 21.

If all the communications are to be carried out by the above described framework, the built-in layer 3 termination function 2101 of the message relay device 101 of this embodiment would be required to have a throughput higher than the routing processing device 102-x in order to achieve the objects of the present invention so that it is undesirable. In order to take advantage of the features of the present invention, it is preferable to use a scheme as shown in FIG. 24 in which the layer 3 termination function 2101 detects the flow by referring to the message communicated via the dedicated bypass channel 2402 and separately sets up a dedicated bypass channel for that flow between the desired mapping functions 201-x and 201-y according to the need, and the mapping function 201-x detects those messages that can use that separately set up bypass channel and transmits these messages to that separately set up bypass channel. The operation of the message relay device 101 of this embodiment for realizing this scheme is as follows.

When the layer 3 termination function 2101 detects that the dedicated bypass channel can be set up between the mapping functions 201-x and 201-y according to some condition, the layer 3 termination function 2101 transfers information necessary for its set up to the mapping functions 201-x and 201-y (2501) while setting up that dedicated bypass channel (2502). After the dedicated bypass channel between the mapping functions 201-x and 201-y is set up, the mapping function 201-x transmits the message to that bypass channel upon receiving the message that satisfies a prescribed condition. In this way, it is possible to reduce the amount of messages to be transferred toward the layer 3 termination function 2101 so that it is possible to improve the throughput of the message relay device 101 of this embodiment considerably.

This scheme can be adapted to protocols called traffic driven protocols in the MPLS of the IETF. Also, the dedicated bypass channel between the mapping function 201-x and the layer 3 termination function 2101 can be adapted to the default communication path that is to be connected in advance between the routing functions for the purpose of reserving the connectability at the IP level in these protocols, and the dedicated bypass channel to be separately set up between the mapping functions 201-x and 201-y can be adapted to the bypass communication path that enables some messages to bypass the routing function for the purpose of improving the overall throughput of the network in these protocols.

Figure 25:
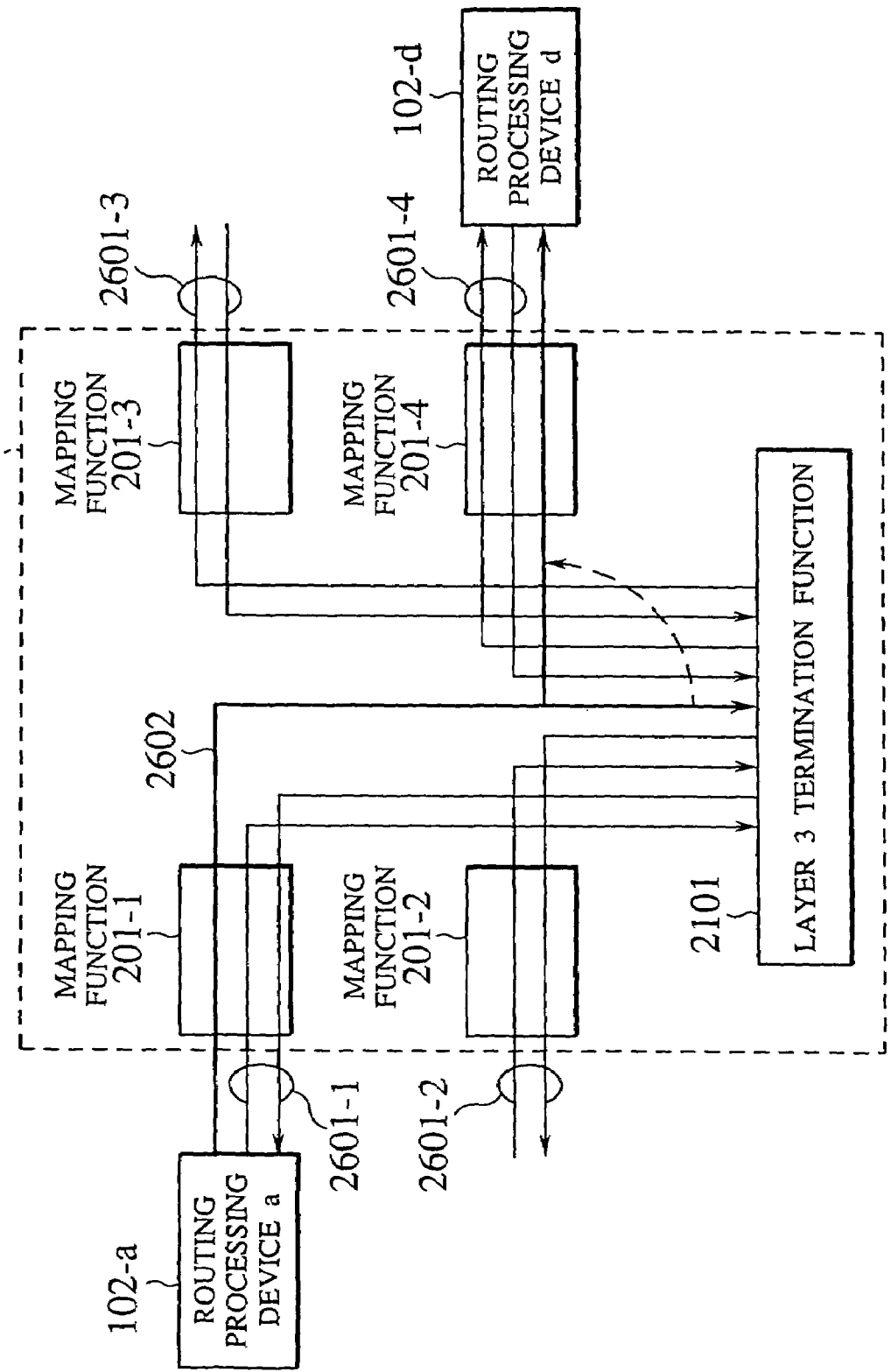
FIG. 25 is a schematic diagram showing a bypass communication path set up procedure in the message relay device of FIG. 21.

FIG. 25 schematically shows the operation of the message relay device 101 of this embodiment in the case of setting up the bypass communication path in the traffic driven protocol. The routing processing function 102-x is connected to the layer 3 termination function 2101 through a default communication path 2601-x. Similarly as described above, the user data message is transferred through the default communication path 2601-1 until the bypass communication path is set up. The layer 3 termination function 2101 carries out the layer 3 level switching upon receiving the user data message, while setting up the bypass communication path 2602 according to a prescribed condition. In the case of the traffic driven protocol, this procedure can be as follows.

Namely, when the routing processing device 102-a that is located on the upstream side of the user data message flow detects a bypass communication path set up trigger that is defined as a prescribed condition, the bypass communication path 2602 from the routing processing device 102-a to the layer 3 termination function 2101 is set up first. The similar operation as this is also carried out by the layer 3 termination function 2101, and when the bypass communication path set up trigger is detected by the same condition, the bypass communication path 2602 from the upstream side is changed to that toward the routing processing device 102-d. Here, a message that becomes a trigger for setting up the bypass communication path is a prescribed type of message such as a message indicating the start of a TCP session, for example.

Even in the bypass communication channel set up in the traffic driven protocol described above, the start point and the end point of the bypass communication channel are to be specified using the layer 3 addresses that are unique throughout the world such as IP addresses, so that it is also possible to construct a network by connecting the message relay device 101 of this embodiment in multiple stages, similarly as in the case of the topology driven protocol described above.

As described, the major feature of the message relay device 101 of this embodiment is that it can handle various protocols such as Ethernet, ATM, PPP, MPLS, and IP, as the protocol to be executed on the physical link between the routing processing device 102-x and the message relay device 101. In the case of the message relay device 101 of this embodiment, this feature is realized in such a manner that the processing specific to these protocols that are corresponding to the respective physical links is carried out at the mapping function 201-x, while communications between the mapping functions 201-x that are commonly required by these protocol corresponding to the physical links are handled by the concept of "flow" and unifiedly provided at the switching function 202.

Now, as described above, the information available as the flow definition information is different in these protocols such that a field to be referred to in the message is different and its bit length is also different. Also, depending on the way of operating the message relay device 101 of this embodiment, it is also possible to use different information as the flow definition information even for the same protocol. In order to define the flow to be used at the switching function 202 unifiedly by using these different flow definition information, the message relay device 101 of this embodiment uses the following scheme. Namely, the mapping function 201-i converts the flow definition information that is defined for each protocol into an identifier valid inside the message relay device 101 of this embodiment once, and information regarding the routing inside the message relay device 101 for the messages belonging to the flow is obtained by using this identifier.

Figure 26:
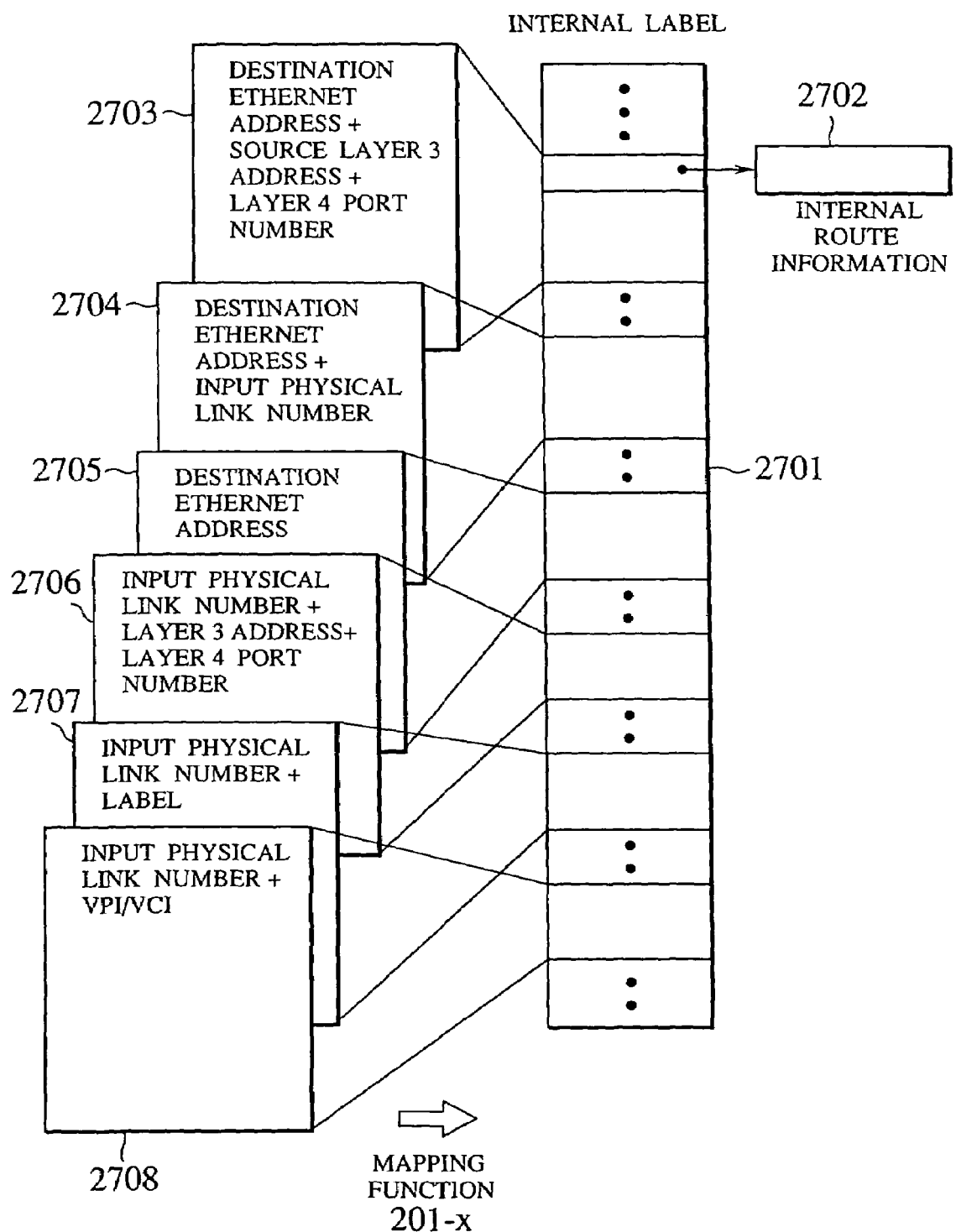
FIG. 26 is a schematic diagram showing a relationship among a flow definition information, internal label, and internal route information in a message relay device according to the present invention.

FIG. 26 shows this scheme conceptually. Mutually independent number spaces 2703, 2704, 2705, 2706, 2707 and 2708 exist within the message relay device 101 according to the flow definition information that is selected by the protocol accommodated by the mapping function 201-x and the operation form determined by an operator. In the example shown in FIG. 26, the number space 2703 is for the case where the accommodated protocol is Ethernet and the destination Ethernet address, the source layer 3 address and the layer 4 port number are selected as the flow definition information, the number space 2704 is for the case where the accommodated protocol is Ethernet and the input physical link number and the destination Ethernet address are selected as the flow definition information, the number space 2705 is for the case where the accommodated protocol is Ethernet and the destination Ethernet address is selected as the flow definition information, the number space 2706 is for the case where the accommodated protocol is PPP and the input physical link number, the layer 3 address and the layer 4 port number are selected as the flow definition information, the number space 2707 is for the case where the accommodated protocol is MPLS on PPP and the input physical link number and the label are selected as the flow definition information, and the number space 2708 is for the case where the accommodated protocol is ATM and the input physical link number and VPI/VCI are selected as the flow definition information. These number spaces 2703, 2704, 2705, 2706, 2707 and 2708 exist independently at each mapping function 201-x that accommodates physical links using the respective number spaces.

On the other hand, in the message relay device 101 of this embodiment, there is also a number space 2701 of an identifier allocated to the flow which is valid only inside the message relay device 101. This identifier will be referred to as an internal label. The number space for the internal label is subdivided into several pieces, and each one of them is allocated to one mapping function 201-x. Each mapping function 201-x maintains the mapping from the number spaces of the flow definition information that are managed by the own device to the number space of the internal label that is allocated to the own device. In this way, the flow defined by the flow definition information which is different for different protocols can be identified inside the message relay device 101 of this embodiment by the internal label which is a number in the unified number space, so that it is possible to process all the protocols accommodated by the message relay device 101 unifiedly by the concept of flow. Here, by subdividing the number space for the internal label into pieces and fixedly allocating these pieces to the respective mapping functions 201-x, it becomes possible for each mapping function 201-x to construct the mapping independently at a time of constructing the mapping from the number space of the flow definition information to the number space of the internal label, so that there is an advantage that the amount of communications between the mapping functions 201-x can be reduced.

In addition, the mapping function 201-x also maintains the mapping from the internal label to the internal route information 2702 indicating a route of messages belonging to each flow within the message relay device 101. In this way, each message can be transferred to the desired output path.

According to the above, in order to determine the transfer route of the input message, each mapping function 201-x makes an access to a table holding the mapping from the flow definition information to the internal label first, and then makes an access to a table holding the mapping from the internal label to the internal route information.

This completes the description of the operation principle of the message relay device 101 of this embodiment, the definition of the flow, and a procedure for processing the flow within the message relay device 101. Note that, according to the principle of this embodiment described here, information to be used as the flow definition information is not necessarily limited to those described above. In principle, any information that is contained in each field of the header of each layer in the protocol stack or an overhead portion of SDH can be the target of checking at the mapping function 201-x as the flow information. In particular, information for QoS definition such as COS field contained in the IP header can be used as a part of the flow definition information.

Next, one exemplary configuration of the message relay device according to the present invention will be described in detail. Note that this configuration is not the only configuration for realizing the message relay device that obeys the above described operation principle and it is possible to consider many other configurations. In particular, in the exemplary configuration described below, the optical communication path capable of realizing the so called wavelength division multiplexed burst switching will be adopted as a way of realizing the switching function 202, but the above described operation principle can be realized without using such an optical communication path, by using the well known switching elements realized by electric circuits, for example. In order to realize the above described operation principle, it suffices to have a capability to dynamically set up the default channel having a broadcast function and a bypass channel to be allocated to each flow. Such switching elements realized by electric circuits are disclosed in Japanese Patent Application Laid Open No. 6-311180 (1994), for example. However, as will be described below, by utilizing the excellent characteristics of the optical communication path, it is possible to realize the message relay device with a higher throughput than the case of using the switching elements realized by electric circuits, which is also capable of providing the multicast using the bypass channels in addition to the broadcast, so that this case of using the optical communication path that is capable of realizing the wavelength division multiplexed burst switching will be described in detail hereafter.

Figure 27:
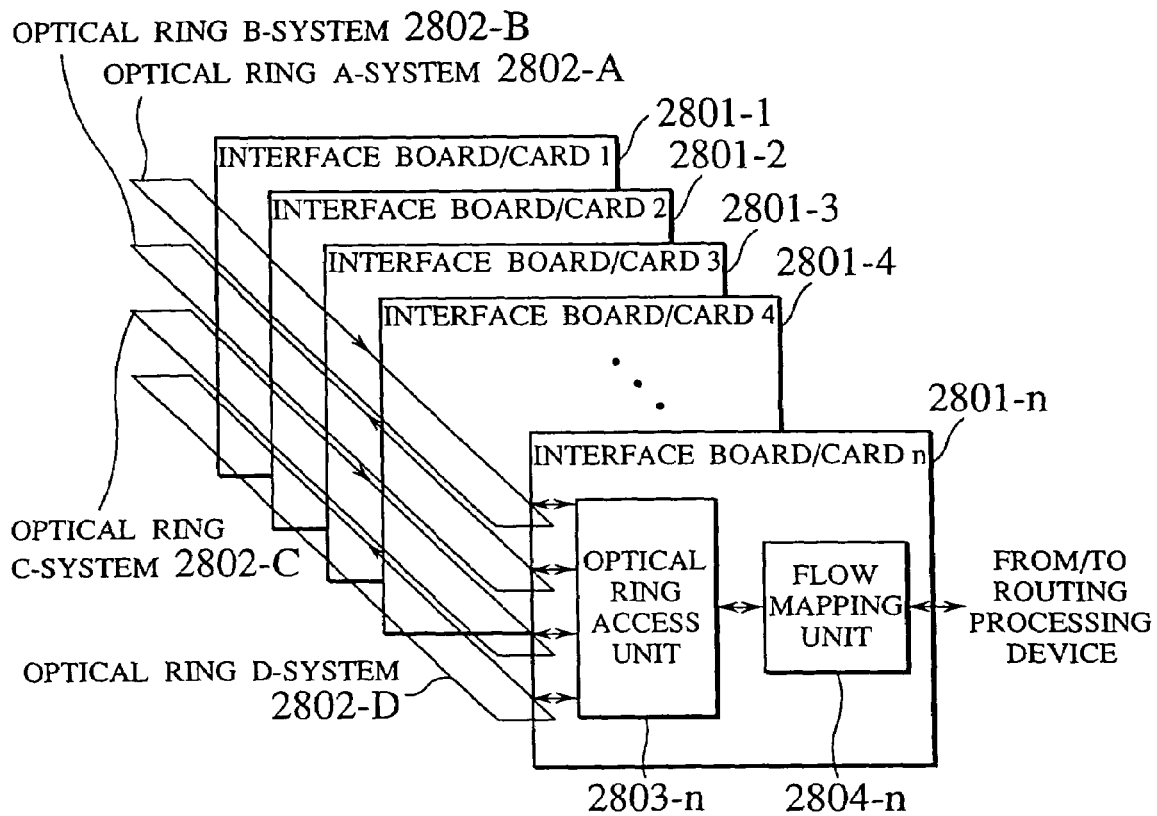
FIG. 27 is a schematic block diagram showing another exemplary configuration of a message relay device according to one embodiment of the present invention.

FIG. 27 shows an exemplary configuration of the message relay device 101 according to the present invention, which is formed by inter-connecting n pieces of interface boards/cards 2801-1 to 2801-n by total four systems of optical rings 2802-A, B, C and D. Each interface board/card 2801-x contains a flow mapping unit 2804-x and an optical ring access unit 2803-x. The relationship with the configuration shown in FIG. 2 described above is as follows. The mapping function 201-x of FIG. 2 is provided by the flow mapping unit 2804-x, while the switching function 202 of FIG. 2 is realized by the optical ring access units 2803-x and four systems of optical rings 2802-A, B, C and D. In this configuration, the total four systems of optical rings are used, but it is not absolutely necessary to use four systems of optical rings in order to practice the present invention. The number of optical rings is a parameter to be determined in view of the number of wavelengths that can be transferred by a single optical fiber and the maximum bit rate that can be transferred by each wavelength, which are in turn determined by the standard of the optical component technology at a time of practicing the present invention.

Figure 28:
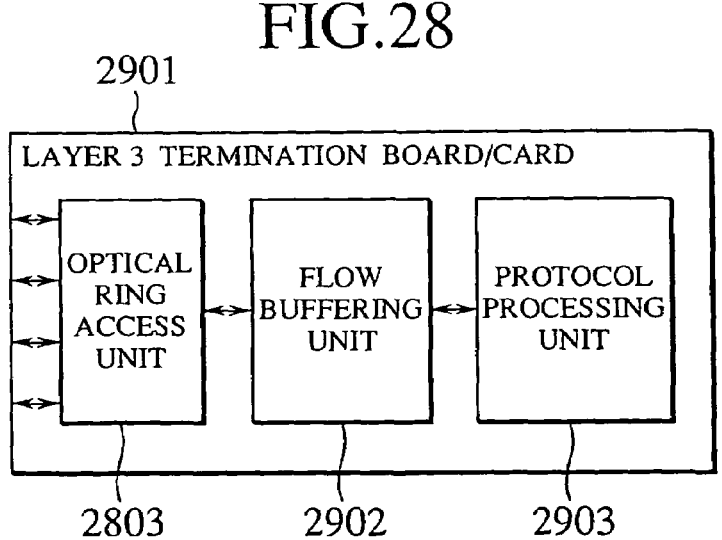
FIG. 28 is a schematic diagram showing an exemplary configuration of a layer 3 termination board/card that can be used in the message relay device of FIG. 27.

The message relay device 101 in a configuration shown in FIG. 21 contains one or a plurality of layer 3 termination functions 2101, and the message relay device 101 in this configuration shown in FIG. 21 can be obtained in the exemplary configuration of FIG. 27 by replacing one or a plurality of interface boards/cards 2801-x by a layer 3 termination board/card 2901 having a configuration as shown in FIG. 28. This layer 3 termination board/card 2901 may be formed to include an optical ring access unit 2803, a flow buffering unit 2902 and a protocol processing unit 2903, as shown in FIG. 28.

The optical ring access unit 2803 has the same configuration as that contained in the interface board/card 2801-x. The protocol processing unit 2903 is a unit for actually carrying out the protocol processing to be executed on the board/card, which may be formed by a micro-processor system, for example. The flow buffering unit 2902 is a message buffer for temporarily holding a message transmitted to or received from the layer 3 termination board/card 2901, which is necessary in order to proceed with the processing of the message at a timing convenient for the optical ring access unit 2803 or the protocol processing unit 2903. The message relay device 101 of this embodiment has a possibility of accommodating many protocols, and the processing to be carried out by the protocol processing unit 2903 with respect to the flow will be different for different protocols, so that it is preferable for the flow buffering unit 2902 to realize the message buffering for each flow.

Figure 29:
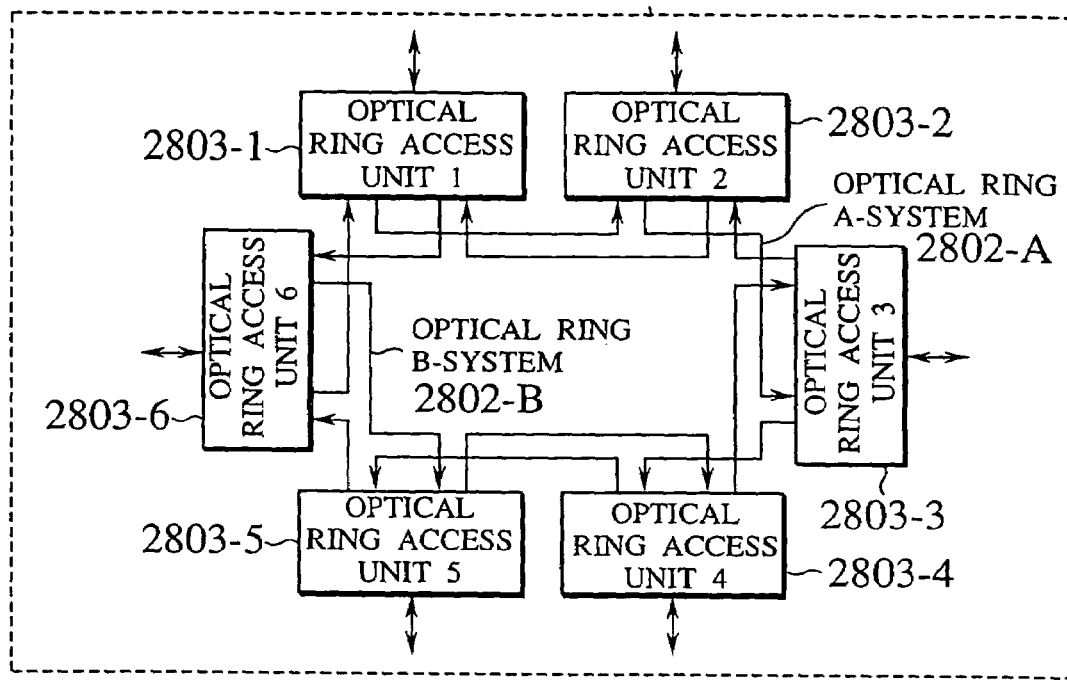
FIG. 29 is a schematic diagram showing an exemplary connection between optical ring access units and optical rings of the message relay device of FIG. 27.

FIG. 29 shows a detailed connection relationship between the optical ring access units 2803-x and the optical rings 2802-x. FIG. 29 only shows the optical ring A-system 2802-A and the optical ring B-system 2802-B among the four systems of optical rings. The other two systems, the optical ring C-system 2802-C and the optical ring D-system 2802-D, are also connected similarly as these. As shown in FIG. 29, the optical ring access units 2803-x are connected such that the message can be transferred in the clockwise direction by one of the optical ring A-system 2802-A and the optical ring B-system 2802-B while the message can also be transferred in the counter-clockwise direction by the other one of them. By connecting the optical ring access units 2803-x in the ring based topology, it becomes possible to easily provide the point-to-multipoint type or broadcast type communications in addition to the point-to-point type communications. Ethernet protocol is one of the protocols to be accommodated by the message relay device 101 of this embodiment, and some of the protocols implemented on Ethernet presupposes that the multicast or broadcast at the layer 2 level is possible, so that it is important for the device that is designed to handle various protocols unifiedly such as that of this embodiment to be equipped with the capability to provide point-to-multipoint type communications or broadcast type communications.

In addition, by providing the clockwise and counter-clockwise optical rings, it becomes possible for each optical ring access unit 2803-x to select the optical ring for which the hop count to another optical ring access unit 2803-y is smaller at a time of transmitting the message toward the destination optical ring access unit 2803-y. As a result, he communication bandwidth on the ring that is consumed by a single message can be reduced compared with the case of providing rings only in the same direction, so that it becomes possible to provide a higher throughput between the routing processing devices 102-x.

Figure 30:
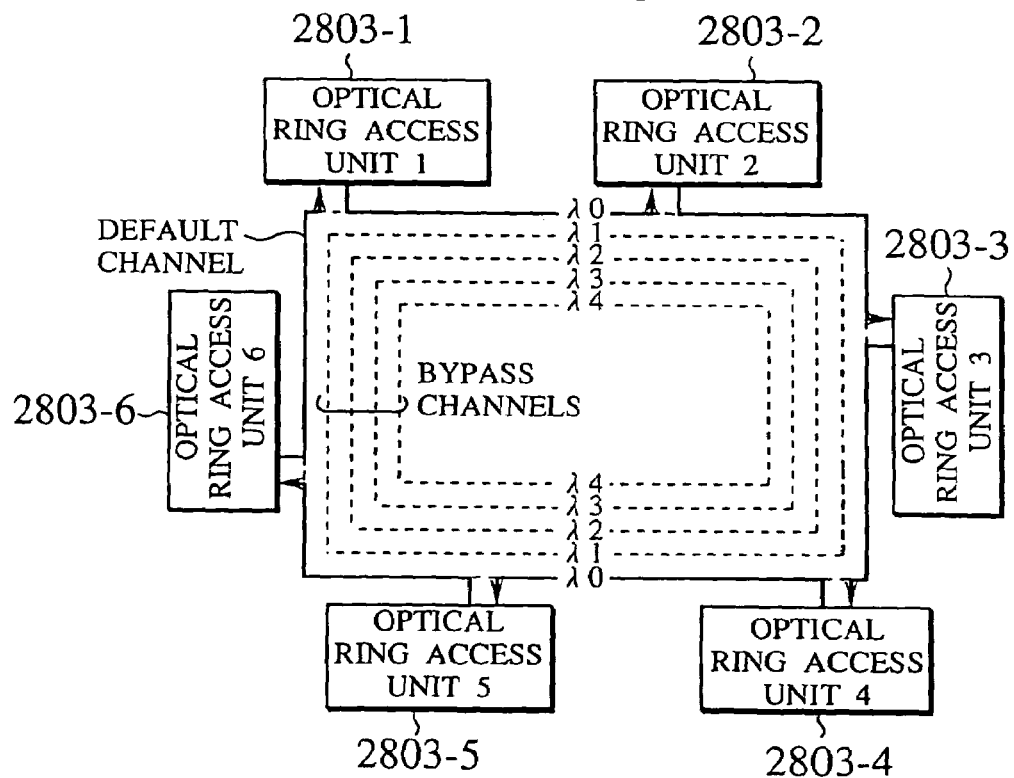
FIG. 30 is a schematic diagram showing an exemplary configuration of a default channel and bypass channels in optical tings of the message relay device of FIG. 27.

FIG. 30 shows the principle for configuring the default channel and the bypass channels in each optical ring. FIG. 30 only shows one system among the four systems of optical rings used in this configuration. This configuration adopts the so called wavelength division multiplexing for multiplexing lights in a plurality of wavelengths on a single optical ring. The switching function 202 in this embodiment is required to provide the default channel and the bypass channels in distinction, and in this configuration, the default channel is provided by using one prescribed wavelength among the multiplexed wavelengths while the bypass channels are provided by the other remaining wavelengths. In the wavelength division multiplexing scheme each wavelength is capable of transferring messages independently so that it is suitable for practicing the present invention. In FIG. 30, the wavelength λ0 is allocated to the default channel while the other wavelengths λ1 to λ4 are allocated to the bypass channels.

When the wavelength of the default channel is emitted at some optical ring access unit 2803-x on the optical ring, it is processed to be pulled out at the neighboring optical ring access unit 2803-y on the optical ring. In the example shown in FIG. 30, the light in the wavelength λ0 allocated to the default channel that is emitted at the optical ring access unit 2803-1 will be pulled out at the neighboring optical ring access unit 2803-2 on the optical ring. On the other hand, each wavelength of the bypass channel is processed such that it is dynamically set in correspondence to the flow, emitted at the optical ring access unit 2803-x at the start point of the corresponding flow, passed in a form of the light signal at any intermediate optical ring access unit, and pulled out at the optical ring access unit 2803-y at the end point of the corresponding flow, as will be described in detail below.

Now, the communications in the default channel will be described in detail. First, a configuration of a message to be processed by the switching function 202 in this exemplary configuration will be described. Here, a message to be processed by the switching function 202 will be referred to as an internal message.

Figure 31:
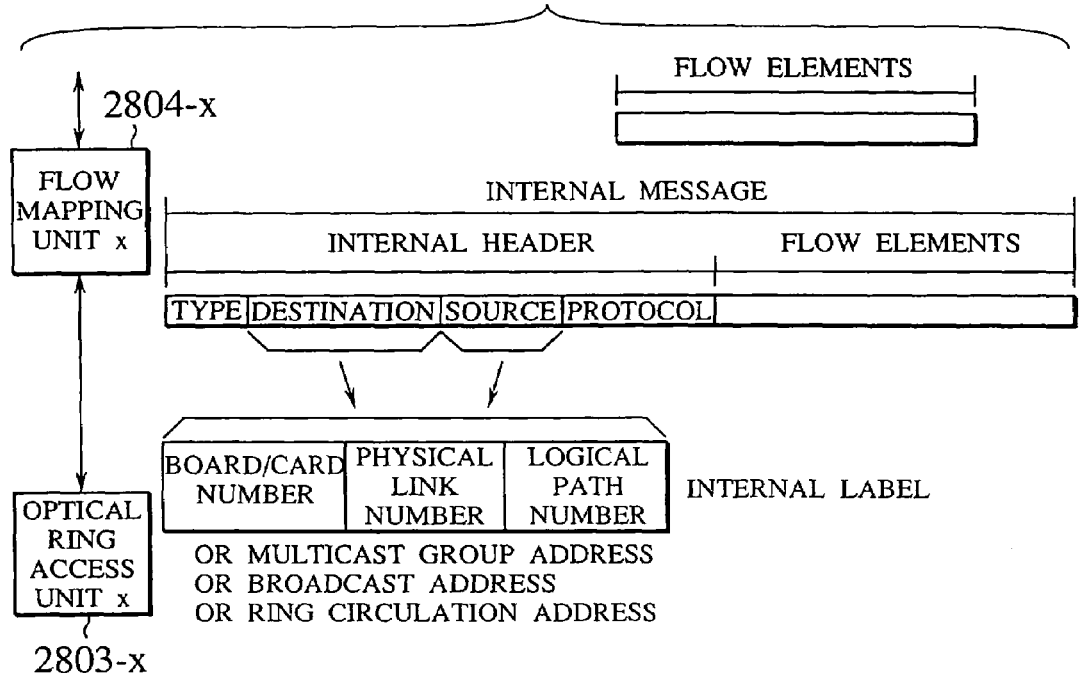
FIG. 31 is a diagram showing an exemplary configuration of an internal header used in the message relay device of FIG. 27.

FIG. 31 shows a configuration of the internal message in this exemplary configuration. The flow mapping unit 2804-x attaches an internal header to a flow constituent element receiving from the routing processing device 102-x side, and gives it as the internal message to the optical ring access unit 2803-x. On the other hand, upon receiving the internal message from the optical-ring access unit 2803-x, the flow mapping unit 2804-x deletes the internal header to take out the flow constituent element and transmits it to the routing processing device 102-x side. Here, the flow constituent element is a lump of information that forms a unit of user data transfer in each flow. The flow constituent element is different for different depending on the protocol accommodated by the interface board/card, and can be an Ethernet frame in the case of accommodating Ethernet, a PPP message in the case of accommodating PPP, an ATM cell in the case of accommodating ATM, or a virtual container in the case of accommodating SDH, for example.

In this exemplary configuration, the internal header contains a type field, a destination field, a source field and a protocol field. The type field registers an information indicating a type of the internal message, whether it is a control message to be used for the purpose of controlling the message relay device 101 within the message relay control device 101, or whether it is a user message to be relayed by the message relay device 101. The destination field and the source field are fields used for the purpose of routing the internal message inside the message relay device 101. Also, the protocol field registers an information indicating a type of protocol that is used by the flow constituent element that is contained in the information section of the internal message.

In this exemplary configuration, the internal label that has been described above as an identifier of the flow will be registered into the destination field and the source field used for the routing inside the device. The reason for doing this is as follows. As mentioned above, allocating the independent number space for the internal label to each interface board/card 2801-x is effective in reducing the required amount of communications between the interface boards/cards 2801-x at a time of allocating the internal label. In order to realize this, the simplest way is to include an identifier allocated to each interface board/card 2801-i within the device, that is the board/card number, in a part of the bit sequence of the internal label. Also, the flow is defined at least for each physical link accommodated by the message relay device 101 of this embodiment, so that the internal label production can be simplified by also including an identifier of that physical link, that is the physical link number, in a part of the bit sequence of the internal label. By including the board/card number and the physical link number in the internal label, the internal label can also be used for the routing inside the device in this exemplary configuration. By utilizing the internal label that is the identifier of the flow for the purpose of the routing inside the device, it is possible to reduce the amount of calculations required for processing each message at each interface board/card 2801-x so that it becomes possible to realize the higher throughput.

In this exemplary configuration, the internal label also includes a logical path number, in addition to the board/card number and the physical link number. Here, the logical path number is a number assigned to the logical path that is defined inside the physical link specified by a set of the board/card number and the physical link number. This logical path number is further divided into two sub-fields. The first half portion identifies the logical path that is defined by the protocol on that physical link, such as VP/VC in the case of ATM or the virtual container in the case of SDH. Moreover, the second half portion identifies the flow that is detected in the logical path specified by the first half portion of this logical path number, which is on the physical link specified by the physical link number and for the interface board/card specified by the board/card number. At each interface board/card 2801-x, the second half portion of the logical path number alone is dynamically produced at a time of allocating the internal label to the detected flow. Note that the board/card number and the physical link number are fixed for each physical link. Also, the first half portion of the logical path number is fixed in the case of the protocol in which the logical path is fixedly set up in advance as in the case of SDH, but will be dynamically produced whenever the logical path is set up in the case where the logical path is dynamically set up as in the case of ATM.

Here, the border between the first half portion and the second half portion of the logical path number should preferably be variable depending on the protocol type on the physical link, the way of operating that protocol, and especially the selection of the flow definition information. Note that the internal label written in the destination field of each internal header is the internal label at the end point of the flow inside the message relay device of this embodiment, and the internal label written in the source field is the internal label at the start point of the flow inside this device. The logical path number in the internal label of the source field and the logical path number in the internal label of the destination field are independently allocated respectively at the interface board/card 2801-x at the start point of the flow and at the interface board/card 2801-y at the end point of the flow. From a viewpoint of identifying the flow, it can be done by either the internal label in the destination field or the internal label in the source field, but for the purpose of proceeding with the processing inside this device smoothly, this exemplary configuration allocates different internal labels to the start point and the end point of the flow.

In addition, in order to realize broadcast and multicast of the internal message, a prescribed space within the number space of the internal label will be used. For example, the number space can be used for broadcast and multicast in such a way that it is broadcast if the bit sequence of the internal label has "1" for all bits, or it is multicast if the bit sequence for the board/card number portion and the physical link number portion has "1" for all bits but the bit sequence for the logical path number portion does not have "1" for all bits. Also, in the case of this exemplary configuration, there is a control message which is to be sequentially circulate through the interface boards/cards, and one number (the bit sequence with "0" for all bits, for example) is allocated to express this control message. In the following, these three types of addresses will be referred to as broadcast address, multicast group address, and ring circulation address, respectively.

In this exemplary configuration, it is assumed that the number of interface boards/cards to be accommodated by one message relay device is about 100, in which case the board/card number requires 7 bits. Also, it is assumed that the number of physical links to be accommodated by each interface board/card is about 16, in which case the physical link number requires 4 bits. As for the logical path number, the required number of bits changes depending on a design as to how many flows can be defined between this message relay device 101 and the routing processing device 102-x, but in the case of this exemplary configuration, it is assumed that the logical path number requires 13 bits.

In the case of the message relay device 101 of this embodiment, the definition of the flow can be flexibly changed by an operator of the device, and the connectability can be secured by using the default channel even when the flow is not defined, so that even if the 13 bits logical path number space (8192 logical paths) becomes short, it is possible to reduce the required logical path number space by appropriately changing the flow definition and merging a plurality of flows into an identical flow. In the case of exemplary numbers described here, the internal label become a 24 bits long bit sequence as a whole, which is shorter than the generally used layer 2 address or layer 3 address. As a result, the number space of the internal label becomes smaller than the number space of the flow definition information and therefore the required capacity of a table can be reduced. In general, the access to a table becomes faster when the capacity becomes smaller, so that it becomes possible to provide the message relay device with a higher throughput as a consequence.

Now, the internal label as described above is to flow through the default channel and the bypass channels, and the switching function with functions required by this embodiment can be realized by processing this internal message at the optical ring access unit 2803-x as follows. In the following, the processing of the internal message in the default channel will be described conceptually first, and then that in the bypass channel will be described.

Figure 32:
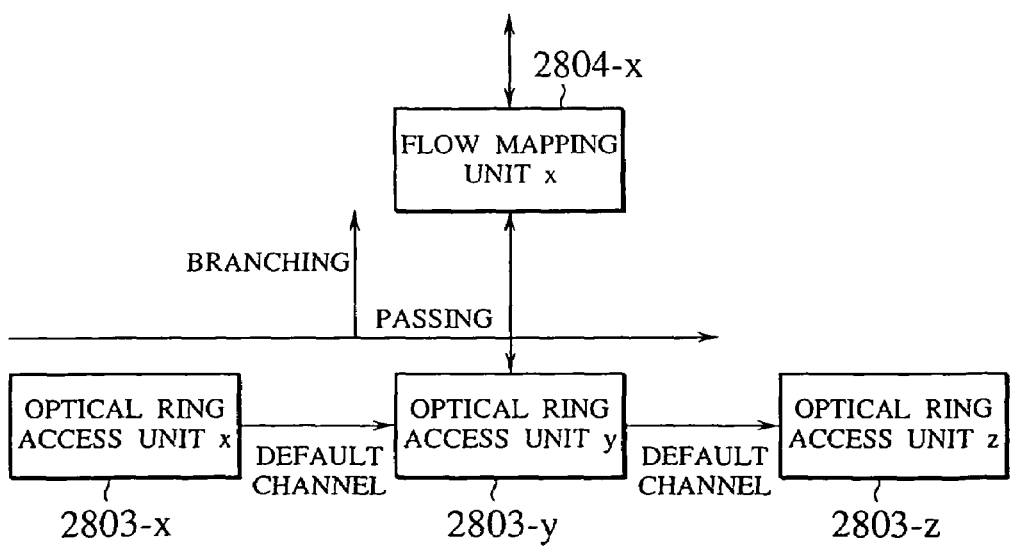
FIG. 32 is a schematic diagram showing an exemplary processing of an internal message through a default channel in the message relay device of FIG. 27.

FIG. 32 shows the processing of the internal message in the default channel conceptually. FIG. 32 only shows three optical ring access units 2803-x, 2803-y and 2803-z that are neighboring on the optical ring. When the internal message is given from the optical ring access unit 2803-x via the default channel, the optical ring access unit 2803-y refers to the destination field and the source field of the internal header and determines whether to pass this internal message toward the optical ring access unit 2803-z or branch this internal message toward the flow mapping unit 2804-y according to the following rules.

First, in the case where the address written in the destination field is the ring circulation address, this message is immediately pulled out from the default channel. In this exemplary configuration, a certain type of internal message receives some processing while sequentially circulating through the interface boards/cards 2801-x on the ring for the purpose of controlling inside the device, as will be described in detail below. The ring circulation address is used as the destination address of this type of internal message.

Next, in the case where the address written in the destination field is the broadcast address, the source field of this message is referred first and whether the source that sent this message is this optical ring access unit itself or not is checked. When this message is what is sent by this optical ring access unit itself, this message is immediately discarded. Otherwise, a copy of this message is produced and it is sent to the flow mapping unit 2804-y. At the same time, this message is given to the neighboring optical ring access unit 2803-z via the default channel. When the internal message having the broadcast address as the destination address is handled by each optical ring access unit 2803-x in this way, and when the optical ring access units 2803-i are connected in a ring shape as shown in FIG. 29, the internal message inserted into the default channel at some optical ring access unit 2803-x will sequentially visit the optical ring access unit 2803-y along the optical ring, and eventually return to the optical ring access unit 2803-x where it was originally inserted, and will be pulled out from the default channel there.

Here, the only information required in this routing of the internal message having the broadcast address on the default channel, that is, the pulling out of this message from the default channel at the desired optical ring access unit 2803-x, is the board/card number assigned to the optical ring access unit 2803-x at which the internal message was inserted, which is described in the source field of the header of the internal message. This is an information that can be obtained at the board/card that inserts the internal message, without carrying out any communications with the other boards/cards, so that this scheme is effective in a situation where some information inquiry should be made with respect to each board/card for the purpose of controlling inside the device. Note that the board/card number that is unique inside the message relay device 101 of this embodiment can be assigned to each optical ring access unit 2803-x by assigning the board/card number to each board/card fixedly using wirings on the back panel, for example.

Also, in the case where the address written in the destination field is the multicast group address, the source field of this message is referred first and whether the source that sent this message is this optical ring access unit itself or not is checked. When this message is what is sent by this optical ring access unit itself, this message is discarded. Otherwise, the multicast group address of the destination field is referred next and matched with a list of multicast group addresses to which this optical ring access unit belongs, to see if this optical ring access unit belongs to that multicast group. If this optical ring access unit belongs to that multicast group, a copy of this message is produced and it is sent to the flow mapping unit 2804-y, while this message is given to the neighboring optical ring access unit 2803-z via the default channel. On the other hand, if this optical ring access unit does not belong to that multicast group, the operation to just give this message to the neighboring optical ring access unit 2803-z via the default channel is carried out.

In this method, a procedure for comparing the multicast group address written in the destination field of the message with the multicast group addresses assigned to each optical ring access unit 2803-x at each optical ring access unit 2803-x that received the many communication prmulticast communications, so that in the case of accommodating many protocols unifiedly using the concept of flow as in the message relay device 101 of this embodiment, it becomes possible to handle the multicast communications easily by using the above described scheme.

Finally, in the case where the address written in the destination field of the internal message is the other address, that is, an address indicating point-to-point communication, this message is branched if the destination address coincides with the own board/card number, whereas otherwise this message is given to the neighboring optical ring access unit 2803-z via the default channel. Here, it is also possible to refer to the source field and discard this message when it is sent by this optical ring access unit itself. In this way, it is possible to prevent this message from many communication protocols in the case of promulticast communications, so that in the case of accommodating many protocols unifiedly using the concept of flow as in the message relay device 101 of this embodiment, it becomes possible to handle the multicast communications easily by using the above described scheme.

Finally, in the case where the address written in the destination field of the internal message is the other address, that is, an address indicating point-to-point communication, this message is branched if the destination address coincides with the own board/card number, whereas otherwise this message is given to the neighboring optical ring access unit 2803-z via the default channel. Here, it is also possible to refer to the source field and discard this message when it is sent by this optical ring access unit itself. In this way, it is possible to prevent this message from being transferred indefinitely on the default channel and thereby wasting the bandwidth of the default channel when the optical ring access unit 2803-x that is the destination of the point-to-point communication fails to operate normally for some reason.

In this method, a procedure for comparing the board/card number contained in the internal label that is written in the destination field of the message with the board/card number assigned to each optical ring access unit 2803-x at each optical ring access unit 2803-x that received the internal message is added to the method for broadcast described above. For this reason, the board/card number of the destination is given as the destination of each message at a time of transmitting the message toward the default channel. In order to do this, it is preferable to receive a notification of the board/card number of the destination, and in this exemplary configuration, the board/card number of the destination interface board/card 2801-y is notified to the source interface board/card 2801-x using the control message as will be described in detail below.

This completes the description regarding the communications in the default channel.

Next, the communications in the bypass channel will be described in detail. In the message relay device 101 of this embodiment, the communications in the bypass channel are carried out according to the following principle.

As described so far, in the message relay device 101 of this embodiment, the flow defined by the prescribed condition is detected from the message flow entered from the routing processing device 102-x, and the bypass channel in which the amount of processing required at a time of transferring the flow is considerably reduced is allocated to the flow so as to improve the overall throughput considerably. In the exemplary configuration described here, the physical constraint associated with electric circuits is also relieved by adopting the wavelength division multiplexed burst optical switching in the switching function 202, so as to improve the overall throughput even further. In this case, before the actual information transmission between the interface boards/cards 2801-i and 2801-j, a wavelength on the optical fiber is allocated to the detected flow and the information transmission path is set up.

In adopting the wavelength division multiplexed burst optical switching to the message relay device 101 of this embodiment, the number of wavelengths that can be multiplexed into a single optical fiber is a system parameter that significantly affects a method for setting up the information transmission path.

In the case where the number of wavelengths that can be multiplexed is greater than or equal to the number of accommodated interface boards/cards 2801-i, it is possible to carry out the wavelength allocation by the following method. Namely, a wavelength is to be allocated to an entry point of the bypass channel of each interface board/card 2801-i. When the interface board/card 2801-y detects the flow transmitted toward some interface board/card 2801-x, the interface board/card 2801-y transmits information by the wavelength $\lambda x$ that is allocated to that interface board/card 2801-x, after confirming that the other interface board/card 2801-z is not transmitting information toward the interface board/card 2801-x. The interface board/card 2801-x receives the information transmitted by the wavelength $\lambda x$ that is allocated to itself. In this scheme, the interface board/card 2801-x on the optical ring is to be selected by the wavelength so that the interface board/card 2801-y that is the source of the information have to select its own transmission wavelength according to the wavelength allocated to the destination interface board/card, but on the other hand, the reception wavelength of each interface board/card 2801-i can be fixed, so that there is an advantage that it is possible to utilize more conservative optical technology. In the following, this scheme will be referred to as the reception wavelength fixed scheme.

On the other hand, in the case where the number of wavelengths that can be multiplexed is less than the number of accommodated interface boards/cards 2801-x, the allocation of the wavelength to the flow may be carried out by the following method. In this case, if the wavelength is allocated to an entry point of the bypass channel of each interface board/card 2801-i, the wavelength resource would run out short. For this reason, the interface board/card 2801-i is made to be capable of changing the reception wavelength for the bypass channel. When the interface board/card 2801-y detects the flow transmitted toward some interface board/card 2801-x, the interface board/card 2801-y allocates the wavelength $\lambda w$ that is currently not used on the optical fiber, after confirming that the other interface board/card 2801-z is not transmitting information toward the interface board/card 2801-x. At the same time, the transmission wavelength for the flow at the interface board/card 2801-y that is the start point of the flow and the reception wavelength for the flow at the interface board/card 2801-x that is the end point of the flow are set to $\lambda w$. When the bypass channel is set up this way, the interface board/card 2801-y transmits information by the wavelength $\lambda w$ that is allocated to that flow. The interface board/card 2801-x receives the information transmitted by the wavelength $\lambda w$ that is allocated to that flow. In this scheme, the interface board/card 2801-i on the optical ring is required to select the wavelength at a time of reception as well as at a time of transmission of the information to the bypass route. For this reason, it can deal with the case where the number of boards/cards accommodated in the message relay device 101 of this embodiment is greater than the number of wavelengths that can be multiplexed, and there is an advantage regarding the system construction that the management of the interface boards/cards and the wavelength allocation is unnecessary at a time of increasing or decreasing the interface boards/cards 2801-x in the message relay device 101. In the following, this scheme will be referred to as the reception wavelength variable scheme.

The reception wavelength fixed scheme and the reception wavelength variable scheme have their own advantageous features as described above so that neither one can be considered superior to the other. The choice between them is a matter to be decided according to the level of the optical technology at a time of practicing the present invention and the characteristics required to this message relay device 101 as a system. For this reason, the following description of the exemplary configuration assumes that the reception wavelength variable scheme is adopted and the case of adopting the reception wavelength fixed scheme will be mentioned according to the need.

Figure 33:
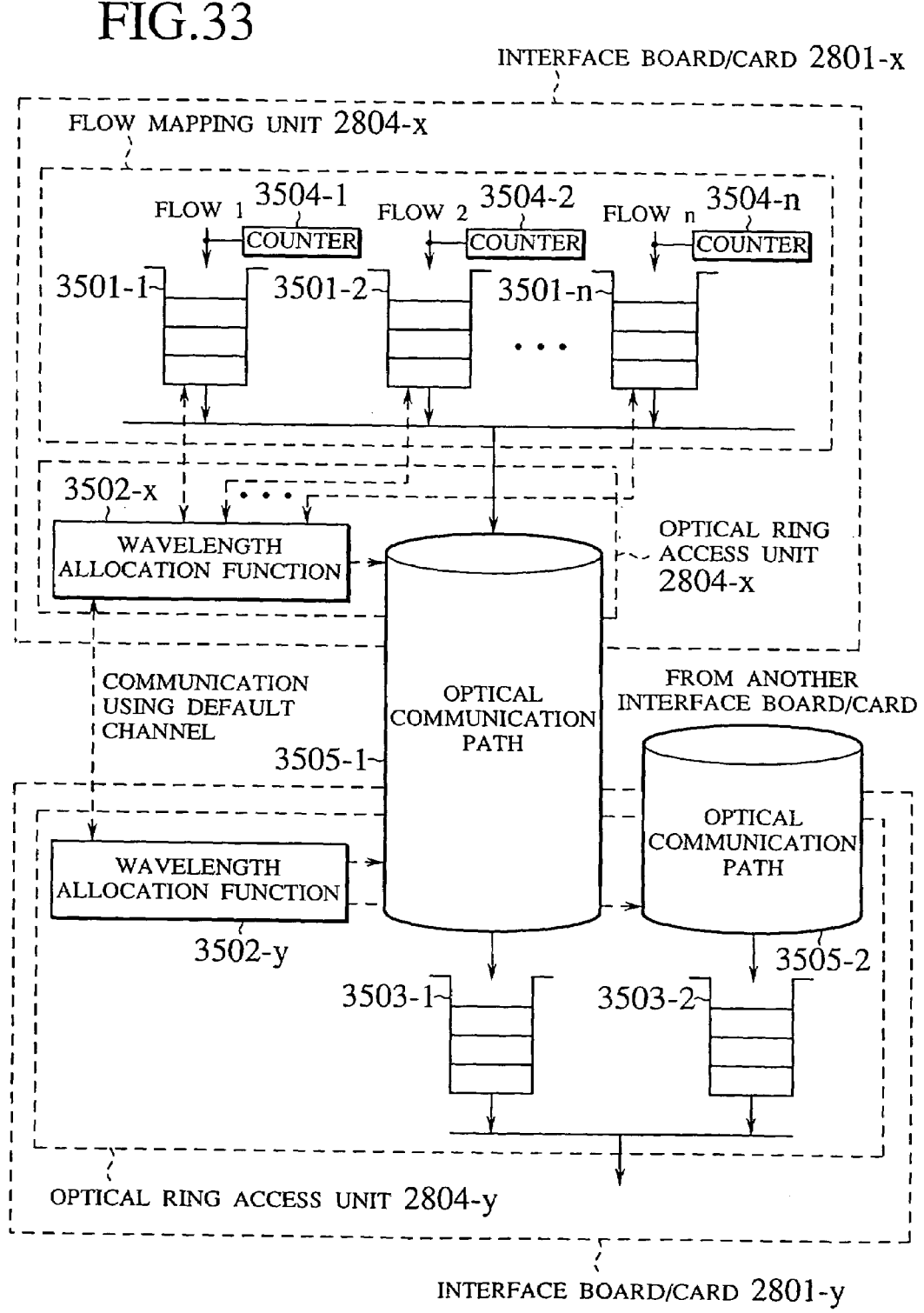
FIG. 33 is a schematic diagram showing an exemplary configuration of bypass channels in the message relay device of FIG. 27.

FIG. 33 shows the configuration of the bypass channel in the exemplary configuration of the present invention in the case of adopting the reception wavelength variable scheme conceptually. In FIG. 33, the interface board/card 2801-x is the start point of the flow and the interface board/card 2801-y is the end point of the flow.

The flow mapping unit 2804-i of each interface board/card 2801-i contains flow buffers 3501-1 to 3501-n. At the interface board/card 2801-z that is the start point of the flow, one flow buffer 3501-i is allocated to the flow detected by the flow mapping unit 2804-x of this interface board/card 2801-x. This flow buffer 3501-i plays the role of temporarily holding the message belonging to that flow according to the need, until the information transfer path for transferring the message is set up.

There is also a counter 3504-i provided at an entry point of each flow buffer 3501-i, which counts the number of messages belonging to that flow which arrive within a prescribed period of time. This counter 3504-i is provided for the purpose of detecting the disappearance of the flow. For example, when no message belonging to that flow arrives within the prescribed period of time, it can be regarded that the flow has disappeared. When the disappearance of the flow is detected, the flow buffer 3501-i that is allocated to that flow will be released.

There can be cases where a plurality of flows are simultaneously maintained at one flow mapping unit 2804-i. In such a case, the flow for which the bypass channel is to be set up is selected from these flows, and this can be done by selecting the flow that satisfies a prescribed condition, such as the flow that has the largest total amount of information (a sum of lengths of messages, as messages to be handled here are assumed to have variable length) held at the flow buffer 3501-i at some point in time, or the flow that contains a message for which the time held by the flow buffer 3501-i is longest, for example.

When the flow to be transmitted is determined, the wavelength allocation function 3502-x of the optical ring access unit 2804-x at the start point of the flow carries out communication using the default channel, searches for the wavelength $\lambda w$ that is unused on the optical fiber, and adjusts the own information transmission optical wavelength to the selected wavelength $\lambda w$, while notifying this wavelength $\lambda w$ to the wavelength allocation function 3502-y of the optical ring access unit 2804-y of the interface board/card 2801-y at the end point of the flow. The wavelength allocation function 3502-y at the end point of the flow then adjusts the reception wavelength to the notified wavelength $\lambda w$. At this point, the optical communication path 3505-1 that is the bypass channel for transferring information of some flow is set up. After that, the wavelength allocation function 3502-y at the end point of the flow notifies the completion of preparation to the wavelength allocation function 3502-x at the start point of the flow. When the completion of preparation at the receiving side is notified, the wavelength allocation function 3502-x at the start point of the flow reads out the messages held in the flow buffer 3501-x corresponding to the flow, and transfers them to the receiving buffer 3503-1 contained in the optical ring access unit 2804-x at the end point of the flow through the optical communication path 3505-1. This transfer of information belonging to the flow may be interrupted when all the messages that were held in the flow buffer 3501-x when the optical communication path 3505-1 was set up. In this case, when the information transfer for some flow is interrupted, it is possible to select the flow to be transmitted and set up the optical communication path for the information transfer for the selected flow again.

In the case of the message relay device 101 of this embodiment which temporarily holds the messages of each flow until the prescribed condition is satisfied and carries out the switching processing collectively for these temporarily held messages as described above, there is a possibility for lowering the overall throughput of the message relay device 101 of this embodiment as the information transfer requests from a plurality of optical ring access units 2804-y, 2804-z, etc., collide at the entry point of some optical ring access unit 2804-x. This is similar to the HOL (Head Of Line) blocking which is the biggest cause of the throughput lowering in the conventional packet switching element using electric circuits. In the message relay device 101 of this embodiment, the HOL blocking also occurs because the information transfer route inside the device is controlled according to the message arrival which is not subjected to the global scheduling and the destination of the arrived message is selected regardless of the other messages, similarly as in the conventional packet switching element using electric circuits.

In order to relieve this HOL blocking effectively, the message relay device 101 of this embodiment adopts a configuration in which each interface board/card 2801-x on one optical ring 2802-x is capable of receiving a plurality of wavelengths simultaneously, as shown in FIG. 33 where the wavelength allocation function 3502-y on the receiving side of the default channel is shown to be capable of setting up two optical communication paths 3505-1 and 3505-2 simultaneously. In this way, it becomes possible to receive traffics from two interface boards/cards simultaneously through the bypass channels, so that the HOL blocking can be relieved. In the case of the configuration shown in FIG. 33, the receiving buffers 3503-1 and 3503-2 are provided in correspondence to the respective bypass channels. The information held by the respective receiving buffers 3503-1 and 3503-2 is read out by the flow mapping unit (not shown) connected to this optical ring access unit 2804-y, applied with the prescribed processing, and transmitted to the external of the message relay device 101 of this embodiment.

Figure 34A:
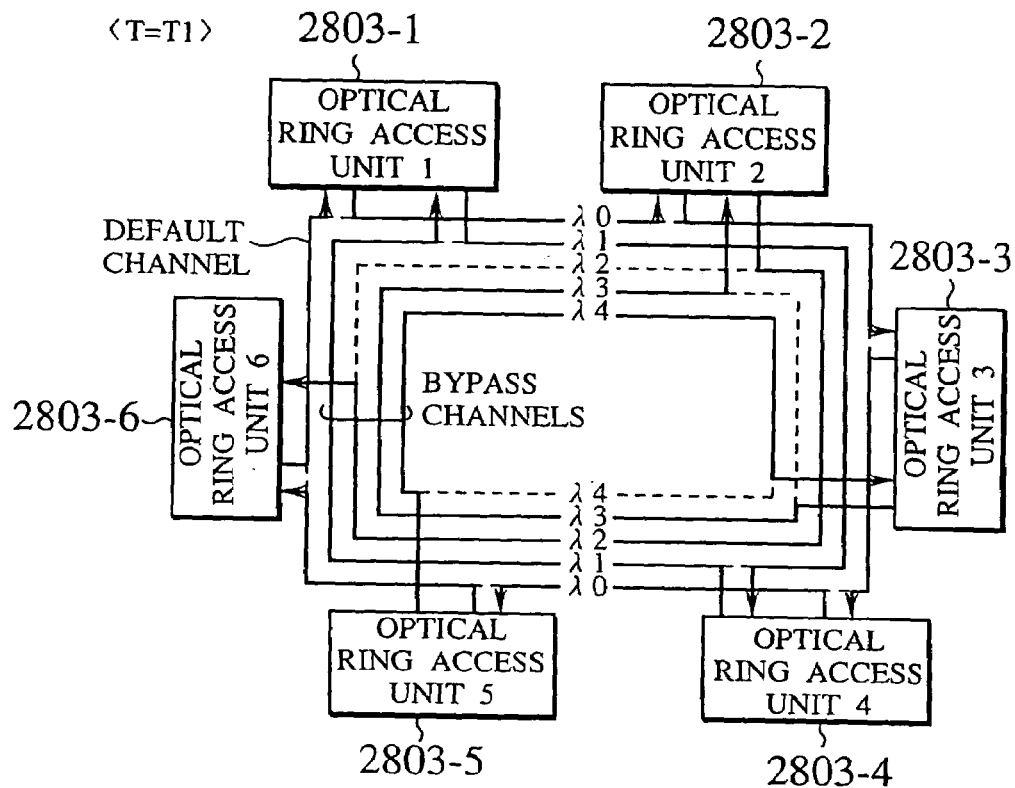
FIGS. 34A and 34B are schematic diagrams showing exemplary settings of active bypass channels in the message relay device of FIG. 27.
Figure 34B:
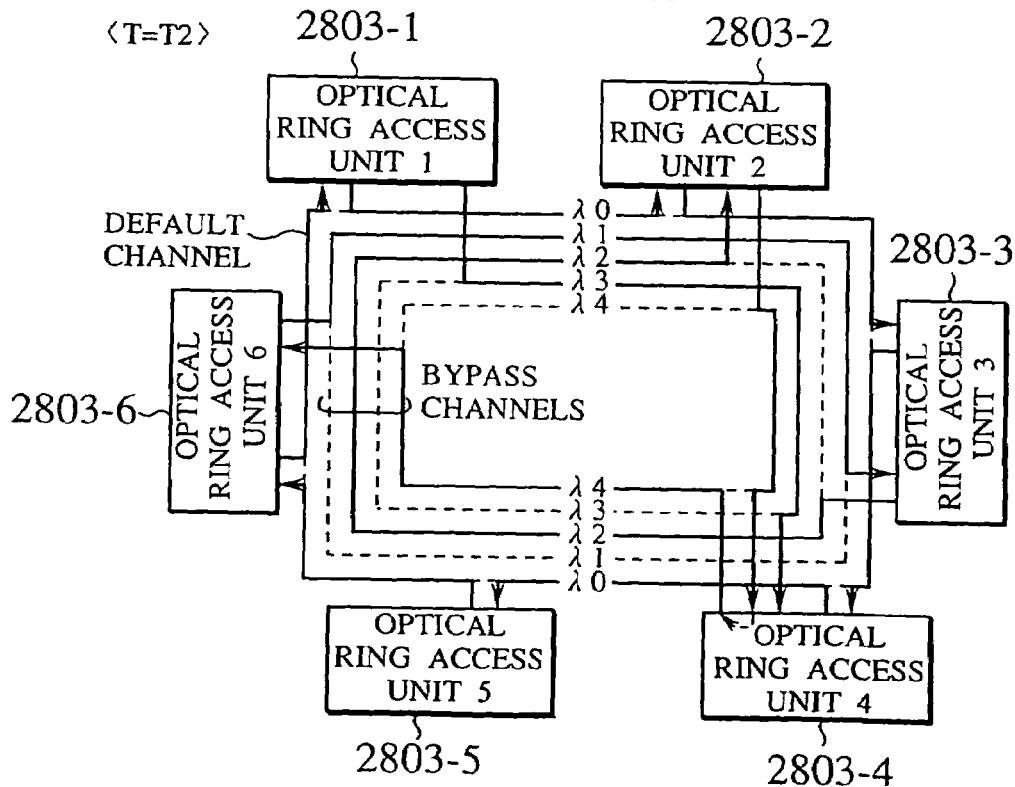

By setting up the bypass channel as described above, the bypass channel is to be set up dynamically according to a situation regarding the message arrival at each interface board/card 2801-i. FIGS. 34A and 34B show exemplary cases of this situation. FIG. 34A (T=T1) shows the bypass channel set up state in the message relay device 101 of this embodiment at some time T1, while FIG. 34B (T=T2) shows the bypass channel set up state at another time T2. In FIG. 34A, five bypass channels are set up, one from the optical ring access unit 2803-1 to the optical ring access unit 2803-4 using the wavelength λ1, one from the optical ring access unit 2803-2 to the optical ring access unit 2803-6 using the wavelength λ2, one from the optical ring access unit 2803-3 to the optical ring access unit 2803-2 using the wavelength λ3, one from the optical ring access unit 2803-4 to the optical ring access unit 2803-1 using the wavelength λ1, and one from the optical ring access unit 2803-5 to the optical ring access unit 2803-3 using the wavelength λ4.

In the example described here, there are bypass channels through which the messages passes while remaining in forms of optical signals through the optical ring access unit 2803-i. This is realized by the optical switching technique as will be described in detail below, and because of this each optical ring access unit 2803-i can have the throughput that is unrealizable in the switching element using electric circuits. In this way, it becomes possible to adopt the ring topology, that is very advantageous from a viewpoint of realizing broadcast and multicast and having characteristic that the message transmitted by the other interface board/card 2801-x is transferred via the interface boards/cards other than the destination interface board/card 2801-y, as a topology inside the device, while maintaining the very high overall throughput of the message relay device 101 of this embodiment. In the case of adopting the conventional switching element using electric circuits, the ring topology has not been adopted even in a situation where broadcast and multicast are required because the throughput that can be provided by the electric circuits is low and it has been necessary to adopt architecture such as cross-bar switch, which has an advantage that the message is not transferred to the interface boards/cards other than the destination interface boards/cards but which lowers the overall throughput as it requires very complicated processing in order to realize broadcast and multicast. In addition, in the example described here, the wavelength λ1 is used for a plurality of times (twice in this example) in the same optical ring. This is called the reuse of wavelength, and by reusing the wavelength in this manner, it is possible to improve the throughput of the optical ring. The fact that the wavelength is reusable is one of the advantages of the reception wavelength variable scheme.

FIG. 34B shows a state at time T2 in which the switching processing has progressed from the situation shown in FIG. 34A such that the optical ring access units 2803-1, 2803-2, 2803-3, 2803-4 and 2803-5 release the respective bypass channels used until then, and set up new bypass channels corresponding to another flow. As such, the major feature of the message relay device 101 of this embodiment is the fact that the internal bypass channel can be set up flexibly in correspondence to the inflowing traffic that is continually changing in time, and the optical burst switching technique is adopted in order to realize the burst channel is continually changing in time. In FIG. 34B, four bypass channels are set up, one from the optical ring access unit 2803-1 to the optical ring access unit 2803-4 using the wavelength λ3, one from the optical ring access unit 2803-2 to the optical ring access units 2803-4 and 2803-6 using the wavelength λ4, one from the optical ring access unit 2803-3 to the optical ring access unit 2803-6 using the wavelength λ3, and one from the optical ring access unit 2803-6 to the optical ring access unit 2803-3 using the wavelength λ1. Here, the bypass channels for realizing the multicast are set up by taking the advantage of the ring topology as described above. Note that there is a chain line with arrowhead from an input of signals for λ4 to an output for λ4 inside the optical ring access unit 2803-4, which indicates that the optical signal entered in λ4 is converted into the electric signal once and then immediately re-converted into the optical signal in λ4 again and outputted, according to the scheme of multicast in one exemplary configuration of the present invention as described in detail below. In the example described here, the optical ring access unit 2803-4 is receiving the optical signals from two bypass channels simultaneously.

Note that the configuration of the bypass channels conceptually shown in FIG. 33 is directed to the case of adopting the reception wavelength variable scheme, but the configuration of the bypass channels in the case of adopting the reception wavelength fixed scheme can be obtained from the configuration of FIG. 33 by making the following modification. Namely, the reception wavelength of the bypass channel that is set up by the wavelength allocation function 3502-y of the optical ring access unit 2804-y at the end point of the flow is fixed in advance. In this case, the wavelength allocation function 3502-x at the start point of the flow will be adjusted to transmit information by the wavelength allocated to the interface board/card 2801-y at the end point of the flow. Even in this case, the optical ring access units 2804-x and 2804-y at the start point and the end point of the flow should preferably carry out some communications. More specifically, after confirming that the other interface board/card 2801-z is not transmitting information toward the end point of the flow, the optical ring access unit 2804-x at the start point of the flow starts transmitting the information. In the case of using a configuration in which one interface board/card 2801-i is made capable of receiving a plurality of bypass channels simultaneously for the purpose of relieving the HOL blocking, different wavelengths should be allocated to different bypass channels.

This completes the description of the principle of communications in the bypass channel in this exemplary configuration of the present invention.

Next, the bypass channel set up method in this exemplary configuration will be described in detail.

Figure 35:
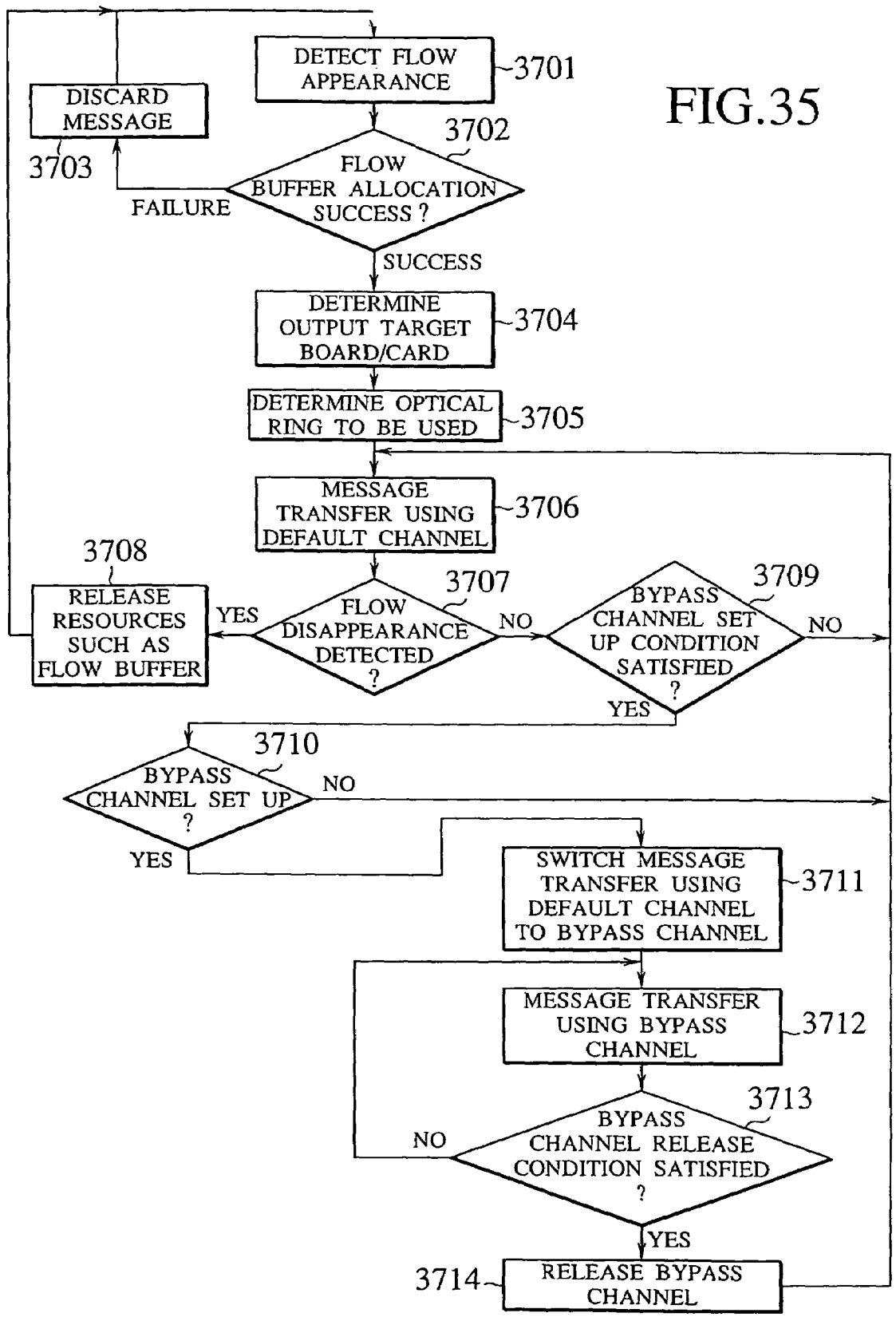
FIG. 35 is a flow chart for an exemplary bypass channel set up procedure in the message relay device of FIG. 27.

FIG. 35 shows the procedure for the bypass channel set up in this exemplary configuration. When the flow is detected at some interface board/card 2801-x (step 3701), one flow buffer 3501-i is selected and allocated to that flow (step 3702). There is a limit to the number of flow buffers 3501-i that are implemented in each interface board/card 2801-x so that there is a possibility for not being able to allocate the flow buffer to the flow when the flow is detected because all the flow buffers 3501-i are allocated to the other flows. In such a case, the allocation of the bypass channel to the flow is abandoned and this message is discarded (step 3703). Here, instead of discarding the message to which the flow buffer is not allocated at the step 3703, the message belonging to that flow may be immediately transmitted to the default channel. In this case, the routing of this message is realized by setting the broadcast address as the destination address of this message and transferring this message to all the interface boards/cards 2801-i, and checking a part of the information bits constituting this message at each interface board/card 2801-i to determine whether or not to take this message in and transmit it to the routing processing device 102-i at each interface board/card 2801-i. This scheme is applicable when the message has an address that is unique over the entire world as its destination and each interface board/card 2801-i can automatically learn addresses to be received by each interface board/card 2801-i, as in the case of Ethernet, for example.

On the other hand, when the allocation of the flow buffer 3501-i succeeds at the step 3702, this message as well as subsequently arriving messages belonging to that flow are stored into the allocated flow buffer 3501-x while the internal path in the message relay device of this embodiment that is to be followed by that flow is determined. More specifically, the destination interface board/card 2801-x is determined first (step 3704) and one of the four systems of optical rings that are provided in this exemplary configuration is selected next (step 3705). Then, the messages are sequentially taken out from the allocated flow buffer 3501-x and the message transfer using the default channel is carried out (step 3706). Here, the destination address of the internal message is the internal label indicating the destination interface board/card 2801-x, and the point-to-point communication using the default channel is carried out. By carrying out the message transfer using the default channel at a stage where the flow is detected and the transfer route of that flow inside the device is determined in this way, it is possible to transfer the messages sequentially to the specified destination even in the case where the time required until the bypass channel set up becomes very long due to the shortage of the wavelength resources on the optical ring, so that the delay time of the individual message can be suppressed small. While the message transfer using the default channel is carried out, the occurrence of any of the events to be described next is awaited.

The first event is an event that the flow has disappeared (step 3707). This event is detected by monitoring the arrival of messages belonging to the flow by providing the counter 3504-x in correspondence to the flow buffer 3501-x and regarding that the flow has disappeared when no message belonging to that flow arrives within a prescribed period of time, as already mentioned above. When this event occurs, the flow buffer allocated to that flow and the other resources are released (step 3708). More specifically, entries of various tables provided in the message relay device 101 of this embodiment are released as will be described in detail below.

The second event is an event that a prescribed condition called bypass channel set up condition is satisfied (step 3709). This event can be regarded as occurred when a prescribed condition such as that an amount of messages held in the allocated flow buffer 3501-x exceeds a prescribed threshold is satisfied, for example.

When the bypass channel set up condition is satisfied, the bypass channel for transferring the, messages belonging to that flow is set up (step S3710). When the set up of the bypass channel fails, the communication is continued using the default channel. When the set up of the bypass channel succeeds, the transfer using the default channel is switched to the transfer using the bypass channel (step 3711) and the message transfer using the bypass channel is carried out (step 3712).

While the message transfer using the bypass channel is carried out, an event that the bypass channel release condition is satisfied is awaited (step 3713). This condition can be a condition such as that the corresponding flow buffer 3501-x becomes empty, for example. When the bypass channel release condition is satisfied, the bypass channel is released (step 3714) and the message transfer for that flow is returned to the default channel thereafter.

Figure 36:
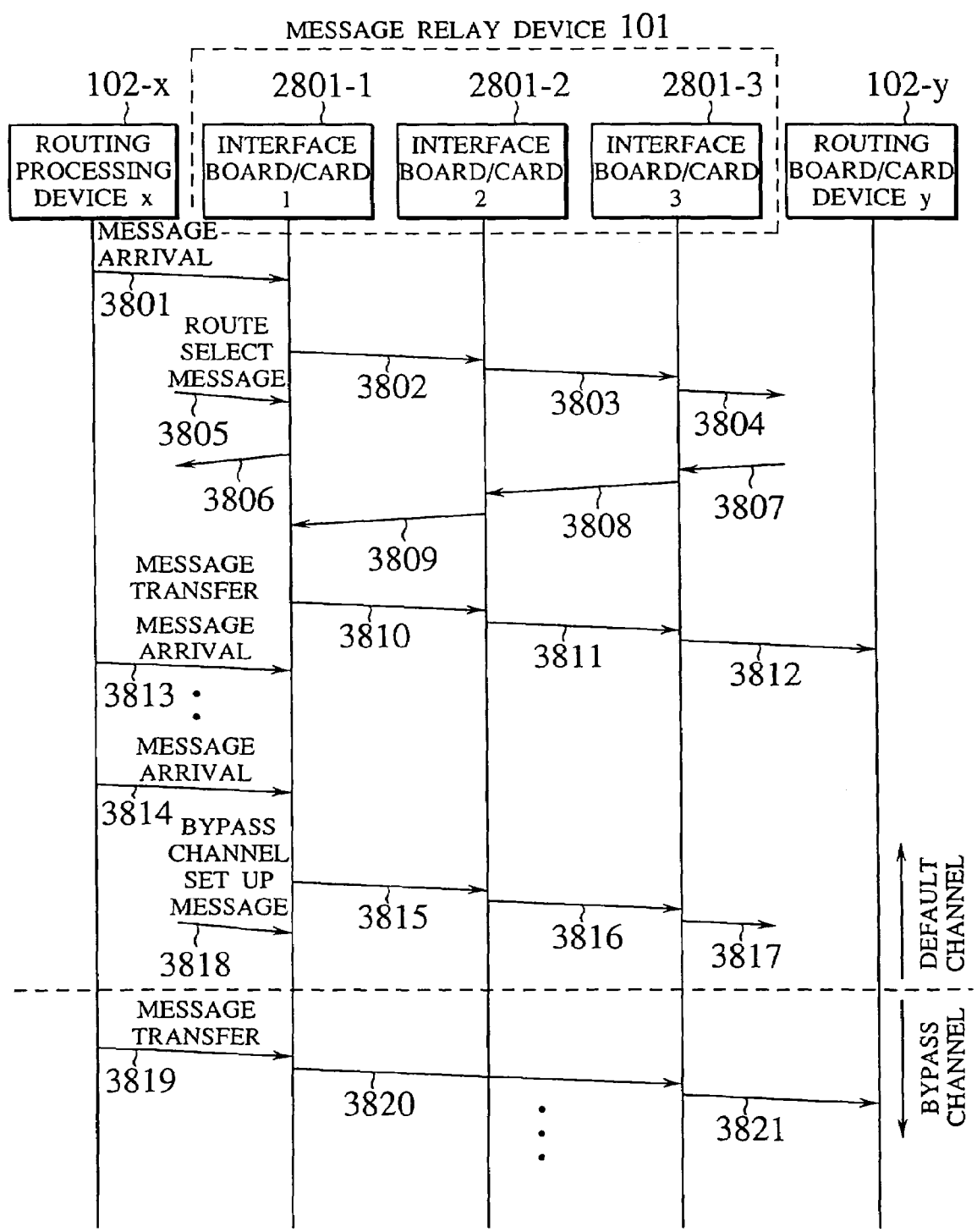
FIG. 36 is a sequence chart for an exemplary message transfer during a bypass channel set up in the message relay device of FIG. 27.

Next, the operation to be carried out by the message relay device 101 in this exemplary configuration at a time of setting up the bypass channel will be described in further detail for the case of accommodating Ethernet at the interface boards/cards. FIG. 36 shows a message transfer sequence that takes place during the bypass channel set up. FIG. 36 shows a situation in which the routing processing device 102-x transfers a message to the routing processing device 102-y via the message relay device 101 of this embodiment. The routing processing device 102-x is connected to the interface board/card 2801-1 and the routing processing device 102-y is connected to the interface board/card 2801-3. As shown in FIG. 36, in this exemplary configuration, the bypass channel for transferring the message belonging to some flow is set up by exchanging a route selection message and a bypass channel set up message through the default channel between the interface boards/cards 2801-x.

When a message arrives from the routing processing device 102-x (step 3801), the interface board/card 2801-1 checks whether the flow to which the message belongs is already detected and the flow buffer 3501-x is already allocated to that flow or not. In the case where the flow buffer 3501-x is already allocated to the flow to which the message belongs, a prescribed internal header is attached to this message and then this message is stored into the allocated flow buffer 3501-x.

Otherwise, according to the flow chart shown in FIG. 35, the flow buffer 3501-x is allocated to that flow first (step 3702 of FIG. 35). The arrived message is temporarily held in this flow buffer. Next, the destination board/card of this message is determined (step 3704 of FIG. 35). In the exemplary configuration described here, the determination of the destination board/card of the message is carried out by using the route selection message as follows.

The route selection message is a message valid only within the message relay device of this embodiment and has the aim of determining the information transfer route within this exemplary configuration. A certain interface board/card 2801-i transmits this message toward the default channel of a certain ring, waits until it is returned via the interface boards/cards 2801-j, 2801-k, etc., on the ring, and refers to the information section of the returned message, so as to ascertain the internal label assigned inside this device to the interface board/card 2801-x corresponding to the address of the protocol accommodated at the interface board/card 2801-i (the Ethernet address in this example) and a distance on the ring to the interface board/card specified by that address, that is, the hop count.

In this exemplary configuration, the rings with the route inside the device in either the clockwise direction or the counter-clockwise direction are provided, so that there are two routes, the clockwise route and the counter-clockwise route, as a route to be selected in going from one board/card to a desired board/card. As described above, the route for actually setting up the bypass channel is determined from these two routes. In this exemplary configuration, the most important information in selecting the route is the hop count up to the destination interface board/card. By selecting the route with the smaller hop count, the bandwidth on the optical ring that is consumed by each message can be suppressed in this exemplary configuration so that the overall throughput of this exemplary configuration can be improved. The route selection message is transmitted to each of these routes for the purpose of measuring which route has the smaller hop count.

In FIG. 36, the route selection message that is circulated through the interface boards/cards 2801-x via the clockwise route is indicated by reference numerals 3802, 3803, 3804 and 3805, while the route selection message that is circulated through the interface boards/cards 2801-x via the counter-clockwise route is indicated by reference numerals 3806, 3807, 3808 and 3809. When the route selection message returns to the interface board/card that originally transmitted it (the interface board/card 2801-1 in the example shown in FIG. 36), this route selection message contains the information necessary for the route selection, which is given by the hop count up to the destination interface board/card of the message in this exemplary configuration.

The operation of each interface board/card 2801-i for the purpose of the hop count measurement using the route selection message and the collection of the internal label assigned at the interface board/card 2801-x specified by the address of the protocol is as follows. FIG. 37 shows the operation of each interface board/card 2801-i in the clockwise route. In FIG. 37, reference numerals 3901, 3902, 3903, 3904, 3905 and 3906 represent information contained in the route selection message. Note that these reference numerals also indicate the order in which the route selection is executed.

As shown in FIG. 37, the fact that a certain message is the route selection message is indicated by the type field in the internal header. Also, the fact that information contained in the information section of this message is related to Ethernet protocol is indicated by the protocol field in the internal header. Also, the source field of the internal header indicates the interface board/card that sent this message, which is the interface board/card 2801-1 in the example shown in FIG. 37, and contains the internal label assigned to the flow for which the route selection is to be made according to this route selection message. In the internal header, the board/card number of the internal label indicates the board/card number of that interface board/card, the physical link number indicates the physical link number of the physical link from which the flow will be entered, and the logical path number indicates the logical path number produced by that interface board/card. The method for producing the logical path number is different depending on the accommodated protocol and the selected flow definition information, but when the accommodated protocol is Ethernet and the flow definition information is the destination Ethernet address in the Ethernet frame, it can be given by an identifier assigned to the allocated flow buffer, that is, the buffer number. The destination field of the internal header is the ring circulation address. On the other hand, the information section of the route selection message contains the address of the protocol accommodated by that interface board/card 2801-x that indicates the end point of the flow, which is the Ethernet address in this example, the internal label indicating the physical link having that Ethernet address, and the hop count up to that physical link. Note that, in FIG. 37, only the board/card number contained in the internal label is shown for the sake of simplicity. Note also that the operation in the case of the counter-clockwise route can be similar.

Referring now to FIG. 37, when the message belonging to the flow for which the destination board/card is not yet determined is received, the interface board/card 2801-1 produces the route selection message having information as shown in a box 3901, selects one of the clockwise rings, and transmits the route selection message to the neighboring interface board/card on the ring, which is the interface board/card 2801-2 in this example, via the default channel (step 3901). At this point, a value of the destination address of the Ethernet header of the message arrived from the routing processing device 102-x, which is "xxx" in this example, is written into the destination L2 address field. Also, in the information section which is the field for writing information obtained by this message, the hop count is set to be 0 and the destination internal label is set to be UNKNOWN. Here, UNKNOWN indicates that this information is not yet obtained.

As the destination field of the internal header of the route selection message has the ring circulation address, the interface board/card that received this message, which is the interface board/card 2801-2 in this example, pulls out this message and applies the following processing.

First, the board/card number in the source field of the internal header of the message is compared with the own board/card number. If they coincide, it implies that this is a message sent by this interface board/card itself and the information section of this message contains information regarding the route that was requested by this interface board/card. Consequently, the processing regarding the message transfer that is required in this exemplary configuration is carried out using this information. On the other hand, if they do not coincide, this message is inserted again into the default channel of the ring that circulates in the same direction as the ring from which this message is entered, after applying the following processing.

First, the value of the destination internal label in the information section of this message is checked. If it is not UNKNOWN, it implies that this message has already passed the board/card that has the destination L2 address contained in this message. In this case, this message is inserted into the prescribed default channel without applying any further processing.

On the other hand, if it is UNKNOWN, it implies that this message has not passed the board/card having the destination L2 address yet. In this case, the destination L2 address written in the information section of this message is compared with the L2 address of a device connected to this interface-board/card. If the L2 address of a device connected to this interface board/card coincides with the destination L2 address written in the information section, it implies that this interface board/card is the destination searched by this message. In this case, the own board/card number, as well as the physical link number of the physical link by which a device having that L2 address is connected and the logical path number produced by this interface board/card if necessary, are written into the destination internal label field, and this message is inserted into the default channel of the same ring from which this message is received. On the other hand, if the L2 address of a device connected to this interface board/card does not coincide with the destination L2 address written in the information section, the value of the hop count field is incremented by one and written back into the hop count field, and this message is inserted into the default channel of the same ring from which this message is received.

Here, in order for each interface board/card 2801-x to learn the L2 address of a device connected to each interface board/card 2801-x, the source Ethernet address contained in the Ethernet header of a message received at each interface board/card 2801-x is extracted.

As a result of carrying out the above operation at each interface board/card 2801-x on the ring, the route selection message sent from the interface board/card 2801-1 circulates through the interface boards/cards along the clockwise ring and returns to the interface board/card 2801-1, as shown in FIG. 37. In the example shown in FIG. 37, a device having the destination L2 address "xxx" is assumed to be connected on the interface board/card 2801-5. At each of the intermediate interface boards/cards 2801-2, 2801-3 and 2801-4 before reaching to the interface board/card 2801-5, the value of the hop count field of the route selection message is incremented by one and transmitted (steps 3902, 3903, 3904). At the interface board/card 2801-5, the board/card number of the interface board/card 2801-5 is written into the destination internal label (step 3905). At the interface board/card 2801-6, the message is transmitted to the default channel again without applying any processing (step 3906). In this way, when the message returns to the interface board/card 2801-1, the information section of the message contains the internal label of the interface board/card of the destination L2 address "xxx" and the hop count on the ring up to that interface board/card.

The similar operation is also carried out on the counter-clockwise ring next. As a result, when the message returns to the interface board/card 2801-1, the information section of the message contains the internal label of the interface board/card of the destination L2 address "xxx" and the hop count on the ring up to that interface board/card, similarly as in the case shown in FIG. 37.

By comparing the hop count obtained as a result of processing the route selection message in the clockwise ring and the hop count obtained as a result of processing the route selection message in the counter-clockwise ring, the interface board/card 2801-x can determine the route through which the interface board/card having some internal label can be reached by fewer hop count. This result is maintained in a table called internal route information holding table 4101 that is provided in each interface board/card 2801-x in this exemplary configuration.

FIG. 38 shows a format of the internal route information holding table 4101. The internal route information holding table 4101 is a table that can be referred by the internal label, and each entry contains at least a primary route field indicating the route to be selected with the higher priority in the case of selecting the route, a selected route field indicating the optical ring through which the flow to which the internal label is assigned is actually transferred currently, and a selected channel field indicating whether the corresponding flow is currently transferred by the default channel or the bypass channel. In the primary route field, information indicating the direction (clockwise or counter-clockwise) of the shorter route determined by comparing the hop counts obtained as a result of the above described route selection processing is written. In the case of adopting the ring shaped topology, the selection of the shorter route can reduce the amount of consumption of the information transfer bandwidth on the ring so that the higher throughput can be realized. For this reason, the direction of the shorter route is set as the primary route. On the other hand, the method for producing information written into the selected route field will be described later on. Also, the selected channel field is a field whose value is rewritten by following the change of the channel for carrying out the transfer according to the method to be described in detail below, and takes a value indicating the default channel during the communication using the default channel, a value indicating the bypass channel setting while setting up the bypass channel, or a value indicating the bypass channel when the bypass channel is available.

Now, when an IP message is transferred from the routing processing device 102-x to the routing processing device 102-y for the first time, the address resolution protocol for checking the layer 2 address that is set in correspondence to the desired destination layer 3 address is carried out between these routing processing devices 102-x and 102-y. This address resolution protocol is designed to utilize the fact that the broadcast is easy on Ethernet, and the destination address of the address resolution request message is a broadcast address commanding transfer of this message to all reachable devices. In this exemplary configuration, a message having the broadcast address as the destination address of the Ethernet header is processed as follows.

The address resolution protocol is executed by broadcasting the address resolution request message to a range in which a device having the destination layer 3 address may possibly exist, producing an address resolution response message for that request message at a device which received the address resolution message and which has the layer 3 address specified by that request message, and sending this response message to a device which issued the request. At this point, the source layer 2 address of the response message is the layer 2 address that a device that issued the request message wishes to learn.

FIG. 39 shows an exemplary message exchange in the case of executing the address resolution protocol between two routing processing devices 102-x and 102-y that are connected through the message relay device 101 of this embodiment. In the example shown in FIG. 39, it is assumed that, as a next hop address that can be obtained as a result of analyzing the destination layer 3 address of the message received by the routing processing device 102-x, the layer 3 address assigned to the routing processing device 102-y was obtained. When the next hop layer 3 address is obtained, the routing processing device 102-x next tries to obtain the layer 2 address of a device having that next hop layer 3 address by carrying out the above described address resolution. To this end, the routing processing device 102-x transmits the address resolution request message (step 4201).

Upon receiving this address resolution request message, the interface board/card 2801-1 of the message relay device 101 of this embodiment assigns the internal header to that address resolution request message, selects the optical ring inside the message relay device 101 according to a prescribed condition, and transmits the address resolution request message to the default channel of the selected optical ring (step 4202). The destination layer 2 address of this address resolution request message is the prescribed Ethernet broadcast address. Here, it is assumed that, at the flow mapping unit 2804-i of the interface board/card 2801-i that accommodates Ethernet, the broadcast address determined inside the message relay device 101 of this embodiment is assigned to the destination field of the internal header that is to be assigned to a message having the broadcast address as the destination layer 2 address, and that this message is transmitted immediately to the default channel without carrying out the allocation of the flow buffer 3501-i. Also, the internal label containing the board/card number of this interface board/card is given to the source field of the internal header according to the above described method.

Here, the above described condition for selecting the optical ring to which the address resolution request message is to be transmitted can be such that the optical ring with the lightest bypass channel load that is measured by some method is to be selected. Here, it is assumed that the optical ring in the clockwise direction is selected as a result of this selection.

As a result of the step 4202, the interface board/card 2801-2 receives the address resolution request message from the default channel. Since the destination field in the internal header of this message is the broadcast address, this address resolution request message is transmitted to the routing processing device 102-i that is connected to this interface board/card 2801-2 according to the above described algorithm (step 4203), while it is also transmitted to the neighboring interface board/card 2801-3 on the optical ring using the default channel (step 4204). In the direction pointing toward the routing processing device 102-i, the internal header is deleted and this message is transmitted as the address resolution request message of Ethernet.

Similarly, at the interface board/card 2801-3, the address resolution request message is transmitted to the routing processing device 102-y that is accommodated by this interface board/card while deleting the internal header (step 4205) while it is also transmitted to the next neighboring interface board/card 2801-i on the optical ring (step 4206). By carrying out this operation at each interface board/card of this optical ring, this message is circulated around the optical ring and eventually returned to the interface board/card 2801-1 (step 4207). Since the board/card number of this interface board/card 2801-1 is given as the source address of this address resolution request message, this message is discarded here according to the above described algorithm. By the operation up to this point, the address resolution request message is transferred to all the devices connected to the message relay device 101 so that the function necessary in processing the address resolution request message is realized.

Upon receiving the address resolution request message, the routing processing device 102-y learns that the own device is being referred to, so that the address resolution response message is produced as a response to the request message and given to the interface board/card 2801-3 of the message relay device 101 (step 4208). The interface board/card 2801-3 executes the series of processing shown in FIG. 35 using the Ethernet destination address in the layer 2 header portion of the address resolution response message, etc., and returns the address resolution response message to the interface board/card 2801-1 (steps 4209, 4210). Here, the address resolution response message can be transferred by either the default channel or the bypass channel, and it is selected according to the state of the interface board/card 2801-3 at a time of receiving the address resolution response message.

Upon receiving the address resolution response message, the interface board/card 2801-1 deletes the internal header and gives this response message to the routing processing device 102-x (step 4211). This completes the series of message exchanges related to the address resolution protocol execution.

Returning now to FIG. 36, the description of the message transfer sequence in this exemplary configuration is resumed. When the internal route of the flow is determined by the route selection message, the message arrived from the routing processing device 102-x is transferred from the interface board/card 2801-1 to the desired interface board/card 2801-3 using the default channel (steps 3810, 3811), the internal header is deleted at the interface board/card 2801-3 and this message is transferred to the desired routing processing device 102-y (step 3812). Note here that, according to the above described route selection method, what is determined at this point is only the direction (clockwise or counter-clockwise) to which this message should be transferred and which one of the rings connected to the interface board/card 2801-1 (four rings including two clockwise rings and two counter-clockwise rings in this example) is to be used is not yet determined. This ring to be used may be determined by the method for selecting the ring with the lightest default channel load that is measured by the prescribed method, for example, at a time of starting this message transfer using the default channel. From a viewpoint of avoiding change of the message arrival order as much as possible, it is preferable to write an information indicating this determined ring into the selected route field of the internal route information holding table 4101, and use the default channel of the same ring in the subsequent message transfers using the default channel.

Here, the format of the internal message used in this situation is as follows. The message to be transferred is entered into the information field of the internal message. On the other hand, the information indicating that it is user data is entered into the type field of the internal header of the internal message while the information indicating that this message is related to Ethernet protocol is entered into the protocol field. In addition, the internal label (which also contains the route information inside the device in this exemplary configuration) indicating the flow to which this message belongs that is obtained as a result of analyzing the message to be transferred is entered into the destination field of the internal header while the internal label indicating the interface board/card 2801-1 that received this message is entered into the source field.

The bandwidth of the default channel is shared by the interface boards/cards 2801-i and cannot be occupied by one interface board/card 2801-x alone. Consequently, even when the arrived messages are sequentially transferred to the prescribed interface board/card 2801-y using the default channel, if the amount of messages that arrive from the routing processing device 102-x increases (steps 3813, 3814). the amount of messages held in the flow buffer 3501-z allocated to the flow also increases. As a result, if the state in which the amount of arrived messages increases is maintained, the above described bypass channel set up condition, that is the condition that the amount of messages held in the flow buffer 3501-z exceeds the threshold, will be satisfied. When this event occurs (step 3709 of FIG. 35), the bypass channel is set up inside the device (step 3710 of FIG. 35). In the case of this exemplary configuration, this is done as follows.

In this exemplary configuration, the bypass channel set up actually involves the following operations. Namely, in the case of the reception wavelength variable scheme, it involves allocating a wavelength to the flow and tuning the transmitting end and the receiving end to the allocated wavelength. In the case of the reception wavelength fixed scheme, it involves checking that the bypass channel reception wavelength of the interface board/card 2801-3 at the end point of the flow is not used by the other interface boards/cards 2801-i and tuning the transmitting end to the checked wavelength. In the following, the bypass channel set up procedure in the case of the reception wavelength variable scheme will be described in detail first.

Figure 40:
FIG. 40 is a diagram showing an exemplary configuration of a wavelength allocation table used in the message relay device of FIG. 27.

Each interface board/card 2801-x allocates a wavelength to the flow that has this interface board/card itself as the start point, so that each interface board/card 2801-x is always comprehending a board/card to which the wavelength of the optical signal that is passing under this interface board/card is allocated, using a wavelength allocation table 4401 shown in FIG. 40. The wavelength allocation table 4401 is a table that can be searched by using a wavelength as a key, and each entry contains the board/card number of the interface board/card 2801-x at the transmitting end and the board/card number of the interface board/card 2801-y at the receiving end of the optical signal in the corresponding wavelength. In the case of newly allocating a wavelength to the flow, each interface board/card 2801-i refers to this table and searches out the unused wavelength.

Next, the interface board/card 2801-x that is trying to allocate the wavelength produces the bypass channel set up message and transmits it to the ring that is selected by the prescribed method. The bypass channel set up message is circulated sequentially through the interface boards/cards on the ring and returned to the source interface board/card after circulating around once, as indicated by reference numerals 3815, 3816, 3817 and 3818 of FIG. 36. While this message is circulated around the ring, each interface board/card that received this message executes the various operations necessary for the bypass channel set up, according to a command of this message.

Figure 41:
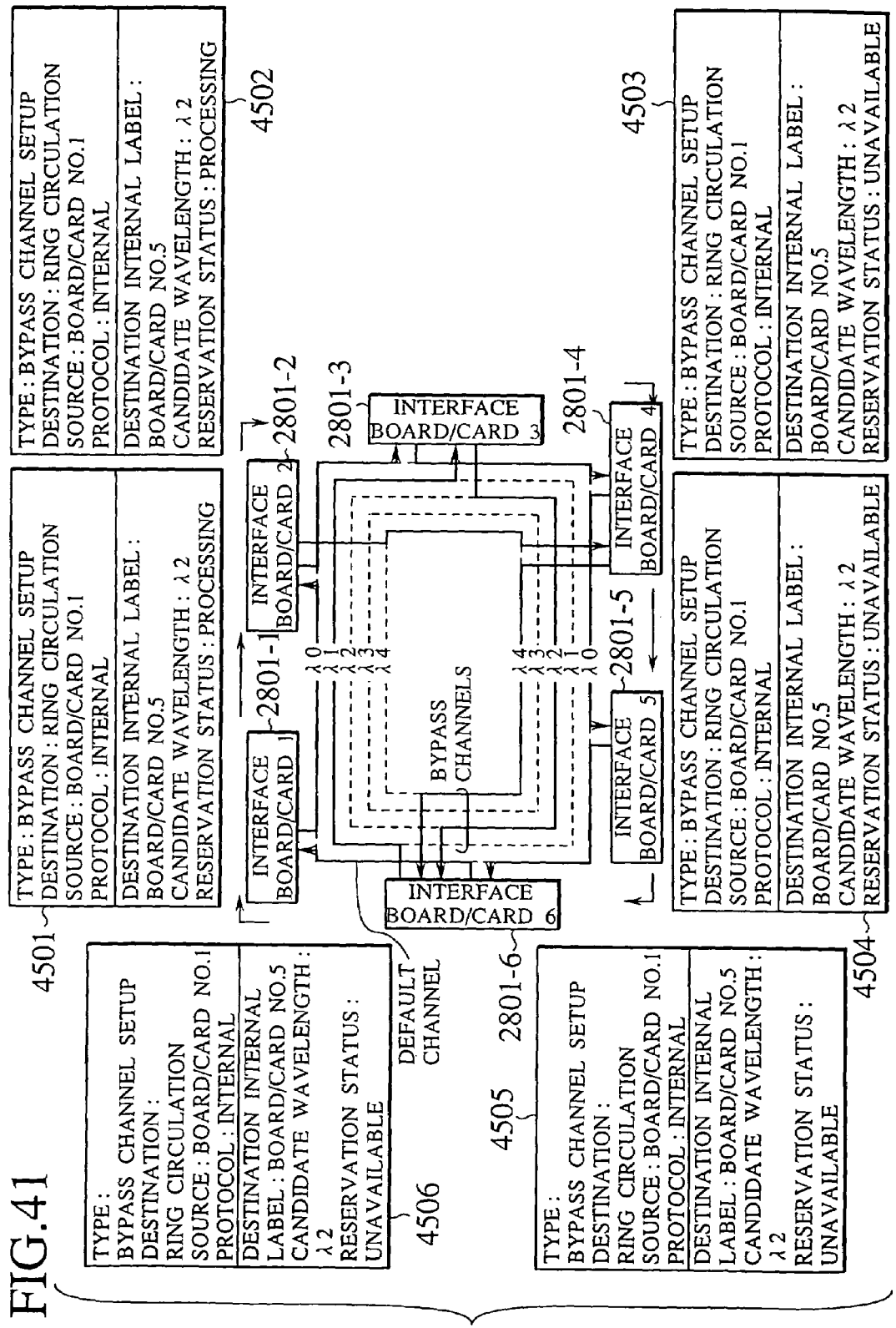
FIG. 41 is a schematic diagram for explaining an operation using a bypass channel set up message in the message relay device of FIG. 27.
Figure 42:
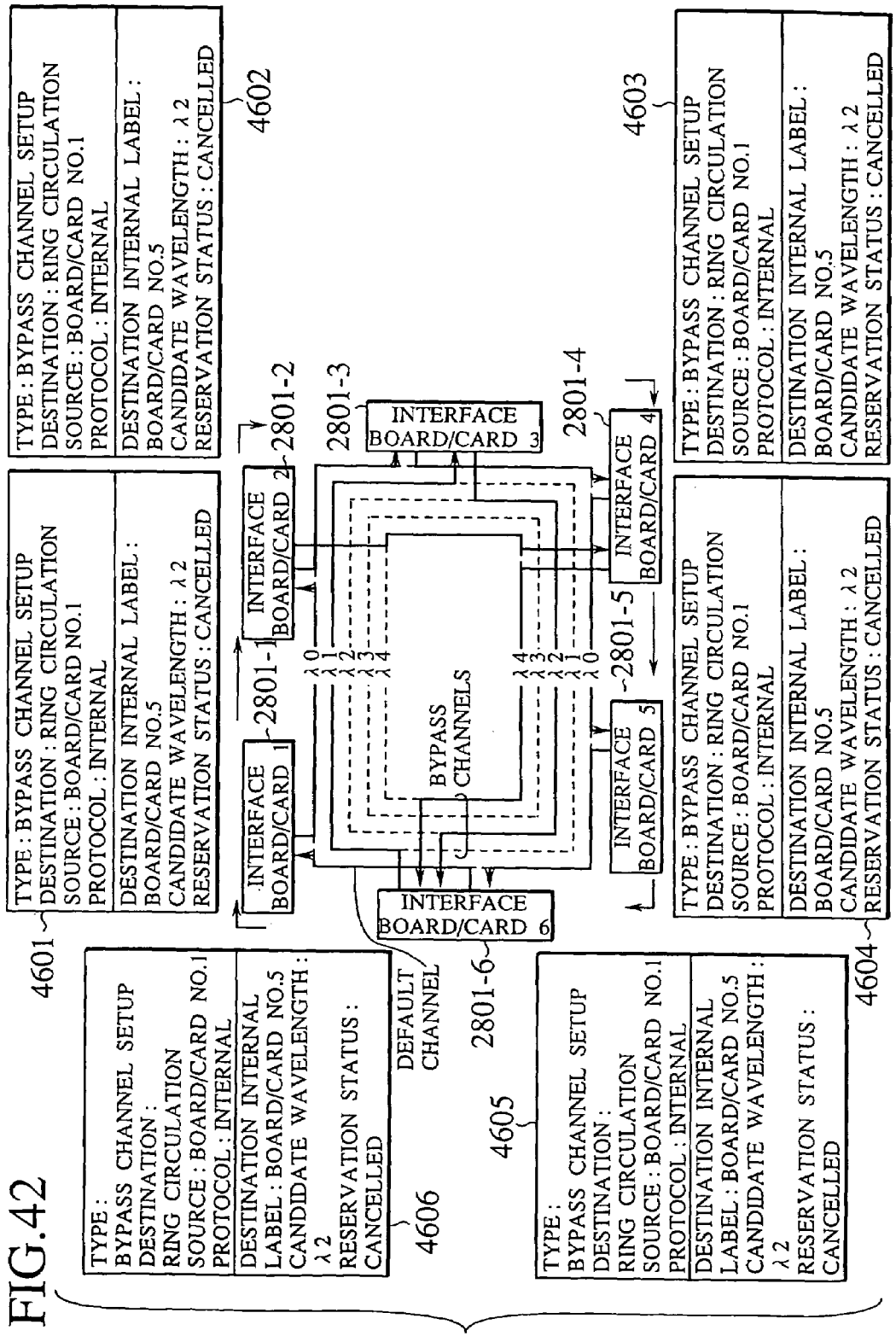
FIG. 42 is another schematic diagram for explaining an operation using a bypass channel set up message in the message relay device of FIG. 27.
Figure 43:
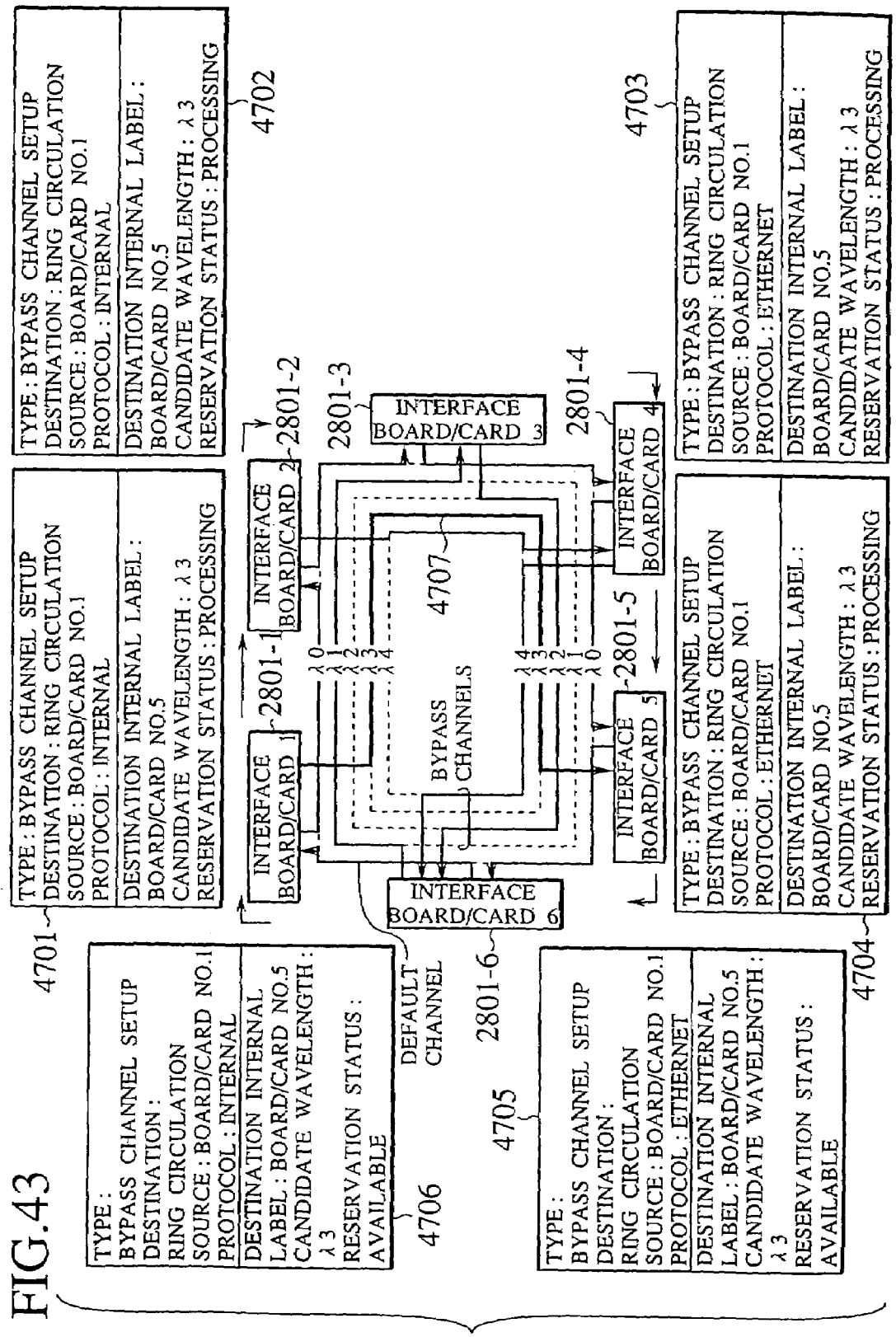
FIG. 43 is another schematic diagram for explaining an operation using a bypass channel set up message in the message relay device of FIG. 27.

FIGS. 41, 42 and 43 shows a procedure of the bypass channel set up using the bypass channel set up message in this exemplary configuration. In FIGS. 41, 42 and 43, boxes 4501, 4502, 4503, 4504, 4505, 4506, 4601, 4602, 4603, 4604, 4605, 4606, 4701, 4702, 4703, 4704, 4705 and 4706 indicate information contained in the bypass channel set up message. Note that these reference numerals also indicate the order in which the bypass channel set up is executed. As shown in these figures, the fact that a certain message is the bypass channel set up message is indicated by the type field in the internal header. Also, the fact that information contained in the information section of this message includes only information valid within this device is indicated by the protocol field in the internal header. In FIGS. 41, 42 and 43, this fact is indicated by the description "internal". Also, the destination field of this message contains an address indicating that this message sequentially circulates through the interface boards/cards 2801-x on the ring, that is the ring circulation address, while the source field of this message contains the internal label indicating the flow for which the bypass channel is to be set up according to this message at the interface board/card that transmitted this message, which is the interface board/card 2801-1 in this example. On the other hand, the information section of the bypass channel set up message contains the internal label indicating the flow at the interface board/card at the end point of the flow, a candidate wavelength that is a candidate for allocation to the flow, and an information called reservation status that indicates a state of the allocation in the procedure for allocating the wavelength to the flow. Note that, in FIGS. 41, 42 and 43, only the board/card number contained in the internal label is shown for the sake of simplicity.

The reservation status has four states of processing, available, unavailable, and cancelled. FIGS. 41, 42 and 43, show the procedure in the case where the interface board/card 2801-1 allocates a wavelength for the purpose of setting up the bypass channel for transferring messages to the interface board/card 2801-5 in the clockwise ring, while the interface board/card 2801-2 is transferring messages toward the interface boards/cards 2801-4 and 2801-6 using the wavelength $\lambda 4$, the interface board/card 2801-3 is transferring messages toward the interface board/card 2801-6 using the wavelength $\lambda 2$, and the interface board/card 2801-6 is transferring messages toward the interface board/card 2801-3 using the wavelength $\lambda 1$, through their respective bypass channels.

Referring now to FIG. 41, when the bypass channel set up condition is satisfied, the interface board/card 2801-1 produces the bypass channel set up message having information indicated by a box 4501, and transmits this message to the default channel of the ring selected by a prescribed method (step 4501). At this point, the interface board/card 2801-1 refers to the wavelength allocation table 4401 provided therein to select one of the unused wavelengths, and include it as the candidate wavelength in the information section of this message. Also, the value of the selected channel field in the internal route information holding table 4101 is rewritten as the bypass channel setting. In addition, the interface board/card at the transmitting end, which is the interface board/card 2801-1 in this example, and the interface board/card at the receiving end, which is the interface board/card 2801-5 in this example, that are trying to use that wavelength are registered into an entry of the wavelength allocation table 4401 corresponding to that wavelength. In the example shown in FIG. 41, the wavelengths $\lambda 2$, $\lambda 3$ and $\lambda 4$ are unused under the interface board/card 2801-1 and the interface board/card 2801-1 has selected the wavelength $\lambda 2$.

Since the destination field of the internal header of the bypass channel set up message indicates the ring circulation, the interface board/card that received this message, which is the interface board/card 2801-2 in this example, pulls out this message. Each interface board/card 2801-i applies the following processing to the pulled out bypass channel set up message.

First, the board/card number in the source field of the internal header of this message is compared with the board/card number of this interface board/card. If they coincide, this message is a message transmitted by this interface board/card, and if the reservation status has a value "available", it implies that the set up of the bypass channel using the wavelength written into the candidate wavelength field at a time of transmitting this message has been completed. In this case, the transmitting end is tuned to this wavelength, the value of the selected channel field of the internal route information holding table 4101 is set as the bypass channel, and the communication using the bypass channel is started. On the other hand, if the reservation status has a value "unavailable", it implies that the wavelength is used somewhere on the ring so that the communication using this wavelength cannot be made. In this case, the reservation of the wavelength is cancelled by the processing to be described below, and then either the bypass channel set up on another ring or using another wavelength may be attempted again, or the bypass channel set up may be abandoned.

If the board/card number in the source field of the internal header does not coincide with the own board/card number, this message is in a course of circulating through the interface boards/cards 2801-i. In this case, the reservation status of this message is referred next. If the reservation status has a value "unavailable", it implies that the wavelength written in this message is currently used somewhere on the route through which this message has already circulated so that the communication by the bypass channel using this wavelength is impossible. In order to notify this fact to the transmitting end, this message is transmitted without applying any processing, to the default channel of the same ring from which this message is received. On the other hand, if the reservation status has a value "available", it implies that the reservation of the wavelength written in this message on the route from the transmitting end to the receiving end has been completed so that the communication by the bypass channel using this wavelength is possible. In order to notify this fact to the transmitting end, this message is transmitted without applying any processing, to the default channel of the same ring from which this message is received.

If the reservation status has a value "processing", it implies that the bypass channel set up using this message that is circulating through the interface boards/cards 2801-x is currently in progress. In this case, the candidate wavelength field of this message is referred next, and the wavelength written in that field is matched with the wavelength allocation table 4401 of this interface board/card to see if this wavelength is currently used under this interface board/card or not. If it is currently used, the reservation status of this message is set as "unavailable", and this message is transmitted to the default channel of the same ring from which this message is received. On the other hand, if this wavelength is not currently used, the entry in the wavelength allocation table 4401 corresponding to this wavelength is updated by information contained in this message. Namely, the transmitting end field for this wavelength is rewritten from the source field of the internal header to the extracted board/card number, and the receiving end field for this wavelength is rewritten from the destination internal label in the information section of the internal message to the extracted board/card number. Then, the destination internal label of this message is referred and compared with the own board/card number. If it coincides with the own board/card number, it implies that this interface board/card itself is the end point of the flow, that is the receiving end. In this case, the reservation of the wavelength in the route up to this interface board/card from the transmitting end is completed at this point, and this wavelength becomes available for the bypass channel. In order to notify this fact to the transmitting end, the reservation status is rewritten as available, and this message is transmitted to the default channel of the same ring from which this message is received. At this point, the reception wavelength of this interface board/card is tuned to the wavelength written in this message at the same time. On the other hand, if the board/card number of the internal label and the own board/card number do not coincide, it implies that the wavelength reservation is completed in the route through which this message has already circulated, but it is still in a state of continuing the wavelength reservation in the route through which this message is going to circulate from now on. In this case, this message is transmitted to the default channel of the same ring from which this message is received, without carrying out any rewriting of this message.

By carrying out the above operation at each interface board/card 2801-i, the bypass channel set up on the ring is carried out. In the example shown in FIG. 41, the interface board/card 2801-1 is transmitting the bypass channel set up message with the wavelength $\lambda 2$ that is currently used by the interface board/card 2801-3 as the candidate wavelength (4501), so that at the interface board/card 2801-2 the updating of the wavelength allocation table 4401 is carried out and this message is transmitted to the default channel (4502), but the fact that the wavelength $\lambda 2$ specified by this message is already in use is detected during the processing of this message at the interface board/card 2801-3 so that this message is transmitted with the reservation status rewritten as unavailable (4503). At the interface boards/cards 2801-4, 2801-5 and 2801-6 through which this message circulates thereafter, this message does not trigger any processing of these interface boards/cards and is simply transferred toward the source interface board/card 2801-1 without being rewritten (4504, 4505, 4506).

When the bypass channel set up message is returned with the reservation status indicating "unavailable" (4506), the interface board/card 2801-1 cancels the reservation of the wavelength that is reserved by this message but will not be used thereafter on each interface board/card, which is the reservation of the wavelength $\lambda 2$ on the interface board/card 2801-2 in the example described here. FIG. 42 shows a procedure for carrying out this operation in detail.

In order to carry out this operation, the interface board/card 2801-1 at the start point of the flow transmits the bypass channel set up message with the reservation status set as "cancelled" to the default channel of the same ring (4601). The value of the other information fields of the bypass channel set up message are the same as those of the previously produced bypass channel set up message. The interface board/card 2801-x that received this bypass channel set up message with the reservation status indicating "cancelled" carries out the following operation. The board/card number written in the source field of the internal header of this message and the board/card number of the destination internal label written in the information section of this message are extracted, and compared with information regarding the transmitting end and the receiving end that is obtained by accessing the wavelength allocation table 4401 using the candidate wavelength written in the information section of this message as a key. When they coincide, it implies that this is the reservation information regarding the wavelength that is reserved by the previous message but will not be used actually, so that the values of the transmitting end and receiving end fields of this entry are rewritten to a value indicating "unused". Then, this message is transmitted to the default channel of the same ring from which this message is received.

As a result of carrying out the above operation at each interface board/card 2801-x, the bypass channel set up message with the reservation status indicating "cancelled" is circulated through the interface boards/cards 2801-x on the ring (4602, 4603, 4604, 4605, 4606), such that the unnecessary reservation made at a part of the route on the ring is cancelled. In the example shown in FIG. 42, the reservation for the wavelength $\lambda 2$ that was made at the interface board/card 2801-2 will be cancelled. Note that this series of operation carried out by the bypass channel set up message with the reservation status indicating "cancelled" is also utilizable in the procedure shown in FIG. 35 for realizing the bypass channel releasing (step 3714) which takes place after the bypass channel release condition is satisfied (step 3713).

When the cancellation of the wavelength reservation information is completed, next the interface board/card 2801-1 may select another wavelength or ring that is not used at this interface board/card and attempt to carry out the bypass channel set up again. FIG. 43 shows the operation in the case where the interface board/card 2801-1 carries out the bypass channel set up again by selecting another wavelength $\lambda 3$. Similarly as in the case of the initial attempt shown in FIG. 41, the interface board/card 2801-1 produces the prescribed bypass channel set up message, and transmits this message to the default channel of the selected ring (4701). In this case, the wavelength $\lambda 3$ is not used in the route up to the destination interface board/card 2801-5, so that this message passes through the interface boards/cards 2801-2, 2801-3 and 2802-4 with the reservation status remaining as "processing" (4702, 4703, 4704), and reaches to the interface board/card 2801-5. While this message is circulating through these interface boards/cards, the reservation of the wavelength $\lambda 3$ is carried out at each interface board/card. Then, at the interface board/card 2801-5, the board/card number of the destination internal label of this message coincides with the own board/card number, so that the reservation of the wavelength λ3 is carried out, the reception wavelength for the bypass channel at the interface board/card 2801-5 is tuned to the wavelength λ3, and the bypass channel set up message with the reservation status rewritten as "available" is transmitted (4705). This message is transferred to the interface board/card 2801-1 through the interface board/card 2801-6 (4706). This notifies to the interface board/card 2801-1 that the bypass channel set up is successfully completed. Thereafter, the interface board/card 2801-1 tunes the transmission wavelength for the bypass channel to the wavelength λ3, and starts the communication using the bypass channel (4707).

Returning now to FIG. 35 and FIG. 36, the state of 4707 in FIG. 43 corresponds to the step 3712 of FIG. 35 and the message transfer from the routing processing device 102-x to the routing processing device 102-y using the bypass channel indicated by 3819, 3820 and 3821 in FIG. 36. At a time of transition to this state, there is a need to switch the message transfer that has been carried out by the default channel until then into the message transfer by the bypass channel (step 3711 of FIG. 35).

This completes the detailed description of the bypass channel set up procedure in the case of the reception wavelength variable scheme.

Next, the bypass channel set up procedure in the case of the reception wavelength fixed scheme will be described in detail.

In the case of the reception wavelength fixed scheme, the wavelength that can be received as the bypass channel by each each interface board/card 2801-x is fixed. Consequently, the bypass channel set up becomes possible by modifying the above described procedure using the bypass channel set up message such that the wavelength that can be received is to be inquired.

Figure 50:
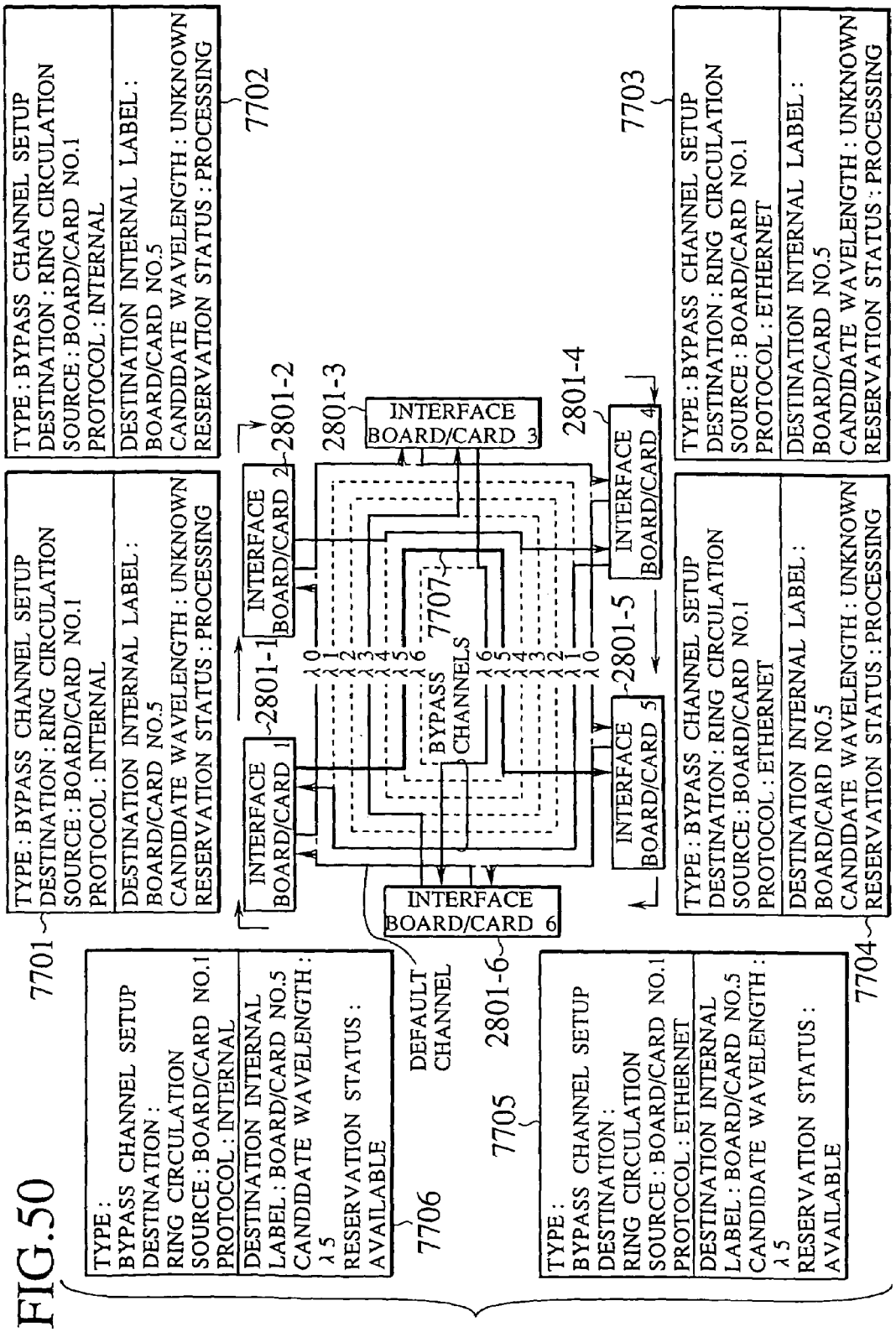
FIG. 50 is a schematic diagram for explaining a bypass channel set up procedure in the case of reception wavelength fixed scheme in the message relay device of FIG. 27.

FIG. 50 shows the detailed procedure in this case. The example shown in FIG. 50 shows the procedure in the case where the interface board/card 2801-1 sets up the bypass channel for transferring messages to the interface board/card 2801-5 in the clockwise ring, while the interface board/card 2801-2 is transferring messages toward the interface boards/cards 2801-4 and 2801-1, the interface board/card 2801-3 is transferring messages toward the interface board/card 2801-6, and the interface board/card 2801-6 is transferring messages toward the interface board/card 2801-3, through their respective bypass channels. In this example of FIG. 50, the reception wavelength fixed scheme is adopted at each interface board/card 2801-i so that the wavelength that can be received as the bypass channel by each interface board/card is fixed. In FIG. 50, it is assumed that the interface board/card 2801-1 can receive the wavelength λ1, the interface board/card 2801-2 can receive the wavelength λ2, the interface board/card 2801-3 can receive the wavelength λ3, the interface board/card 2801-4 can receive the wavelength λ4, the interface board/card 2801-5 can receive the wavelength λ5, and the interface board/card 2801-6 can receive the wavelength λ6. Also, in the message transfer from the interface board/card 2801-2 to the interface boards/cards 2801-4 and 2801-1, the wavelength λ4 of the received optical signal is converted into the reception wavelength λ1 of the interface board/card 2801-1 at the interface board/card 2801-4. Also, in FIG. 50, boxes 7701, 7702, 7703, 7704, 7705 and 7706 indicate information contained in the bypass channel set up message in this case. Note that these reference numerals also indicate the order in which the bypass channel set up is executed. In this case of the reception wavelength fixed scheme, the format of the bypass channel set up message differs from that shown in FIGS. 41 and 43 for the case of the reception wavelength variable scheme in that the candidate wavelength field has a value UNKNOWN so as to enable the inquiry of the wavelength that can be received by the board/card specified by the destination internal label at a time of transmission from the interface board/card 2801-1 at the start point of the flow.

Referring now to FIG. 50, the bypass channel set up procedure in the case of the reception wavelength fixed scheme will be described in further detail. When the bypass channel set up condition is satisfied, the interface board/card 2801-1 produces the bypass channel set up message having information indicated by a box 7701, and transmits this message to the default channel of the ring selected by the above described method (7701). The value of the candidate wavelength field at this point is UNKNOWN as already mentioned.

Since the destination field of the internal header of the bypass channel set up message indicates the ring circulation, the interface board/card that received this message, which is the interface board/card 2801-2 in this example, pulls out this message. Each interface board/card 2801-x applies the following processing to the pulled out bypass channel set up message.

First, the board/card number in the source field of the internal header of this message is compared with the board/card number of this interface board/card. If they coincide, this message is a message transmitted by this interface board/card, and if the reservation status has a value "available", it implies that the set up of the bypass channel using the wavelength written in the candidate wavelength field of this message has been completed. In this case, the transmitting end is tuned to this wavelength, and the communication using the bypass channel is started. On the other hand, if the reservation status has a value "unavailable", it implies that the wavelength is used somewhere on the ring so that the communication using this wavelength cannot be made. In this case, the bypass channel set up on another ring may be attempted again. In the case of the reception wavelength fixed scheme, the bypass channel set up using another wavelength on the same ring cannot be retried unlike the case of the reception wavelength variable scheme.

If the board/card number in the source field of the internal header does not coincide with the own board/card number, this message is in a course of circulating through the interface boards/cards 2801-x. In this case, the reservation status of this message is referred next. If the reservation status has a value "unavailable", it implies that the communication using the bypass channel with respect to the interface board/card written in the destination internal label of the information section of this message is continuing somewhere on the route through which this message has already circulated so that the communication by the bypass channel with respect to that interface board/card is impossible. In order to notify this fact to the source of this message, this message is transmitted without applying any processing, to the default channel of the same ring from which this message is received. On the other hand, if the reservation status has a value "available", it implies that it is in a state capable of carrying out the communication using the bypass channel from the source to the destination. In order to notify this fact to the source of this message, this message is transmitted without applying any processing, to the default channel of the same ring from which this message is received.

If the reservation status has a value "processing", it implies that the bypass channel set up using this message that is circulating through the interface boards/cards 2801-x is currently in progress. In this case, the destination internal label of this message is referred next, and compared with the own board/card number. If it coincides with the own board/card number, it implies that this interface board/card itself is the end point of the flow, that is the receiving end. In this case, if this interface board/card itself is not receiving any message from the bypass channel (or if there is an idle wavelength for the bypass channel in the case where one interface board/card is capable of receiving a plurality of wavelengths simultaneously), the fact that the communication using the bypass channel from the transmitting end to this interface board/card is available is confirmed at this point. In order to notify this fact to the transmitting end, the wavelength that can be received by this interface board/card is written into the candidate wavelength field while the reservation status is rewritten as available, and this message is transmitted to the default channel of the same ring from which this message is received. At this point, the allocation of the reception wavelength of this interface board/card to the transmitting end interface board/card is memorized. On the other hand, if the board/card number of the destination internal label and the own board/card number do not coincide, it implies that this message has not reached the receiving end interface board/card yet. In this case, this message is transmitted to the default channel of the same ring from which this message is received, without carrying out any rewriting of this message.

By carrying out the above operation at each interface board/card 2801-i, the bypass channel set up on the ring is carried out. In the example shown in FIG. 50, the bypass channel set up message transmitted by the interface board/card 2801-1 (7701) is transferred to the interface board/card 2801-5 without receiving any processing (7702, 7703, 7704). When this message is received by the interface board/card 2801-5, this interface board/card 2801-5 itself is currently not carrying out the message reception using the bypass channel, so that the wavelength $\lambda 5$ that can be received as the bypass channel by this interface board/card 2801-5 is written into the candidate wavelength field of this message, the reservation status field is rewritten as "available", and this bypass channel set up message is transmitted (7705). This message is transferred to the interface board/card 2801-1 through the interface board/card 2801-6 (7706). This notifies to the interface board/card 2801-1 that the bypass channel toward the interface board/card 2801-5 is available. Thereafter, the interface board/card 2801-1 tunes the transmission wavelength for the bypass channel to the wavelength $\lambda 5$, and starts the communication using the bypass channel (7707).

Figure 51:
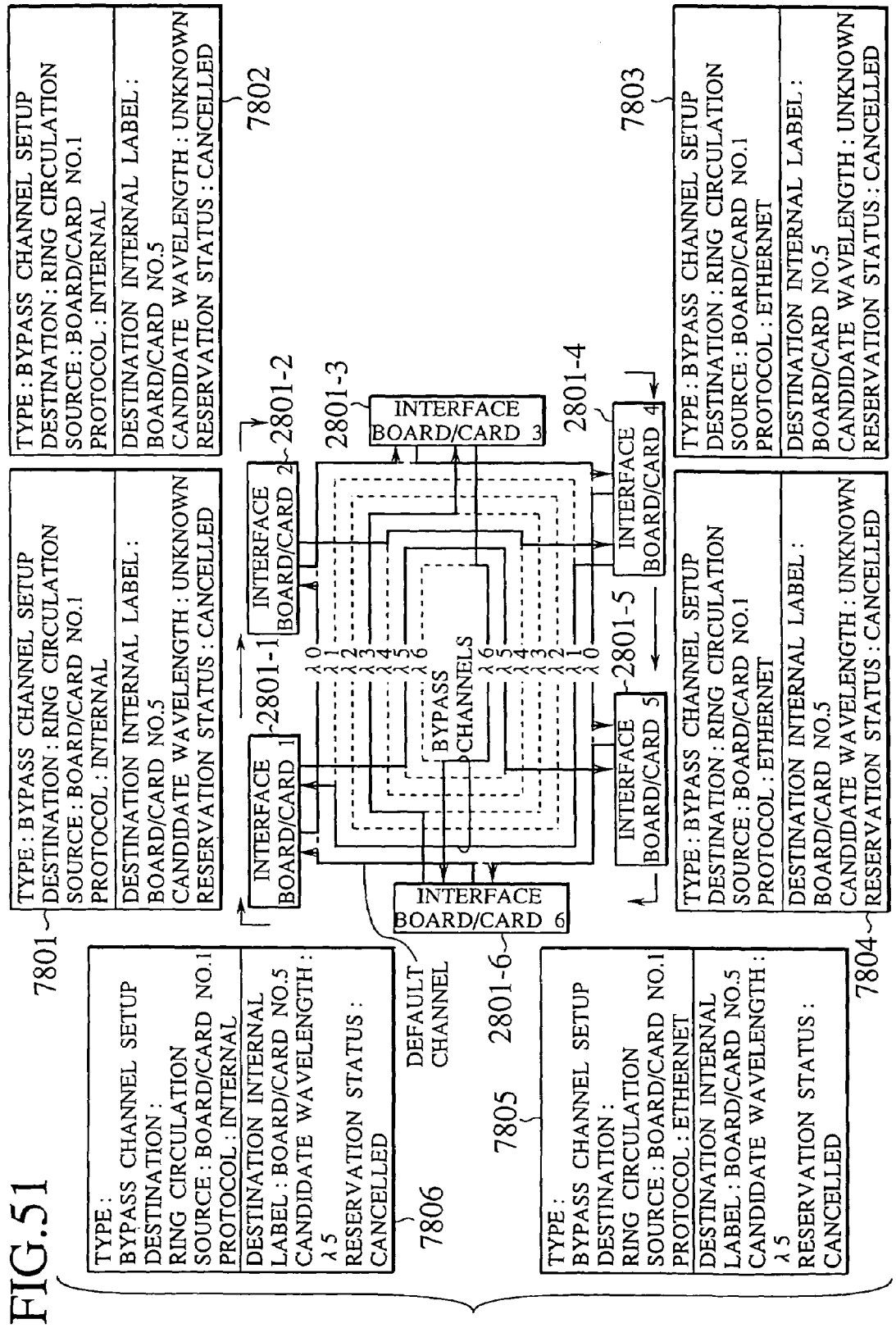
FIG. 51 is a schematic diagram for explaining a bypass channel release procedure in the case of reception wavelength fixed scheme in the message relay device of FIG. 27.

When the bypass channel release condition is satisfied (step 3713 of FIG. 35), there is a need for the interface board/card 2801-1 at the start point of the flow to carry out the bypass channel releasing (step 3714 of FIG. 35). In the case of this exemplary configuration using the reception wavelength fixed scheme described here, this operation corresponds to the cancellation of the allocation of the reception wavelength of the end point with respect to the interface board/card at the start point that is carried out at the interface board/card 2801-5 at the end point of the flow in order to use the bypass channel. FIG. 51 shows the detailed procedure for carrying out this operation.

In order to carry out this operation, the interface board/card 2801-1 at the start point of the flow transmits the bypass channel set up message with the reservation status set as "cancelled" to the default channel of the same ring (7801). A difference between the information fields of this bypass channel set up message and the information fields of the bypass channel set up message shown in 7701 of FIG. 50 for notifying the start of the bypass channel use from the start point of the flow to the end point is the value of the reservation status and the value of the candidate wavelength field. The wavelength $\lambda 5$ that is currently used for the bypass channel is written in the candidate wavelength field. The values of the other fields are the same. The interface board/card 2801-x that received this bypass channel set up message with the reservation status indicating "cancelled" carries out the following operation. The board/card number of the destination internal label written in the information section is compared with the own board/card number. When they coincide, it implies that this interface board/card maintains the correspondence between the wavelength to be cancelled by this message and the start point of the flow, so that the correspondence is cleared and this wavelength is made available to the subsequent communication using the bypass channel. Then, this message is transmitted to the default channel of the same ring from which this message is received.

As a result of carrying out the above operation at each interface board/card 2801-x, the bypass channel set up message with the reservation status indicating "cancelled" is transferred toward the interface board/card 2801-5 on the ring (7802, 7803, 7804), the correspondence is cleared at the interface board/card 7805, and this message is transmitted toward the interface board/card 2801-1 again (7805, 7806). The bypass channel releasing operation is completed at a point where this message is returned to the interface board/card 2801-1.

This completes the detailed description of the bypass channel set up procedure in the case of the reception wavelength fixed scheme.

Next, with reference to FIG. 44, the configuration of the optical ring access unit 2803-x will be described in detail.

Figure 44:
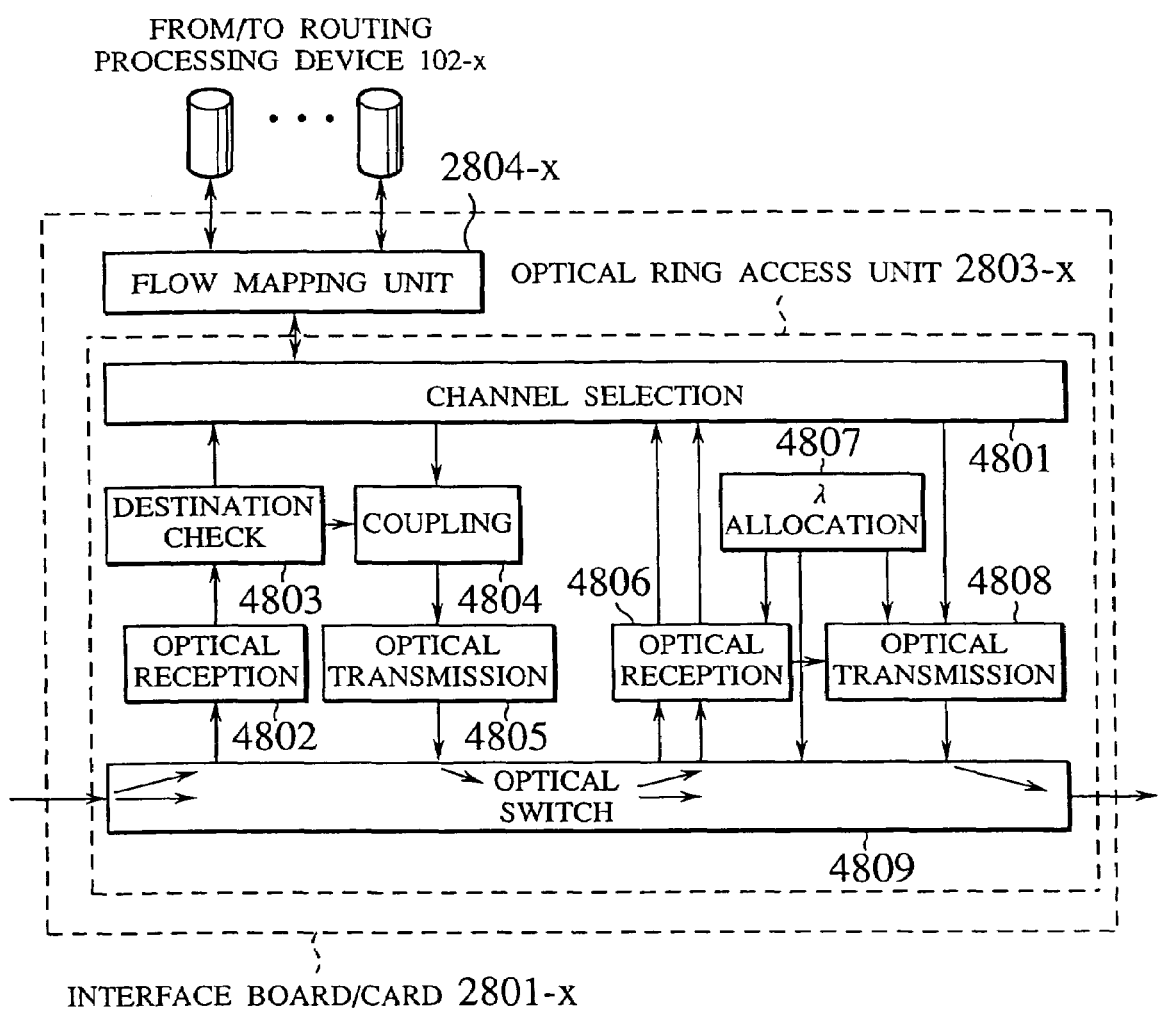
FIG. 44 is a block diagram showing a configuration of an optical ring access unit in the message relay device of FIG. 27.

As shown in FIG. 44, the optical ring access unit 2803-x comprises a channel selection function 4801, a first optical reception function 4802, a destination check function 4803, a coupling function 4804, a first optical transmission function 4805, a second optical reception function 4806, a $\lambda$ allocation function 4807, a second optical transmission function 4808, and an optical switch 4809. The first optical reception function 4802 carries out the optical signal reception in the default channel, the first optical transmission function 4805 carries out the optical signal transmission in the default channel, the second optical reception function 4806 carries out the optical signal reception in the bypass channel, and the second optical transmission function 4808 carries out the optical signal transmission in the bypass channel. The wavelength of the optical signal lead by the optical switch 4809 to the second optical reception function 4806, the wavelength of the optical signal received by the second optical reception function 4806, and the wavelength of the optical signal transmitted by the second optical transmission function 4808 can be changed under the control from the $\lambda$ allocation function 4807. FIG. 44 shows the case of the reception wavelength variable scheme, but the configuration of the optical ring access unit 2803-x in the case of the reception wavelength fixed scheme can be a modification of this configuration of FIG. 44 such that only the transmission wavelength of the second optical transmission function 4808 can be changed under the control from the $\lambda$ allocation function 4807 and the wavelength of the optical signal lead by the optical switch 4809 to the second optical reception function 4806 and the reception wavelength of the second optical reception function 4806 cannot be changed.

The channel selection function 4801 has a function for transferring each message received from the flow mapping unit 2804-x by selecting one of a plurality of channels, that is the default channel and the bypass channel, for which the optical ring access unit 2803-x is the start point, while also transferring messages received from these channels to the flow mapping unit 2804-x. Also, the optical switch 4809 has a function for leading a plurality of optical signals entered from the optical fiber to the first optical reception function 4802 and the second optical reception function 4806 selectively according to their wavelengths, while also coupling and transmitting the optical signals transmitted from the first optical transmission function 4805 and the second optical transmission function 4808 and the input optical signals that are not lead to the first optical reception function 4802 and the second optical reception function 4806.

In this exemplary configuration, the information transmission path of the default channel is formed as follows. The optical switch 4809 leads the optical signal of the wavelength allocated to the default channel among the optical signals entered from the external, to the first optical reception function 4802. The first optical reception function 4802 converts this optical signal into the internal message flow that flows on the default channel, and gives it to the destination check function 4803. The destination check function 4803 refers to each internal message given from the first optical reception function 4802, and determines whether this message should be branched, passed, or branched and passed at the same time by making copies, according to the method described above. Then, the message to be branched or its copy is given to the channel selection function 4801, while the message to be passed is given to the coupling function 4804. The coupling function 4804 couples the message flow given from the channel selection function 4801 and the message flow given from the destination check function 4803 and gives them to the first optical transmission function 4805. The first optical transmission function 4805 converts the message flow given from the coupling function 4804 into the optical signal of a prescribed wavelength and gives it to the optical switch 4809. The optical switch 4809 transmits the optical signal given from the first optical transmission function 4805 to the external.

On the other hand, the information transmission path of the bypass channel is formed as follows. The optical switch 4809 leads the optical signal of a wavelength specified by the λ allocation function 4807 (in the case of the reception wavelength variable scheme) or of a prescribed wavelength (in the case of the reception wavelength fixed scheme) among the optical signals entered from the external, to the second optical reception function 4806. In the case where a plurality of bypass channels can be received simultaneously, the optical signals of the wavelengths corresponding to these plurality of bypass channels are lead to the second optical reception function 4806 simultaneously. The second optical reception function 4806 converts the optical signal into the internal message flow that flows on the bypass channel, and gives it to the channel selection function 4801. The channel selection function 4801 leads the message flow given from the second optical reception function 4806 to the flow mapping unit 2804-x. On the other hand, the message flow given from the flow mapping unit 2804-x is given to the second optical transmission function 4808. The second optical transmission function 4808 converts the message flow given from the flow mapping unit 2804-x into the optical signal of a wavelength specified from the λ allocation function 4807, and gives it to the optical switch 4809. The optical switch 4809 transmits the optical signal given from the second optical transmission function 4808 to the external. Note that the multicast on the bypass channel can be realized by directly giving the internal message flow received by the second optical reception function 4806 to the second optical transmission function 4808 instead of the internal message flow from the channel selection function 4801.

In the message relay device 101 of this embodiment which is formed by the interface boards/cards 2801-x with the optical ring access units 280-3 in the above configuration, a broadcast connection, a multicast connection, and a point-to-point connection in the default channel, and a multicast connection and a point-to-point connection in the bypass channel can be realized as follows.

Figure 45:
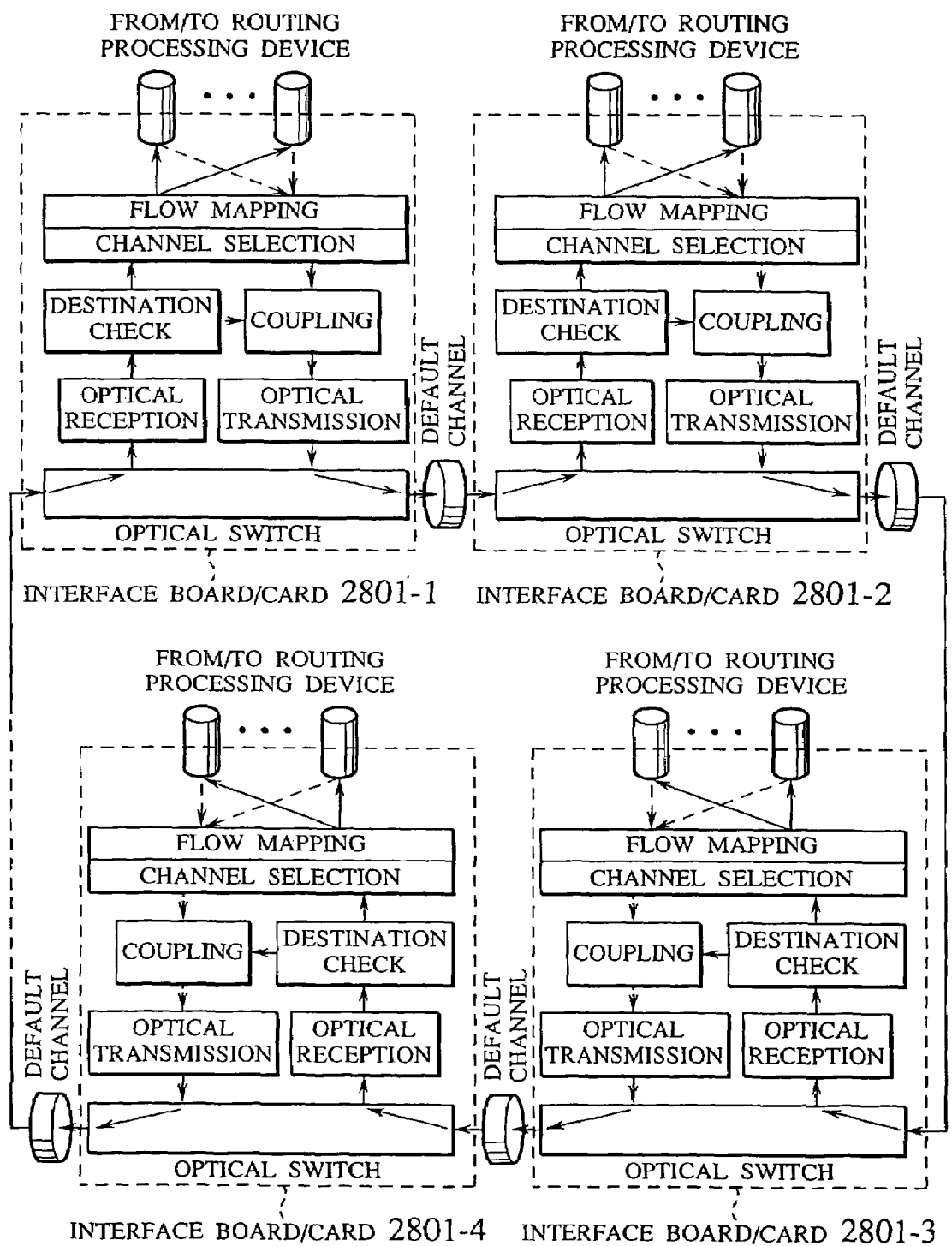
FIG. 45 is a schematic diagram for explaining an operation of broadcast connection through a default channel in the message relay device of FIG. 27.
Figure 46:
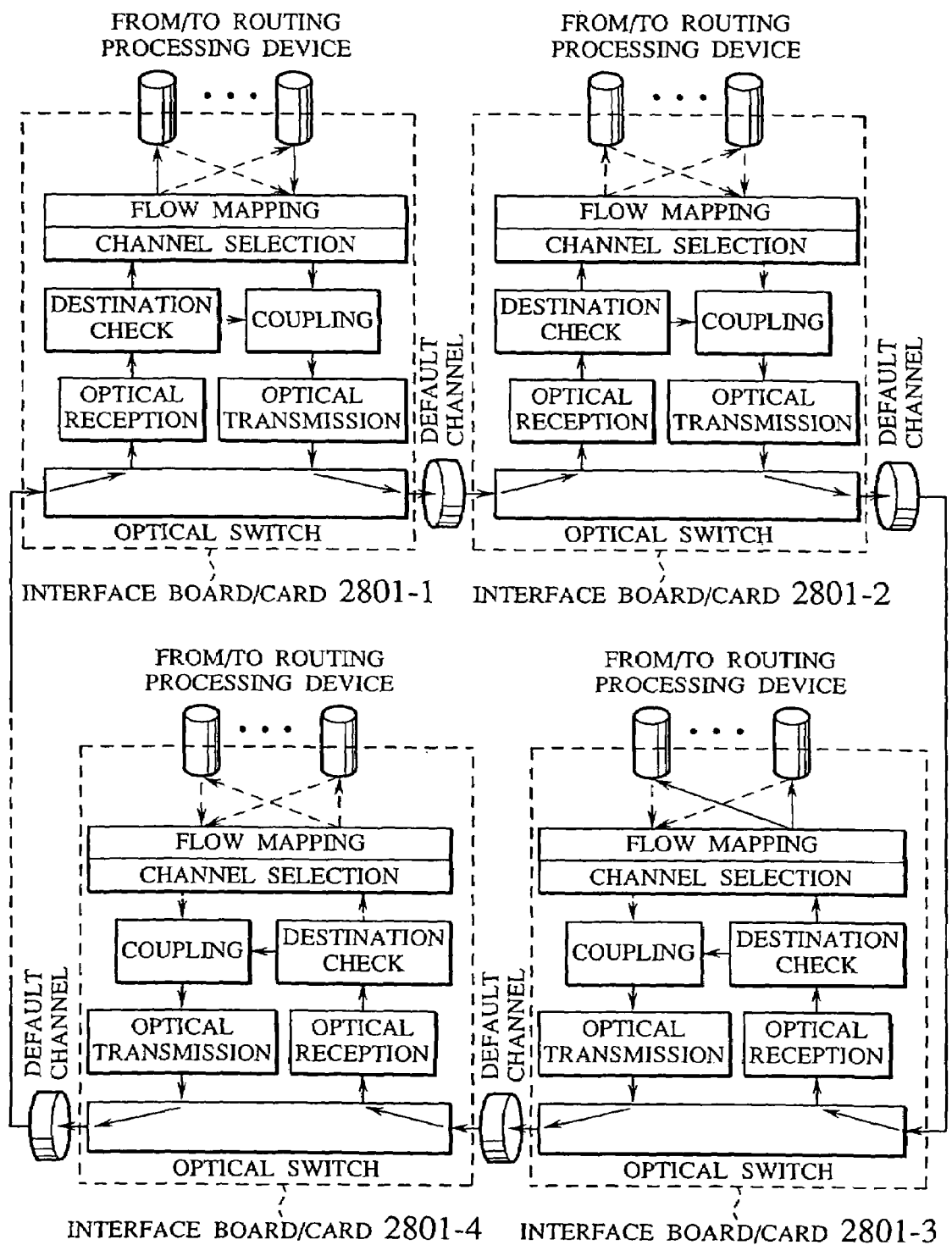
FIG. 46 is a schematic diagram for explaining an operation of multicast connection through a default channel in the message relay device of FIG. 27.
Figure 47:
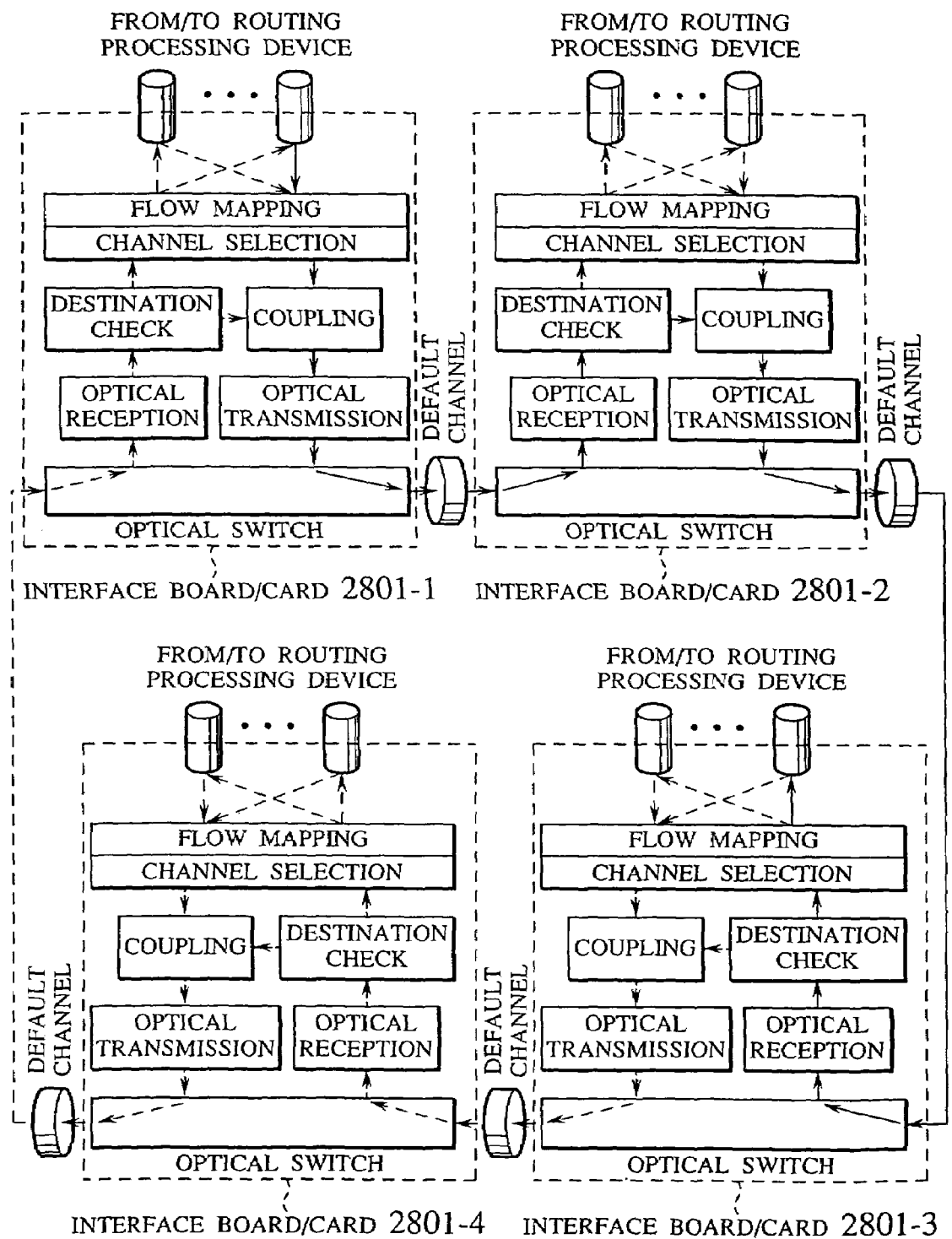
FIG. 47 is a schematic diagram for explaining an operation of point-to-point connection through a default channel in the message relay device of FIG. 27.

FIG. 45 shows the operation of the broadcast connection in the default channel, FIG. 46 shows the operation of the multicast connection in the default channel, and FIG. 47 shows the operation of the point-to-point connection in the default channel. In these figures, only the function for realizing the information transmission through the default channel is shown.

Figure 48:
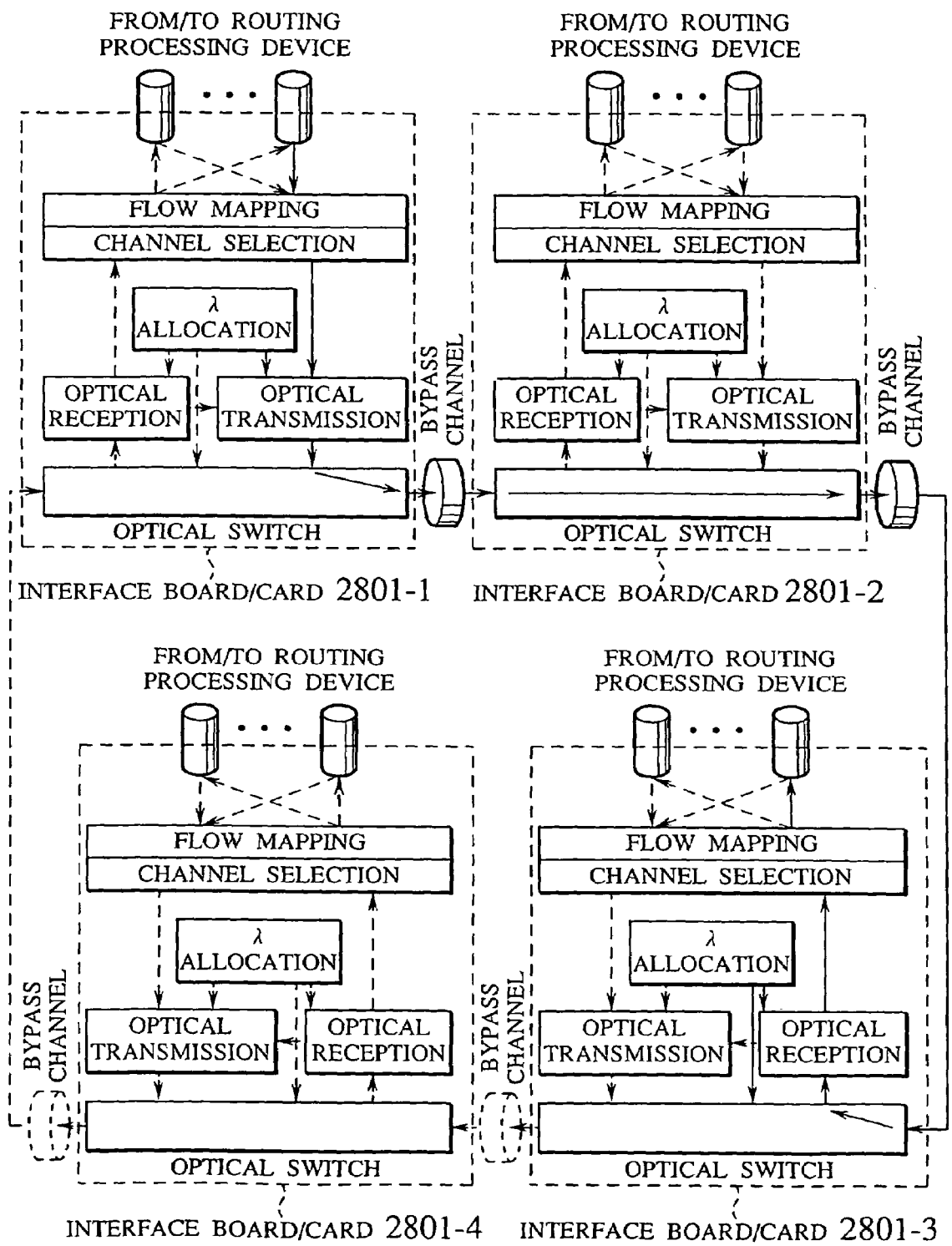
FIG. 48 is a schematic diagram for explaining an operation of point-to-point connection through a bypass channel in the message relay device of FIG. 27.
Figure 49:
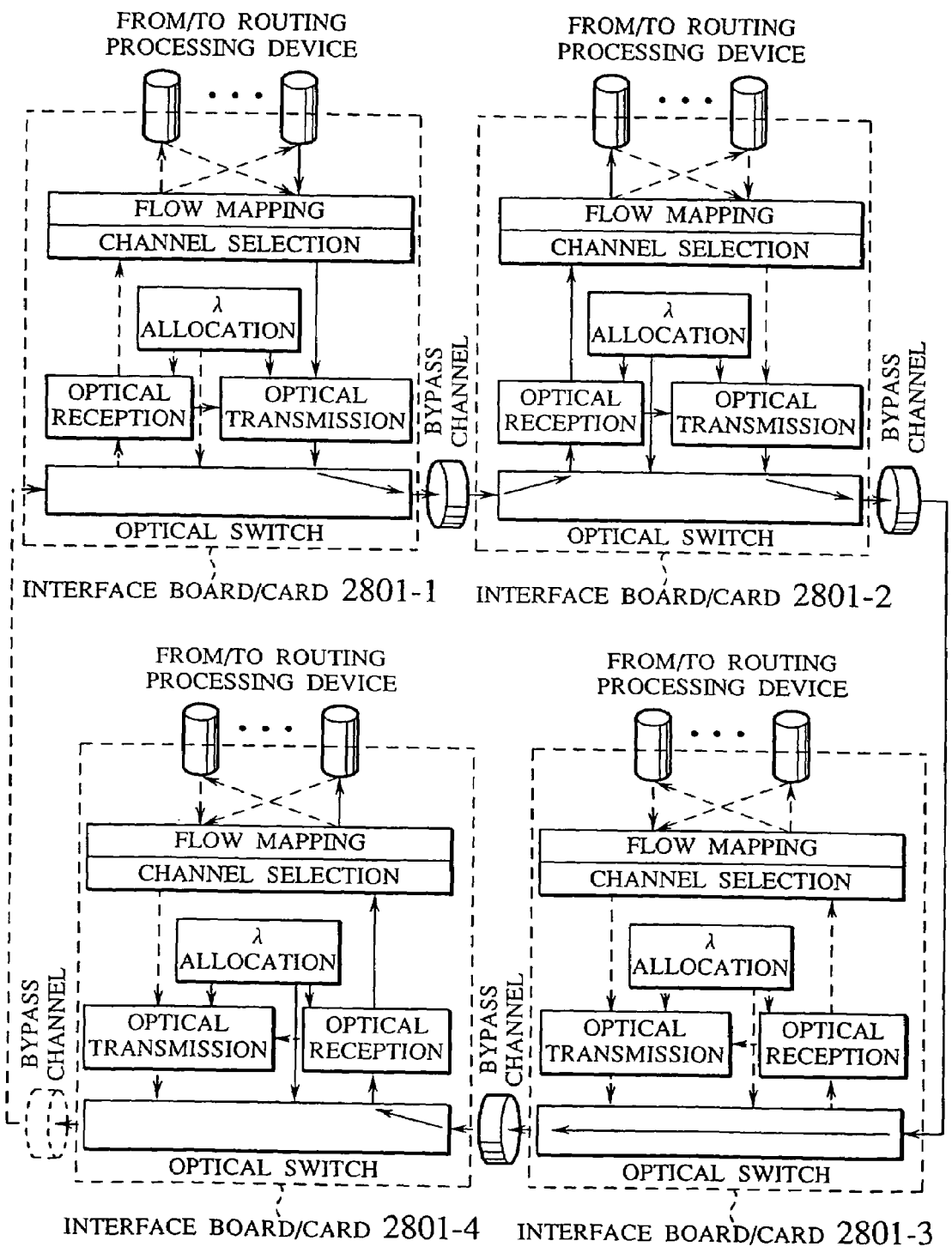
FIG. 49 is a schematic diagram for explaining an operation of multicast connection through a bypass channel in the message relay device of FIG. 27.

On the other hand, FIG. 48 shows the operation of the point-to-point connection in the bypass channel, and FIG. 49 shows the operation of the multicast connection in the bypass channel. In these figures, only the function for realizing the information transmission through the bypass channel is shown.

First, the broadcast connection in the default channel shown in FIG. 45 will be described. In the broadcast connection in the default channel shown in FIG. 45, the start point of the broadcast connection is set to be the interface board/card 2801-1.

A message to be broadcasted that is entered from one of the physical links or one of the logical path in the physical link accommodated at the interface board/card 2801-1 (such as a message related to the address resolution in the case of carrying out IP communications on Ethernet protocol, for example) is transmitted to the optical fiber provided between the interface boards/cards through the flow mapping unit, the channel selection function, the coupling function, the first optical transmission function and the optical switch of this interface board/card. The internal header is attached to this message at the flow mapping unit, and the broadcast address is written in the destination field of the internal header to be attached. Thereafter, this message is given to the destination check function via the optical switch and the first optical reception function at each of the interface boards/cards 2801-2, 2801-3, 2801-4, etc. The destination check function refers to the destination field of the internal header in this message and determines the processing method of this message. In this case, the broadcast address is written in the destination field of the internal header, so that this message is copied and the copy is transmitted to the channel selection function while the entered message is given to the coupling function, according to the above described scheme. By carrying out this operation at each interface board/card 2801-x on the optical ring, the channel selection function of each interface board/card 2801-x will receive the message to be broadcasted.

In the case of this exemplary configuration, each interface board/card 2801-x can accommodate a plurality of physical links or logical paths on the physical link. The message to be broadcasted is transmitted toward these plurality of physical links or logical paths. For this reason, in this exemplary configuration, when the message to be broadcasted arrives from the destination check function, as many copies as necessary may be made at the channel selection function and transferred to all the physical links or logical paths via the flow mapping unit. In this case, when the message is received from some physical link or logical path via the flow mapping unit, if this message is to be broadcasted is recognized at the flow mapping unit, as many copies as necessary may be made at the channel selection function such that the original message is transferred to the coupling function but the copies are returned to the flow mapping unit and transferred to all the physical links or logical paths except for the physical link or logical path from which this message is entered.

When each interface boards/cards operates as described above, while the message to be broadcasted that is inserted into the default channel from the interface board/card 2801-1 sequentially circulates through the interface boards/cards 2801-x and comes back to the interface board/card 2801-1, the copies of this message are transmitted toward all the physical links or logical paths accommodated by the message relay device 101 of this embodiment. When this message eventually comes back to the interface board/card 2801-1, this message is given to the destination check function via the optical switch and the first optical reception function. The destination check function refers to the source field of the internal header in this message according to the method described above. The source field indicates that it is transmitted by this interface board/card, so that the destination check function discards this message. This completes a series of operations that take place when a message to be broadcasted is inserted into the default channel.

Next, the multicast connection in the default channel shown in FIG. 46 will be described. Before describing the processing procedure on the communication path, the multicast connection set up method in the message relay device 101 of this embodiment will be described.

Figure 52:
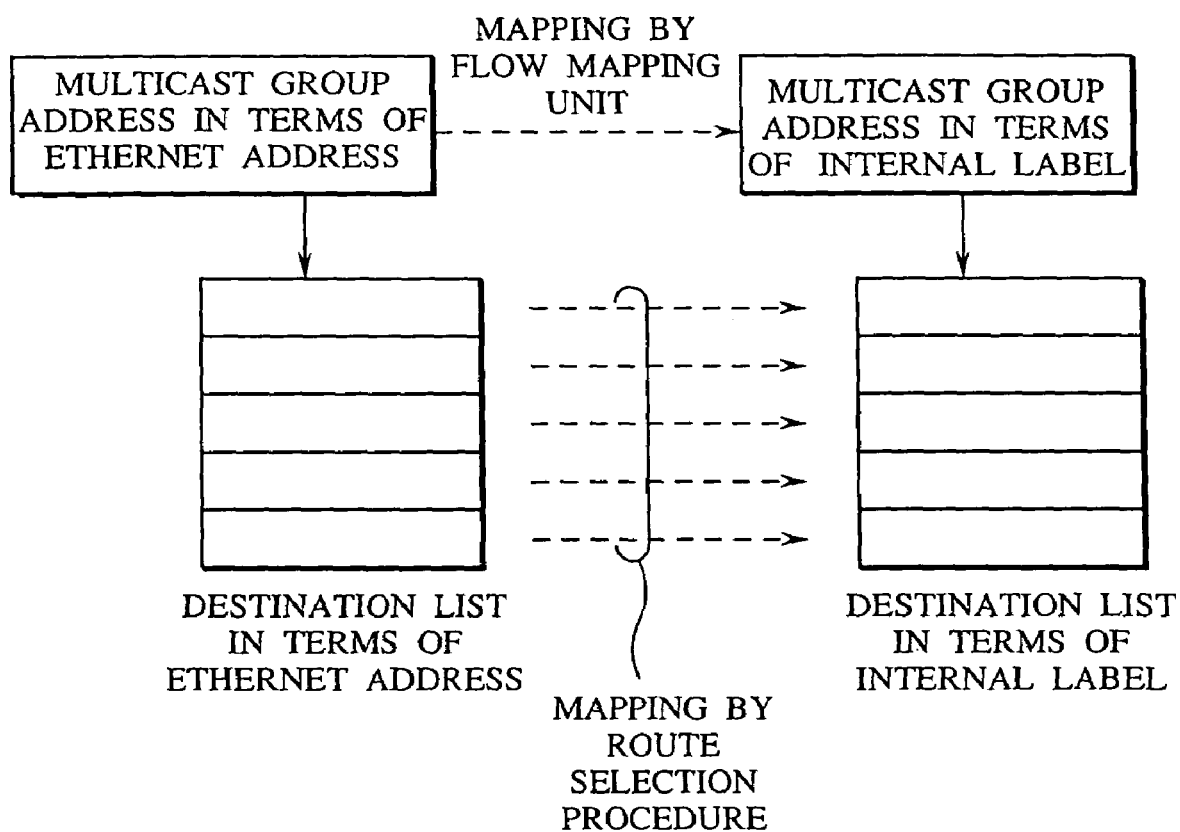
FIG. 52 is a diagram showing a relationship between a multicast group in terms of Ethernet address and a multicast group address in terms of internal label in the message relay device of FIG. 27.

In the case of Ethernet, the multicast connection is realized as follows. When the upper level protocol requests the realization of the multicast connection to Ethernet, this upper level protocol selects one address from the multicast group address space in Ethernet, and devices that should actually receive the message having this multicast group address are specified in a form of a destination list in terms of Ethernet addresses. When such an information is given, the Ethernet protocol side notifies this multicast group address to the devices contained in the destination list, and each device is set to receive an Ethernet message having this multicast group address as the destination address. In other words, as shown in FIG. 52, the multicast group address and a list of destinations that should receive the message having this multicast group address as the destination address are given from the upper level protocol. At the message relay device 101 of this embodiment, this information is received by the flow mapping unit 2804-x of the interface board/card 2801-x that accommodates Ethernet, and the message relay device 101 is internally controlled as follows.

First, as shown in FIG. 52, one of the multicast group addresses defined in the internal label space used inside the message relay device 101 of this embodiment is allocated to the multicast group address in terms of Ethernet address, at the flow mapping unit 2804-x of the interface board/card 2801-x at the start point of the multicast connection. Then, this internal board/card is set such that the destination field of the internal header to be attached to the entered message having this multicast group address is set to be the allocated multicast group address of the internal label, while an Ethernet addresses contained in the destination list in terms of Ethernet addresses are sequentially taken out, the internal label corresponding to each Ethernet address is obtained by the route selection procedure described above, and the destination list in terms of the internal labels is produced.

Figure 53:
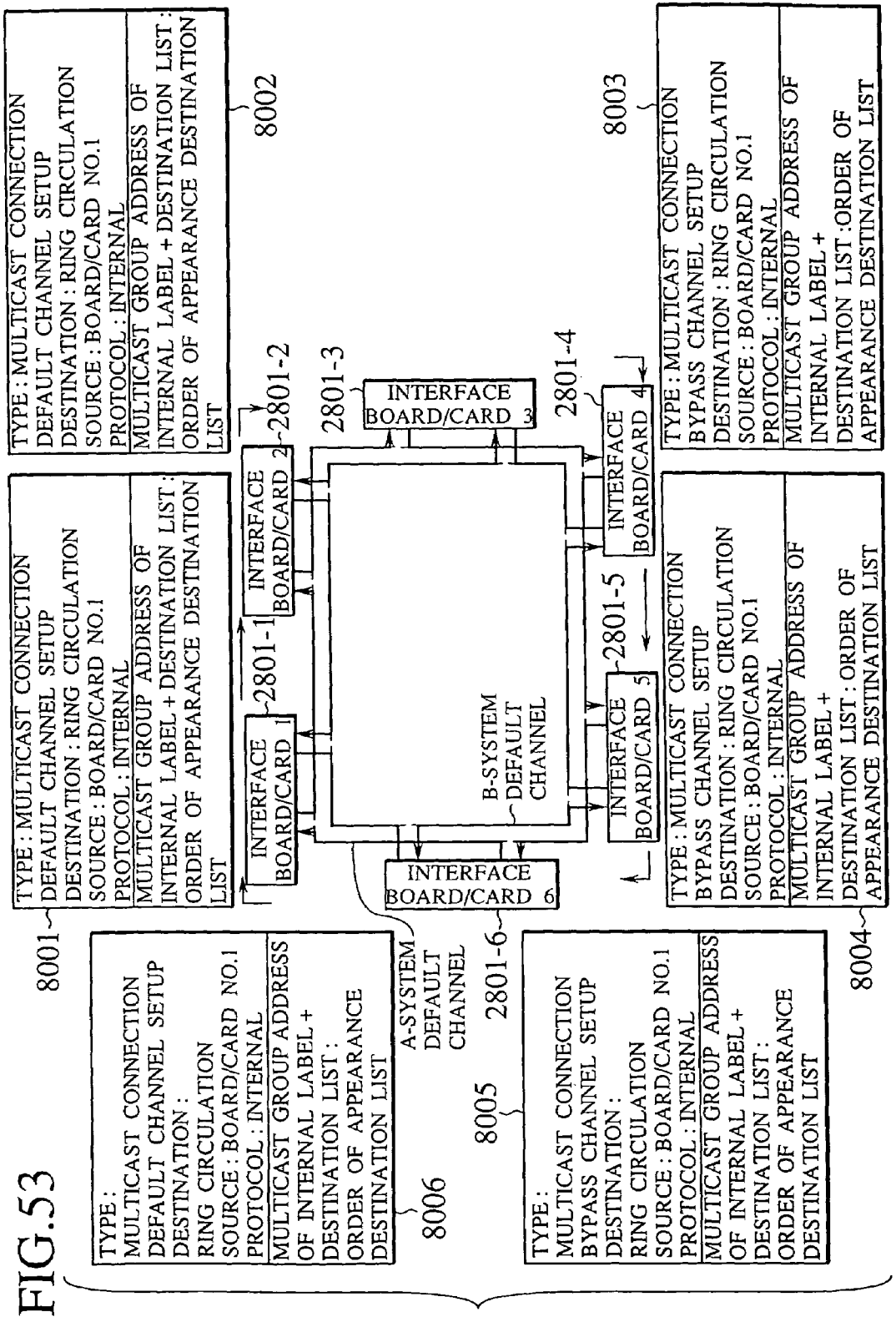
FIG. 53 is a schematic diagram for explaining a multicast connection default channel set up procedure in the message relay device of FIG. 27.

Next, the interface board/card 2801-x at the start point of the multicast connection produces the multicast connection default channel set up message, and transmits this message to the default channel. The destination address in the internal header of this message is the ring circulation address so that this message will be sequentially circulated through the interface boards/cards 2801-y, 2801-z, etc. In this way, the set up of the multicast connection on the default channel that is necessary inside the message relay device 101 of this embodiment is carried out. FIG. 53 shows the detailed processing procedure using the multicast connection default channel set up message. The multicast connection default channel set up message contains the multicast group address and the destination list in terms of the internal labels in its information section. In addition, this message also contains an order of appearance destination list in its information section. This order of appearance destination list is a list of destinations in terms of the internal labels that specify the destination interface boards/cards 2801-a, 2801-b, etc., which are arranged in an order according to their order on the ring. This order of appearance destination list is sequentially built up while the multicast connection default channel set up message is circulated through the interface boards/cards 2801-y, 2801-z, etc. This order of appearance destination list is used in setting up the multicast connection on the bypass channel as will be described below.

The interface board/card 2801-y that received the multicast connection default channel set up message carries out the following processing. First, the source address in the internal header of this message is referred, and whether it is a message transmitted by this interface board/card or not is checked. If it is a message transmitted by this interface board/card, the multicast connection set up on the default channel has been completed. Otherwise, the destination list in terms of the internal labels that is contained in the information section of this message is referred next. When this interface board/card is not contained in the destination list, this message is transmitted to the default channel of the same optical ring from which this message is received. If this interface board/card is contained in the destination list, the multicast group address in terms of the internal label is registered into the destination check function 4803 in the optical ring access unit 2803-y of this interface board/card. At the same time, the internal label of this interface board/card is added at the end of this message, so as to construct the order of appearance destination list.

Assuming now that the multicast connection is set up as the multicast group address to be copied at each interface board/card 2801-x is registered into the destination check function 4803 of each optical ring access unit 2803-x by the above described procedure, and referring now to FIG. 46, the description of the multicast connection in the default channel is resumed. In the multicast connection in the default channel shown in FIG. 46, the start point of the multicast connection is set to be the interface board/card 2801-1.

A message to be multicasted that is entered from one of the physical links or one of the logical path in the physical link accommodated at the interface board/card 2801-1 is transmitted to the optical fiber provided between the interface boards/cards through the flow mapping unit, the channel selection function, the coupling function, the first optical transmission function and the optical switch of this interface board/card 2801-1. At this point, the internal header is attached to this message at the flow mapping unit, and the above described multicast group address in terms of the internal label that is selected in correspondence to the multicast group address in terms of Ethernet address is written in the destination field of the internal header to be attached. Thereafter, this message is given to the destination check function via the optical switch and the first optical reception function at each of the interface boards/cards 2801-2, 2801-3, 2801-4, etc. The destination check function refers to the destination field of the internal header in this message and determines the processing method of this message. In this case, the multicast group address is written in the destination field of the internal header, so that this message is copied and the copy is transmitted to the channel selection function while the entered message is given to the coupling function if this multicast group address is registered, or this message is simply given to the coupling function if this multicast group address is not registered, according to the above described scheme. By carrying out this operation at each interface board/card 2801-x on the optical ring, the channel selection function of each interface board/card 2801-x at which this multicast group address is registered will receive the message to be multicasted.

In the case of this exemplary configuration, each interface board/card 2801-x can accommodate a plurality of physical links or logical paths on the physical link. There is a possibility for one interface board/card to have a plurality of physical links or logical paths to which the message to be multicasted should be actually transmitted. For this reason, in this exemplary configuration, when the message to be multicasted arrives from the destination check function, as many copies as necessary may be made at the channel selection function and selectively transferred to prescribed physical links or logical paths by the flow mapping unit. In this case, when the message is received from some physical link or logical path via the flow mapping unit, if this message is to be multicasted is recognized at the flow mapping unit, as many copies as necessary may be made at the channel selection function such that the original message is transferred to the coupling function but the copies are returned to the flow mapping unit and transferred to prescribed physical links or logical paths by the flow mapping unit.

When each interface boards/cards operates as described above, while the message to be multicasted that is inserted into the default channel from the interface board/card 2801-1 sequentially circulates through the interface boards/cards 2801-x and comes back to the interface board/card 2801-1, the copies of this message are transmitted toward prescribed ones of the physical links or logical paths accommodated by the message relay device 101 of this embodiment. When this message eventually comes back to the interface board/card 2801-1, this message is given to the destination check function via the optical switch and the first optical reception function. The destination check function refers to the source field of the internal header in this message according to the method described above. The source field indicates that it is transmitted by this interface board/card, so that the destination check function discards this message. This completes a series of operations that take place when a message to be multicasted is inserted into the default channel.

Next, the point-to-point connection in the default channel shown in FIG. 47 will be described. In the point-to-point connection in the default channel shown in FIG. 47, the start point of the point-to-point connection is set to be the interface board/card 2801-1.

A message for point-to-point connection that is entered from one of the physical links or one of the logical path in the physical link accommodated at the interface board/card 2801-1 is transmitted to the optical fiber provided between the interface boards/cards through the flow mapping unit, the channel selection function, the coupling function, the first optical transmission function and the optical switch of this interface board/card. The internal header is attached to this message at the flow mapping unit, and the internal label indicating the destination of this message is written in the destination field of the internal header to be attached. Here, it is assumed that this message is to be transmitted to some physical link in the interface board/card 2801-3. The board/card number of the physical link number for specifying that physical link are written in the destination field of the internal header. Thereafter, this message is given to the destination check function via the optical switch and the first optical reception function at each of the interface boards/cards 2801-2, 2801-3, 2801-4, etc. The destination check function refers to the destination field of the internal header in this message and determines the processing method of this message. In this case, the information indicating the specified physical in the interface board/card 2801-3 is written in the destination field of the internal header, so that this message is transmitted to the channel selection function if the board/card number in the destination field coincides with the own board/card number, or this message is transmitted to the coupling function if the board/card number in the destination field does not coincide with the own board/card number, according to the above described scheme. By carrying out this operation at each interface board/card 2801-x on the optical ring, the channel selection function of the interface board/card 2801-3 specified by the destination field will receive this message. This message is transferred from the channel selection function to the flow mapping unit. The flow mapping unit refers to the physical link number in the internal label of the destination field in the internal header, and transfers this message to the physical link corresponding to that information. By this, this message is transferred to the desired physical link, so that this completes a series of operations that take place when a message for point-to-point connection arrives at the physical link.

Next, the point-to-point connection in the bypass channel shown in FIG. 48 will be described. In the point-to-point connection in the bypass channel shown in FIG. 48, the start point of the point-to-point connection is set to be the interface board/card 2801-1, and the end point of the point-to-point connection is set to be the interface board/card 2801-3.

Before the communication using the bypass channel, the bypass channel set up is carried out according to the method described above, and the transmission wavelength of the second optical transmission function is controlled by the λ allocation function of the interface board/card 2801-1 at the start point of the flow while the reception wavelength of the second optical reception function and the wavelength of the optical signal to be lead by the optical switch to the second optical reception function are controlled by the λ allocation function of the interface board/card 2801-3 at the end point of the flow, as described above. A message for point-to-point connection that is entered from one of the physical links or one of the logical path in the physical link accommodated at the interface board/card 2801-1 is given to the second optical transmission function through the flow mapping unit and the channel selection function of this interface board/card. The second optical transmission function converts this message into the optical signal of the prescribed wavelength, and transmits this message to the optical switch. The optical switch transmits this optical signal to the optical fiber provided between the interface boards/cards. The internal header is attached to this message at the flow mapping unit, and the internal label indicating the destination of this message is written in the destination field of the internal header to be attached. Also, the channel selection function transfers this message to the bypass channel instead of the default channel. This is done by accessing the internal route information holding table 4101 by using the destination field of the attached internal header as a key and referring to the selected channel field of the entry corresponding to that destination field.

At each interface board/card through which this message passes before reaching to the end point of the flow, which includes the interface board/card 2801-2 in the example shown in FIG. 48, the λ allocation function is not issuing a command to lead the optical signal of the flow to the second optical reception function. For this reason, the optical signal passes through such an interface board/card while remaining in the form of the optical signal, and eventually reaches to the interface board/card at the end point of the flow, which is the interface board/card 2801-3 in the example described here. As the optical signal passes through such an interface board/card while remaining in the form of the optical signal, the message relay device 101 of this embodiment can provide the high throughput message switching.

At the interface board/card 2801-3 at the end point of the flow, the optical signal is lead to the second optical reception function by the optical switch. The second optical reception function converts the received optical signal into the message flow and gives it to the flow mapping unit via the channel selection function. The flow mapping unit deletes the internal header of this message, while also refers to the physical link number contained in the internal label of the destination field in the internal header and leads this message to the prescribed physical link. By this, this message is transferred to the desired physical link via the bypass channel, so that this completes a series of operations that take place when a message for point-to-point connection arrives at the physical link.

Lastly, the multicast connection using the bypass channel will be described.

Figure 54:
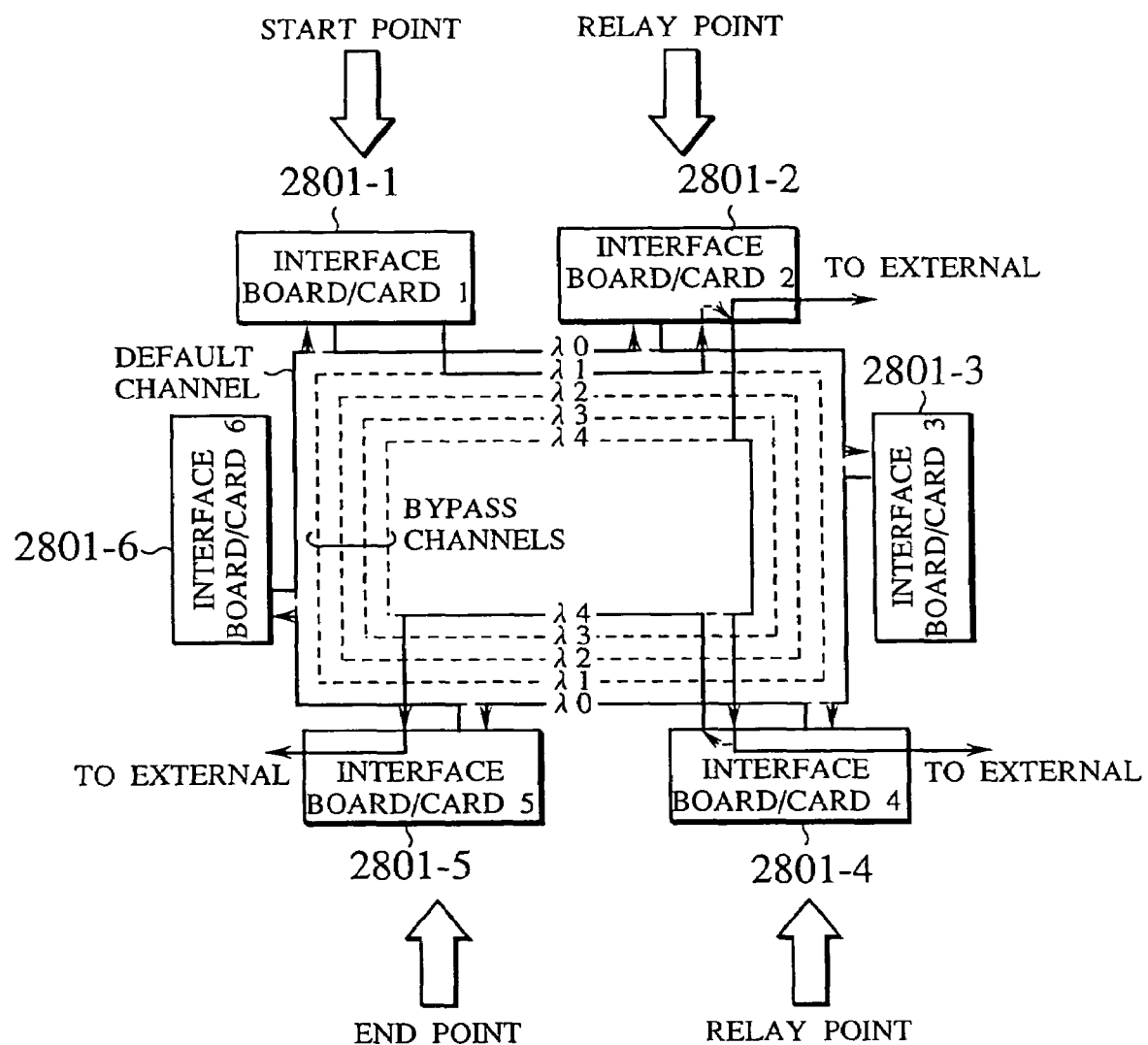
FIG. 54 is a schematic diagram for explaining an operation in the case of a multicast connection on a bypass channel in the message relay device of FIG. 27.

The multicast connection using the bypass channel is formed in this exemplary configuration, as shown in FIG. 54, by sequentially connecting the interface boards/cards 2801-2, 2801-4 and 2801-5 that are going to be branches of the multicast connection by the bypass channels of the point-to-point connection according to their order of appearance on the ring. Here, the interface board/card 2801-1 at which the message for the multicast connection is entered will be referred to as the start point of the multicast connection, the interface boards/cards 2801-2 and 2801-4 at which the message for the multicast connection is copied and transmitted to the external while this message is also transmitted toward the interface board/card that is a next branch appearing on the ring will be referred to as relay points of the multicast connection, and the interface board/card 2801-5 at which the message for the multicast connection is simply transmitted toward the external will be referred to as the end point of the multicast connection. Also, the bypass channels that sequentially connects a plurality of relay points from the start point up to the end point will be referred to as a chain of bypass connection.

Figure 55:
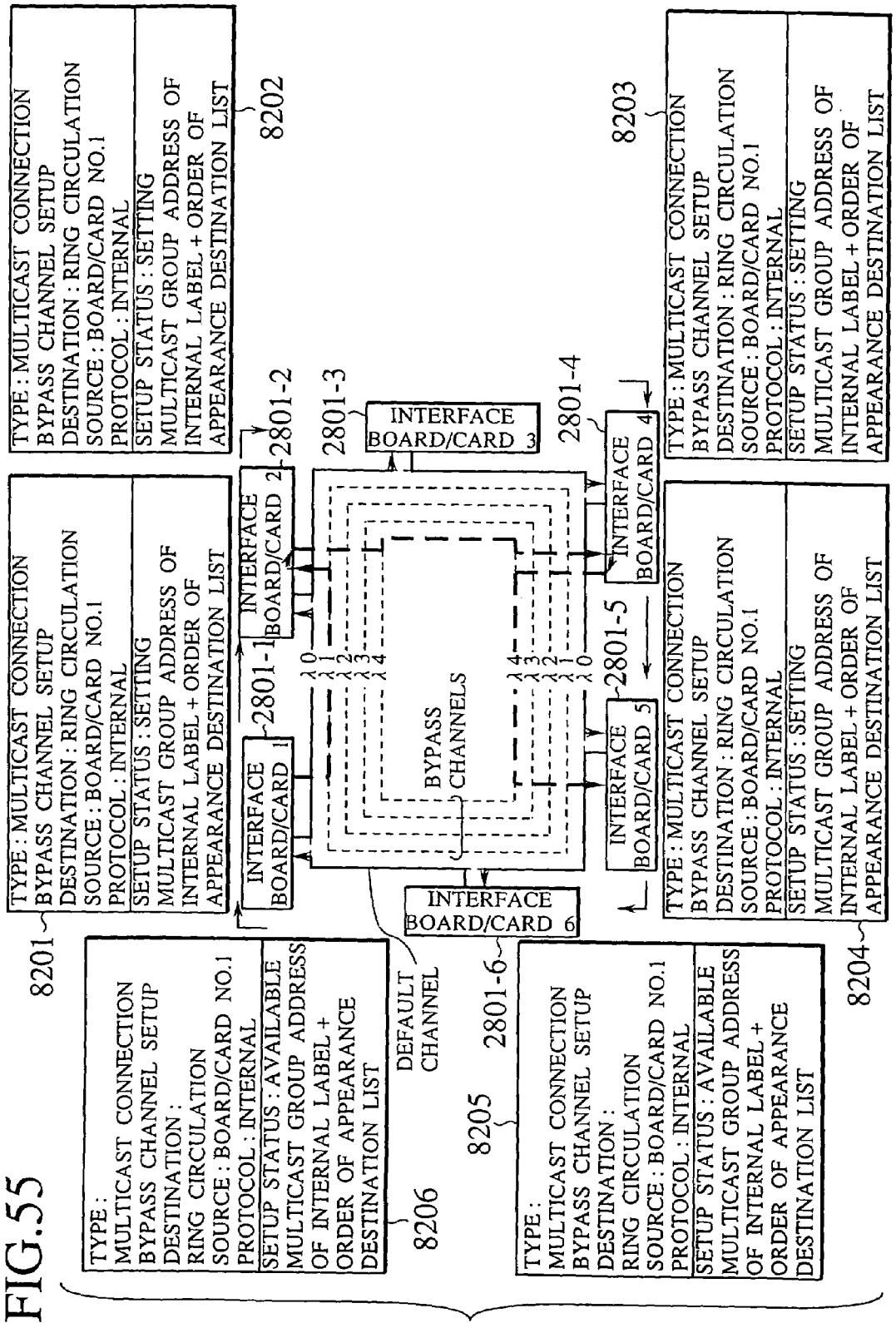
FIG. 55 is a schematic diagram for explaining a multicast connection bypass channel set up procedure in the message relay device of FIG. 27.

The multicast connection on the bypass channel is set up when the prescribed condition is satisfied, such as when the messages of the flow are held in excess of the prescribed threshold in the flow buffer 3501-x at the start point of the multicast connection as the traffic in the multicast connection set up on the default channel increases, for example. In this exemplary configuration, the multicast connection is set up, as shown in FIG. 55, by producing the multicast connection bypass channel set up message at the interface board/card 2801-1 at the start point of the multicast connection, and sequentially circulating this message through the interface boards/cards 2801-x on the ring using the default channel. The multicast connection bypass channel set up message contains the set up status, the multicast group address in terms of the internal label, and the order of appearance destination list that is associated with the multicast group address, in its information section. Each interface board/card 2801-x that received this message carries out the following processing.

First, the source field of the internal header in this message is referred. If the source field indicates that it is a message transmitted by this interface board/card itself, the set up status field of the information section is referred next. When the value of the set up status field is "available", it implies that the desired multicast connection on the bypass channel is set up normally. In this case, the interface board/card at the start point of the flow rewrites the selected channel field of the entry corresponding to the flow in the own internal route information holding table 4101 to the bypass channel, and carries out the message transfer using the multicast connection on the bypass channel as shown in FIG. 49. On the other hand, when the value of the set up status field is "unavailable", it implies that the set up of the desired multicast connection on the bypass channel has failed. In this case, the interface board/card at the start point of the flow rewrites the selected channel field of the entry corresponding to the flow in the own internal route information holding table 4101 back to the default channel, and continues the message transfer using the multicast connection on the default channel as shown in FIG. 46.

When the source field of the internal header in this message indicates that this is not a message transmitted by this interface board/card itself, the order of appearance destination list in terms of the internal labels in the information section of this message is referred. If this interface board/card is not included in the destination list, this message is inserted into the default channel of the same ring from which this message is received, without applying any processing. On the other hand, if this interface board/card is included in the order of appearance destination list, it implies that this interface board/card is one of the interface boards/cards to which the multicast message should be transmitted. In this case, if this interface board/card appears at the end of the order of appearance destination list, it implies that this interface board/card is the interface board/card at the end point of the multicast connection. If this is the case, it implies that the chain of bypass channels from the start point to the end point of the multicast connection is already completed so that the multicast connection is available. Hence this interface board/card sets the set up status field of this message as "available", and transmits this message to the default channel of the same ring from which this message is received. If the appearance position of this interface board/card is not the end of the order of appearance destination list, it implies that the chain of bypass channels for the multicast connection is in a process of setting up. In this case, this interface board/card attempts the bypass channel set up by the bypass channel set up procedure described above, with respect to the interface board/card that appears next to this interface board/card on the order of appearance destination list. If the bypass channel set up fails, the set up status of this message is set as "unavailable", and this message is inserted into the default channel of the same ring from which this message is received. On the other hand, if the bypass channel set up succeeds, a path from the second optical reception function to the second optical transmission function on this interface board/card is activated so as to concatenate the bypass channel that is set up by this interface board/card with the chain of bypass channels that has been built up so far.

Assuming now that the multicast connection is set up as the chain of bypass channels by the above described procedure, and referring now to FIG. 49, the description of the multicast connection in the bypass channel is resumed. In the multicast connection in the bypass channel shown in FIG. 49, the start point of the multicast connection is set to be the interface board/card 2801-1, the relay point of the multicast connection is set to be the interface board/card 2801-2, and the end point of the multicast connection is set to be the interface board/card 2801-4. Also, as a result of the above described set up of the multicast connection on the bypass channel, the transmission wavelength of the second optical transmission function is controlled by the λ allocation functions of the start point and the relay point of the multicast connection while the reception wavelength of the second optical reception function and the wavelength of the optical signal to be lead to the second optical reception function by the optical switch are controlled by the λ allocation functions at the relay point and the end point of the multicast connection, as described above.

When the multicast connection on the bypass channel is set up, a message held in the corresponding flow buffer 3501-x is read out from the flow buffer 3501-x, and transmitted at the prescribed wavelength to the optical fiber provided between the interface boards/cards via the channel selection function, the coupling function, the second optical transmission function and the optical switch. At this point, the judgement to transfer this message to the bypass channel rather than the default channel is made at the channel selection function, and this is done by referring to the selected channel field of the entry in the internal route information holding table 4101 corresponding to the flow to which this message belongs.

Similarly as in the case of the point-to-point connection on the bypass channel shown in FIG. 48, the optical signal transmitted from the interface board/card is lead to the prescribed interface board/card by the optical switch, and at this interface board/card, the optical signal is lead to the second optical reception function by the optical switch. The second optical reception function converts the received optical signal into the message flow and gives it to the flow mapping unit via the channel selection function. At the interface board/card that is the relay point of the multicast connection, the message flow reproduced by the second optical reception function is also directly given to the second optical transmission function at the same time.

The flow mapping unit deletes the internal header of this message, while also refers to the multicast group address contained in the internal label of the destination field in the internal header, so as to ascertain the physical link to which this message should be transmitted, and transfers this message to that physical link. Here, in this exemplary configuration, the flow mapping unit is assumed to accommodate a plurality of physical links or logical paths, so that there can be cases in which there are a plurality of physical links or logical paths to which this message should be transmitted. In such a case, the copies of this message are made at the flow mapping unit according to the need.

Figure 56:
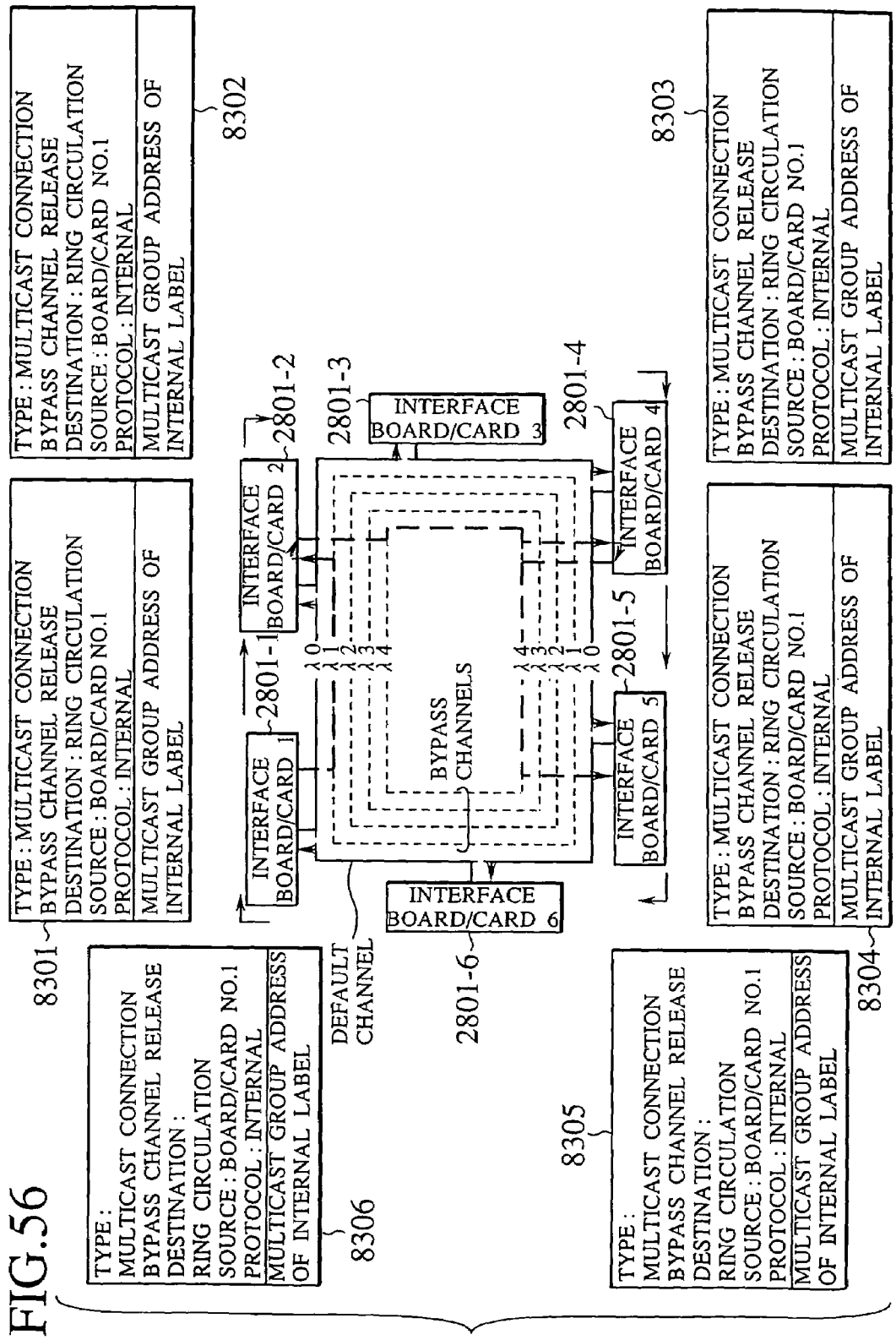
FIG. 56 is a schematic diagram for explaining a multicast connection bypass channel release procedure in the message relay device of FIG. 27.

When the set up of the multicast connection on the bypass channel fails or when the bypass channel release condition is satisfied (step 3713 of FIG. 35), the interface board/card at the start point of the multicast connection produces the multicast connection bypass channel release message, and this message is sequentially circulated through the interface boards/cards on the ring, so as to release the multicast connection on the bypass channel. Even in the case where the set up of the multicast connection on the bypass channel fails, there is a possibility for a case of having the chain of bypass channels that has been built up to a middle according to the above described method, and it is preferable to release this chain of bypass channels that has been built up to a middle. FIG. 56 shows the processing to be carried out by this multicast connection bypass channel release message. As shown in FIG. 56, the multicast connection bypass channel release message contains the multicast group address in terms of the internal label in its information section. Each interface board/card that received this message refers to the multicast group address in terms of the internal label, and if this interface board/card is maintaining the bypass channel that is associated with that multicast group address, this bypass channel is released according to the procedure shown in FIG. 42.

As described, according to the present invention, the flow is detected by the prescribed condition, the bypass channel capable of transferring messages with the amount of calculations smaller than the case of handling messages by the default channel is set up, and the message transfer belonging to the flow is switched from the default channel to the bypass channel, while providing the connection-less communications on the default channel, for example, so that it is possible to realize the message relaying with the ultra-high throughput by relieving the large amount of calculations inherently associated with the connection-less communications. In addition, by forming these bypass channels and default channel by utilizing the wavelength division multiplexed burst optical switching technique, the physical constraints associated with electric circuits can be relieved so that it is possible to realize the bypass channels and default channel with the ultra-high throughput easily. Also, by setting up these bypass channels according to the amount of messages transferred on the default channel and releasing them according to the amount of messages transferred on the bypass channels, it is possible to allocate the bandwidth between the routing processing devices by following the traffic pattern between the routing processing devices which is continually changing in time. In addition, by defining the identifier of each flow inside the message relay device of the present invention independently from an identifier provided by the protocol for processing messages, and processing messages belonging to each flow without requiring any conversion, it is possible to provide the message relay device with the ultra-high throughput which is capable of accommodating various protocols. Also, in one exemplary configuration of the present invention, the ring topology is used as the internal topology of the message relay device by utilizing the advantageous characteristic of the wavelength division multiplexing burst optical switching technique that the large amount of traffic can be transferred by a single optical fiber, so that it is possible to provide the multicast connection with the ultra-high throughput on the default channel or the bypass channel easily.

It is to be noted that the message transfer protocol on the default channel between the interface boards/cards 2801-x, the protocol for the bypass channel set up, and the algorithm for switching the default channel and the bypass channel described here are not just realizable within the message relay device as described above, and applicable to various situations. For example, they are applicable to the message transfer on the optical loop in a system such as an optical loop subscriber network or optical loop wide area network using the wavelength division multiplexing burst exchange technique.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A message relay device connected with a plurality or routing processing devices for carrying out connection-less communications, for relaying a message from one routing processing device to another routing processing device, the message relay device comprising:

a plurality of interface units provided in correspondence to the routing processing devices; and a switching unit connecting the plurality of interface units within the message relay device using optical rings capable of transmitting optical signals in a plurality of wavelengths by multiplexing the optical signals;

wherein each interface unit transmits an input message entered from a corresponding routing processing device of each interface unit, through a communication channel in the optical rings toward a target interface corresponding to a relaying target routing processing device of the input message which is formed by using a wavelength determined according to the input message, receives an output message to be outputted to the corresponding routing processing device of each interface unit from the switching unit by selectively intercepting a wavelength uniquely allocated to each interface unit in the optical rings, and processes an intercepted message intercepted by selectively intercepting a wavelength commonly allocated to the plurality of interface units in the optical rings, according to an internal identifier that includes information indicating an interface unit within the message relay device which is a destination of the intercepted message, the internal identifier being internal to the message relay device, where a number of wavelengths that can be received at each interface unit is set to be greater than a number of wavelengths that can be transmitted from each interface unit.

* * * * *